US011589637B2

(12) United States Patent
Tamm et al.

(10) Patent No.: US 11,589,637 B2
(45) Date of Patent: Feb. 28, 2023

(54) LAYERED SHOE UPPER

(71) Applicant: adidas AG, Herzogenaurach (DE)

(72) Inventors: Stefan Tamm, Herzogenaurach (DE); Carl Arnese, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 14/257,719

(22) Filed: Apr. 21, 2014

(65) Prior Publication Data
US 2014/0310983 A1  Oct. 23, 2014

(30) Foreign Application Priority Data

Apr. 19, 2013 (DE) .................. 102013207163.9

(51) Int. Cl.
*A43B 1/04* (2022.01)
*A43B 23/02* (2006.01)
*D04B 1/22* (2006.01)

(52) U.S. Cl.
CPC .............. *A43B 1/04* (2013.01); *A43B 23/024* (2013.01); *A43B 23/0235* (2013.01); *A43B 23/0245* (2013.01); *D04B 1/22* (2013.01); *D10B 2403/032* (2013.01); *D10B 2501/043* (2013.01); *Y02P 70/62* (2015.11)

(58) Field of Classification Search
CPC ..... A43B 1/04; A43B 23/0235; A43B 23/024; A43B 23/0245; A43B 23/04; A43B 5/00; D04B 1/22; D04B 1/14; D04B 21/00; Y02P 70/62; D10B 2501/043; D10B 2403/032; B32B 5/12; B32B 5/026
USPC ........ 36/83, 84, 45, 48, 50.1; 2/61, 239, 240
See application file for complete search history.

(56) References Cited

U.S. PATENT DOCUMENTS

| | | | |
|---|---|---|---|
| 74,962 A | 2/1868 | Martin |
| 275,142 A | 4/1883 | Carter |
| 299,934 A | 3/1884 | Muller |
| 467,091 A | 1/1892 | Max |
| 578,153 A | 3/1897 | Lamb |
| 601,192 A | 3/1898 | Woodwide |
| 601,894 A | 4/1898 | Lamb |
| D31,023 S | 6/1899 | Olmsted |
| 757,424 A | 4/1904 | Vohl |
| 951,033 A | 3/1910 | Steber |
| 1,215,198 A | 2/1917 | Rothstein |

(Continued)

FOREIGN PATENT DOCUMENTS

| AT | 386324 | 8/1988 |
|---|---|---|
| CA | 989720 | 5/1976 |

(Continued)

OTHER PUBLICATIONS

Nike's Motion to Amend filed in IPR2013-00067 on Aug. 19, 2013, 19 pages.

(Continued)

*Primary Examiner* — Nathan E Durham
*Assistant Examiner* — Abby M Spatz
(74) *Attorney, Agent, or Firm* — Kilpatrick Townsend & Stockton LLP

(57) ABSTRACT

A shoe includes an upper and a sole. The upper includes an outer layer having a first knitwear and an inner layer having a second knitwear. The first knitwear differs from the second knitwear with regard to at least one of a yarn used, a stitch structure, an alignment, and a form.

22 Claims, 12 Drawing Sheets

(56) References Cited

U.S. PATENT DOCUMENTS

| | | | |
|---|---|---|---|
| 1,346,516 A | 7/1920 | Godfrey | |
| 1,370,799 A | 3/1921 | Egerton | |
| 1,413,314 A | 4/1922 | Bosworth | |
| 1,413,537 A | 4/1922 | Jones | |
| 1,538,263 A | 5/1925 | Ackerman | |
| 1,597,934 A | 8/1926 | Stimpson | |
| 1,841,518 A | 1/1932 | Beliak | |
| 1,888,172 A | 11/1932 | Joha | |
| 1,902,780 A | 3/1933 | Holden et al. | |
| RE18,804 E | 4/1933 | Joha | |
| 1,910,251 A | 5/1933 | Joha | |
| 1,972,609 A | 9/1934 | Arsdale et al. | |
| 2,001,293 A | 5/1935 | Wilson | |
| 2,018,275 A | 10/1935 | Jack | |
| 2,024,180 A | 12/1935 | Parlante | |
| 2,038,844 A | 4/1936 | Dorf | |
| 2,042,146 A | 5/1936 | Deakin | |
| 2,047,724 A | 7/1936 | Zuckerman | |
| 2,048,294 A | 7/1936 | Roberts | |
| 2,069,083 A | 1/1937 | Percy | |
| 2,076,285 A | 4/1937 | Wiggin | |
| 2,126,186 A | 8/1938 | Friedland | |
| 2,147,197 A * | 2/1939 | Glidden | A43B 1/02 36/3 A |
| 2,150,730 A | 3/1939 | Schuessler | |
| 2,165,092 A | 7/1939 | Daniels | |
| 2,171,654 A | 9/1939 | Ralph et al. | |
| 2,178,941 A | 11/1939 | Schuessler | |
| 2,257,390 A | 9/1941 | Roy | |
| 2,276,920 A | 3/1942 | Charles et al. | |
| 2,292,455 A | 8/1942 | Hollier et al. | |
| 2,297,028 A | 9/1942 | Sheeler | |
| 2,302,167 A | 11/1942 | Austin | |
| 2,314,098 A * | 3/1943 | McDonald | A43B 3/02 12/142 G |
| 2,319,141 A | 5/1943 | Kuehnel | |
| 2,330,199 A * | 9/1943 | Basch | D04B 1/106 2/80 |
| 2,343,390 A | 3/1944 | Ushakoff | |
| 2,364,134 A | 12/1944 | Dildilian et al. | |
| 2,391,594 A | 12/1945 | Provenzano | |
| 2,400,487 A | 5/1946 | Clark et al. | |
| 2,400,692 A | 5/1946 | Herbert | |
| 2,424,957 A * | 7/1947 | Schletter | D04B 1/26 66/183 |
| 2,440,393 A | 4/1948 | Clark | |
| 2,460,674 A | 2/1949 | Lajos | |
| 2,464,301 A | 3/1949 | Francis, Jr. | |
| 2,467,237 A | 4/1949 | Sherman et al. | |
| 2,516,697 A | 7/1950 | Haddad | |
| 2,538,673 A | 1/1951 | Ansley | |
| 2,569,764 A | 10/1951 | Jonas | |
| 2,584,084 A | 1/1952 | Rubico | |
| 2,586,045 A | 2/1952 | Hoza | |
| 2,603,891 A | 7/1952 | Gustav | |
| 2,608,078 A | 8/1952 | Anderson | |
| 2,623,373 A | 12/1952 | Vogel | |
| 2,641,004 A | 6/1953 | Whiting et al. | |
| 2,675,631 A * | 4/1954 | Doughty | A43B 1/04 36/12 |
| 2,679,117 A | 5/1954 | Reed | |
| 2,701,458 A | 2/1955 | Ducharme | |
| 2,712,744 A | 7/1955 | Miller et al. | |
| 2,714,813 A | 8/1955 | Roscoe | |
| 2,783,631 A | 3/1957 | Sumner | |
| 2,811,029 A | 10/1957 | Conner | |
| 2,848,885 A | 8/1958 | Goodman | |
| 2,898,754 A | 8/1959 | Harms | |
| 2,934,839 A | 5/1960 | Servin | |
| 2,948,132 A | 8/1960 | Gift | |
| 2,966,785 A | 1/1961 | Goff et al. | |
| 2,983,128 A | 5/1961 | Goff et al. | |
| 2,994,322 A | 8/1961 | Cullen et al. | |
| 3,004,354 A | 10/1961 | Lewis | |
| 3,013,564 A | 12/1961 | Harold | |
| 3,015,943 A | 1/1962 | Guy | |
| 3,035,291 A | 5/1962 | Bingham, Jr. | |
| 3,063,074 A | 11/1962 | Scholl | |
| 3,070,909 A | 1/1963 | Hermann et al. | |
| 3,078,699 A | 2/1963 | Huntley | |
| 3,093,916 A | 6/1963 | Hiestand et al. | |
| 3,138,880 A | 6/1964 | Kunzli | |
| 3,159,988 A | 12/1964 | Reymes | |
| 3,217,336 A | 11/1965 | Joseph | |
| 3,228,819 A | 1/1966 | Bingham, Jr. | |
| 3,298,204 A | 1/1967 | Hoffecker | |
| 3,324,220 A | 6/1967 | Stansfield | |
| 3,370,363 A | 2/1968 | Kaplan | |
| 3,416,174 A | 12/1968 | Novitske | |
| 3,425,246 A | 2/1969 | Knohl | |
| 3,550,402 A | 12/1970 | Colton | |
| 3,583,081 A | 6/1971 | Hayashi | |
| 3,616,149 A | 10/1971 | Wincklhofer et al. | |
| 3,620,892 A | 11/1971 | Wincklhofer et al. | |
| 3,635,051 A | 1/1972 | Betts et al. | |
| 3,656,323 A | 4/1972 | Brown | |
| 3,694,940 A | 10/1972 | Stohr | |
| 3,695,063 A | 10/1972 | Betts et al. | |
| 3,704,474 A | 12/1972 | Winkler | |
| 3,766,566 A | 10/1973 | Tadokoro et al. | |
| 3,769,723 A | 11/1973 | Masterson et al. | |
| 3,778,856 A | 12/1973 | Christie et al. | |
| 3,785,173 A | 1/1974 | Hanney et al. | |
| 3,838,583 A | 10/1974 | Rumi et al. | |
| 3,863,272 A | 2/1975 | Guille | |
| 3,867,248 A | 2/1975 | Bauer | |
| 3,884,052 A | 5/1975 | Findlay et al. | |
| 3,952,427 A | 4/1976 | von den Benken et al. | |
| 3,967,390 A | 7/1976 | Anfruns | |
| 3,971,234 A | 7/1976 | Taylor | |
| 3,972,086 A | 8/1976 | Belli et al. | |
| 3,985,003 A | 10/1976 | Reed et al. | |
| 3,985,004 A | 10/1976 | Johnson et al. | |
| 4,027,402 A | 6/1977 | Liu et al. | |
| 4,028,910 A | 6/1977 | Wignall et al. | |
| 4,031,586 A | 6/1977 | von den Benken et al. | |
| 4,038,699 A | 8/1977 | Burn | |
| 4,038,840 A | 8/1977 | Castello | |
| 4,068,395 A | 1/1978 | Senter | |
| 4,075,383 A | 2/1978 | Anderson et al. | |
| 4,111,008 A | 9/1978 | Robinson et al. | |
| 4,120,101 A | 10/1978 | Drew | |
| 4,144,727 A | 3/1979 | Duhl et al. | |
| 4,183,156 A | 1/1980 | Rudy et al. | |
| 4,211,806 A | 7/1980 | Civardi et al. | |
| 4,219,945 A | 9/1980 | Rudy et al. | |
| 4,232,458 A | 11/1980 | Bartels | |
| 4,233,758 A | 11/1980 | Auberry | |
| 4,255,949 A | 3/1981 | Thorneburg | |
| 4,258,480 A | 3/1981 | Famolare et al. | |
| 4,265,954 A | 5/1981 | Romanek | |
| 4,276,671 A | 7/1981 | Melton | |
| 4,279,049 A | 7/1981 | Coiquaud | |
| 4,282,657 A | 8/1981 | Antonious | |
| 4,306,315 A | 12/1981 | Castiglia | |
| 4,306,929 A | 12/1981 | Menikheim et al. | |
| 4,317,292 A | 3/1982 | Melton | |
| 4,324,752 A | 4/1982 | Newton et al. | |
| 4,354,318 A | 10/1982 | Frederick et al. | |
| 4,356,643 A | 11/1982 | Kester et al. | |
| 4,373,361 A | 2/1983 | Thorneburg | |
| 4,430,811 A | 2/1984 | Okada | |
| 4,447,967 A | 5/1984 | Zaino | |
| 4,465,448 A | 8/1984 | Aldridge et al. | |
| 4,467,626 A | 8/1984 | Coble et al. | |
| 4,523,346 A | 6/1985 | Auberry et al. | |
| 4,531,525 A | 7/1985 | Richards | |
| 4,592,154 A | 6/1986 | Oatman | |
| 4,607,439 A | 8/1986 | Harada | |
| 4,610,685 A | 9/1986 | Raley | |
| 4,624,115 A | 11/1986 | Safrit et al. | |
| 4,642,915 A | 2/1987 | Pfander | |
| 4,651,354 A | 3/1987 | Petrey | |

(56) References Cited

U.S. PATENT DOCUMENTS

| | | | |
|---|---|---|---|
| 4,663,946 A | 5/1987 | Wright | |
| 4,669,126 A | 6/1987 | Jones | |
| 4,682,479 A | 7/1987 | Pernick | |
| 4,722,202 A | 2/1988 | Imboden | |
| 4,729,179 A | 3/1988 | Quist et al. | |
| 4,737,396 A | 4/1988 | Kamat et al. | |
| 4,750,339 A | 6/1988 | Simpson, Jr. et al. | |
| 4,756,098 A | 7/1988 | Boggia | |
| 4,783,355 A | 11/1988 | Mueller | |
| 4,785,558 A | 11/1988 | Shiomura | |
| 4,813,158 A | 3/1989 | Brown | |
| 4,813,161 A | 3/1989 | Lesley | |
| 4,843,844 A * | 7/1989 | Hursh | D04B 1/02 66/196 |
| 4,852,272 A | 8/1989 | Chilewich et al. | |
| 4,899,465 A | 2/1990 | Bleimhofer et al. | |
| 4,941,331 A | 7/1990 | Cournoyer et al. | |
| 4,960,135 A | 10/1990 | Nelson | |
| 5,031,423 A | 7/1991 | Ikenaga et al. | |
| 5,095,720 A | 3/1992 | Tibbals | |
| 5,117,567 A | 6/1992 | Berger et al. | |
| 5,125,116 A | 6/1992 | Gaither et al. | |
| 5,152,025 A | 10/1992 | Hirmas et al. | |
| 5,157,791 A * | 10/1992 | Woodson | A41B 11/005 2/239 |
| 5,181,278 A | 1/1993 | Peleg et al. | |
| 5,192,601 A | 3/1993 | Neisler | |
| 5,240,773 A | 8/1993 | Dunn et al. | |
| 5,253,434 A | 10/1993 | Curley, Jr. et al. | |
| 5,291,671 A | 3/1994 | Caberlotto et al. | |
| 5,319,807 A | 6/1994 | Brier | |
| 5,323,627 A | 6/1994 | Lonati et al. | |
| 5,343,639 A | 9/1994 | Kilgore et al. | |
| 5,345,638 A | 9/1994 | Nishida | |
| 5,353,523 A | 10/1994 | Kilgore et al. | |
| 5,353,524 A | 10/1994 | Brier | |
| 5,371,957 A | 12/1994 | Gaudio et al. | |
| 5,385,036 A | 1/1995 | Spillane et al. | |
| 5,388,430 A | 2/1995 | Essig | |
| 5,426,869 A | 6/1995 | Gore et al. | |
| 5,461,884 A | 10/1995 | McCartney et al. | |
| 5,479,791 A | 1/1996 | Osborne | |
| 5,484,646 A | 1/1996 | Mann | |
| 5,505,011 A | 4/1996 | Bleimhofer et al. | |
| 5,511,323 A | 4/1996 | Dahlgren | |
| 5,513,450 A | 5/1996 | Aviles | |
| 5,519,894 A | 5/1996 | Imboden et al. | |
| 5,526,584 A | 6/1996 | Bleimhofer et al. | |
| 5,553,468 A | 9/1996 | Osborne | |
| 5,560,227 A | 10/1996 | Depoe et al. | |
| 5,572,860 A | 11/1996 | Mitsumoto et al. | |
| 5,575,090 A | 11/1996 | Condini | |
| 5,581,817 A | 12/1996 | Hicks | |
| 5,592,836 A | 1/1997 | Schuster et al. | |
| 5,605,060 A | 2/1997 | Osborne | |
| 5,606,808 A | 3/1997 | Gilliard et al. | |
| 5,623,734 A | 4/1997 | Pugliatti | |
| 5,623,840 A | 4/1997 | Roell | |
| 5,709,107 A | 1/1998 | Jeffcoat | |
| 5,711,093 A | 1/1998 | Aumann | |
| 5,711,168 A | 1/1998 | Proctor et al. | |
| 5,722,262 A | 3/1998 | Proctor et al. | |
| 5,729,918 A | 3/1998 | Smets et al. | |
| 5,735,145 A | 4/1998 | Pernick | |
| 5,737,857 A | 4/1998 | Aumann | |
| 5,737,943 A | 4/1998 | Bernhardt | |
| 5,746,013 A | 5/1998 | Fay | |
| 5,765,296 A | 6/1998 | Ludemann et al. | |
| 5,774,898 A | 7/1998 | Malpee | |
| 5,784,806 A | 7/1998 | Wendt | |
| 5,787,503 A | 8/1998 | Murphy, III | |
| 5,791,163 A | 8/1998 | Throneburg | |
| 5,836,179 A | 11/1998 | Van | |
| 5,850,745 A | 12/1998 | Albright | |
| 5,855,123 A | 1/1999 | Albright | |
| 5,884,419 A | 3/1999 | Davidowitz et al. | |
| 5,896,608 A | 4/1999 | Whatley | |
| 5,896,683 A | 4/1999 | Foxen et al. | |
| 5,896,758 A | 4/1999 | Rock et al. | |
| 5,906,007 A | 5/1999 | Roberts | |
| 5,996,189 A | 12/1999 | Wang et al. | |
| 6,021,585 A | 2/2000 | Cole | |
| 6,029,376 A * | 2/2000 | Cass | A43C 1/04 36/50.1 |
| 6,032,387 A | 3/2000 | Johnson | |
| 6,052,921 A | 4/2000 | Oreck | |
| 6,088,936 A | 7/2000 | Bahl et al. | |
| 6,109,068 A | 8/2000 | Stoll et al. | |
| 6,128,835 A | 10/2000 | Ritter et al. | |
| 6,151,802 A | 11/2000 | Reynolds et al. | |
| 6,158,253 A | 12/2000 | Frank et al. | |
| 6,170,175 B1 | 1/2001 | Funk et al. | |
| 6,173,589 B1 | 1/2001 | Hayes, Jr. et al. | |
| 6,192,717 B1 | 2/2001 | Rabinowicz | |
| 6,196,030 B1 | 3/2001 | Stoll et al. | |
| 6,227,010 B1 | 5/2001 | Roell | |
| 6,231,946 B1 | 5/2001 | Brown, Jr. et al. | |
| 6,250,115 B1 | 6/2001 | Suzuki | |
| 6,272,888 B1 | 8/2001 | Fujita et al. | |
| 6,286,233 B1 | 9/2001 | Gaither | |
| 6,287,168 B1 | 9/2001 | Rabinowicz | |
| 6,299,962 B1 | 10/2001 | Davis et al. | |
| 6,301,759 B1 | 10/2001 | Langer et al. | |
| 6,308,438 B1 | 10/2001 | Throneburg et al. | |
| 6,330,814 B1 | 12/2001 | Fujiwara et al. | |
| 6,333,105 B1 | 12/2001 | Tanaka et al. | |
| 6,401,364 B1 * | 6/2002 | Burt | A43B 1/00 36/3 A |
| 6,415,632 B1 | 7/2002 | Vesnaver | |
| 6,430,844 B1 | 8/2002 | Otis et al. | |
| 6,449,878 B1 | 9/2002 | Lyden | |
| 6,539,752 B1 | 4/2003 | Apollonio | |
| 6,558,784 B1 | 5/2003 | Norton et al. | |
| 6,588,237 B2 | 7/2003 | Cole et al. | |
| 6,622,312 B2 | 9/2003 | Rabinowicz | |
| 6,662,469 B2 | 12/2003 | Belley et al. | |
| 6,665,955 B1 | 12/2003 | Mizrahi et al. | |
| 6,708,348 B1 | 3/2004 | Romay | |
| 6,735,988 B1 | 5/2004 | Honeycutt | |
| 6,754,983 B2 | 6/2004 | Hatfield et al. | |
| 6,779,369 B2 | 8/2004 | Shepherd | |
| 6,871,515 B1 | 3/2005 | Starbuck et al. | |
| 6,886,367 B2 | 5/2005 | Mitchell et al. | |
| 6,899,591 B2 | 5/2005 | Mitchell | |
| 6,910,288 B2 | 6/2005 | Dua | |
| 6,922,917 B2 | 8/2005 | Kerns et al. | |
| 6,931,762 B1 | 8/2005 | Dua | |
| 6,944,975 B2 | 9/2005 | Safdeye et al. | |
| 6,984,596 B2 | 1/2006 | Dickerson | |
| 6,986,183 B2 | 1/2006 | Delgorgue et al. | |
| 6,986,269 B2 | 1/2006 | Dua | |
| D517,297 S * | 3/2006 | Jones | D2/969 |
| 7,016,867 B2 | 3/2006 | Lyden | |
| 7,037,571 B2 | 5/2006 | Fish et al. | |
| 7,043,942 B2 | 5/2006 | Chapman | |
| 7,047,668 B2 | 5/2006 | Burris et al. | |
| 7,051,460 B2 | 5/2006 | Orei et al. | |
| 7,055,267 B2 | 6/2006 | Wilson et al. | |
| 7,056,402 B2 | 6/2006 | Koerwien et al. | |
| 7,081,221 B2 | 7/2006 | Paratore et al. | |
| 7,107,235 B2 | 9/2006 | Lyden | |
| 7,131,296 B2 | 11/2006 | Dua et al. | |
| 7,179,414 B2 | 2/2007 | Safdeye et al. | |
| 7,207,125 B2 | 4/2007 | Jeppesen et al. | |
| 7,207,196 B2 | 4/2007 | Lonati et al. | |
| 7,207,961 B1 | 4/2007 | Benton et al. | |
| 7,240,522 B2 | 7/2007 | Kondou et al. | |
| 7,346,935 B1 | 3/2008 | Patterson et al. | |
| 7,347,011 B2 | 3/2008 | Dua et al. | |
| 7,356,946 B2 | 4/2008 | Hannon et al. | |
| 7,441,348 B1 | 10/2008 | Dawson et al. | |
| 7,543,397 B2 | 6/2009 | Kilgore et al. | |
| 7,568,298 B2 | 8/2009 | Kerns et al. | |
| 7,637,032 B2 | 12/2009 | Sokolowski et al. | |

(56) References Cited

U.S. PATENT DOCUMENTS

| | | | |
|---|---|---|---|
| 7,650,705 B2 | 1/2010 | Donnadieu et al. | |
| 7,677,061 B2 * | 3/2010 | Mori | A41B 11/02 |
| | | | 66/185 |
| 7,682,219 B2 | 3/2010 | Falla | |
| 7,721,575 B2 * | 5/2010 | Yokoyama | A41B 11/004 |
| | | | 66/185 |
| 7,774,956 B2 | 8/2010 | Dua et al. | |
| 7,805,860 B2 | 10/2010 | Fliri et al. | |
| 7,814,598 B2 | 10/2010 | Dua et al. | |
| 7,854,076 B2 | 12/2010 | Keppler et al. | |
| 7,882,648 B2 | 2/2011 | Langvin | |
| 8,028,440 B2 | 10/2011 | Sokolowski et al. | |
| 8,042,288 B2 | 10/2011 | Dua et al. | |
| 8,099,881 B2 | 1/2012 | Yamamoto | |
| 8,196,317 B2 | 6/2012 | Dua et al. | |
| 8,209,883 B2 | 7/2012 | Lyden | |
| 8,215,132 B2 | 7/2012 | Dua et al. | |
| 8,225,530 B2 * | 7/2012 | Sokolowski | A43B 1/04 |
| | | | 12/142 G |
| 8,266,749 B2 | 9/2012 | Dua et al. | |
| 8,296,970 B2 | 10/2012 | Jessiman et al. | |
| D673,765 S | 1/2013 | Parker et al. | |
| 8,448,474 B1 | 5/2013 | Tatler et al. | |
| 8,464,383 B2 | 6/2013 | Sing et al. | |
| 8,490,299 B2 | 7/2013 | Dua et al. | |
| 8,522,577 B2 | 9/2013 | Huffa | |
| 8,590,345 B2 * | 11/2013 | Sokolowski | A43B 1/04 |
| | | | 66/170 |
| 8,595,878 B2 | 12/2013 | Farris et al. | |
| 8,621,891 B2 | 1/2014 | Shaffer et al. | |
| 8,647,460 B1 | 2/2014 | Koo et al. | |
| 8,650,916 B2 * | 2/2014 | Dua | A43B 1/04 |
| | | | 36/45 |
| 8,683,718 B2 | 4/2014 | Fliri et al. | |
| 8,701,232 B1 | 4/2014 | Droege et al. | |
| 8,745,895 B2 | 6/2014 | Sokolowski et al. | |
| 8,745,896 B2 | 6/2014 | Shaffer et al. | |
| 8,800,172 B2 | 8/2014 | Dua et al. | |
| 8,839,532 B2 | 9/2014 | Shaffer et al. | |
| 8,881,430 B2 | 11/2014 | Baines et al. | |
| 8,898,932 B2 | 12/2014 | Molyneux et al. | |
| 8,899,079 B2 | 12/2014 | Podhajny et al. | |
| 8,959,800 B2 | 2/2015 | Sokolowski et al. | |
| 8,959,959 B1 | 2/2015 | Podhajny et al. | |
| 8,973,410 B1 | 3/2015 | Podhajny et al. | |
| 8,978,422 B2 | 3/2015 | Podhajny et al. | |
| 8,997,529 B1 | 4/2015 | Podhajny et al. | |
| 8,997,530 B1 | 4/2015 | Podhajny | |
| 9,003,836 B1 | 4/2015 | Podhajny et al. | |
| 9,010,157 B1 | 4/2015 | Podhajny et al. | |
| 9,027,260 B2 | 5/2015 | Shaffer et al. | |
| 9,032,763 B2 | 5/2015 | Meir et al. | |
| 9,060,562 B2 | 6/2015 | Meir et al. | |
| 9,072,335 B1 | 7/2015 | Podhajny | |
| 9,078,488 B1 | 7/2015 | Podhajny et al. | |
| 9,084,449 B2 | 7/2015 | Huffman et al. | |
| 9,095,187 B2 | 8/2015 | Molyneux et al. | |
| 9,132,601 B2 | 9/2015 | Beye et al. | |
| 9,139,938 B2 | 9/2015 | Podhajny et al. | |
| 9,145,629 B2 | 9/2015 | Podhajny | |
| 9,150,986 B2 | 10/2015 | Shaffer et al. | |
| 9,192,204 B1 | 11/2015 | Klug et al. | |
| 9,226,540 B2 | 1/2016 | Podhajny et al. | |
| 9,297,097 B2 | 3/2016 | Turner | |
| 9,301,567 B2 | 4/2016 | Roulo et al. | |
| 9,339,076 B2 | 5/2016 | Podhajny et al. | |
| 9,353,469 B2 | 5/2016 | Meir et al. | |
| 9,357,813 B2 | 6/2016 | Lyden | |
| 9,365,959 B2 | 6/2016 | Turner | |
| 9,375,046 B2 | 6/2016 | Meir | |
| 9,398,784 B2 | 7/2016 | Baudouin et al. | |
| 9,498,023 B2 | 11/2016 | Craig | |
| 9,723,890 B2 | 8/2017 | Long et al. | |
| 2001/0016993 A1 | 8/2001 | Cagner | |
| 2001/0024709 A1 | 9/2001 | Yoneda et al. | |
| 2001/0032399 A1 | 10/2001 | Litchfield et al. | |
| 2001/0054240 A1 | 12/2001 | Bordin et al. | |
| 2001/0055684 A1 | 12/2001 | Davis et al. | |
| 2002/0000002 A1 | 1/2002 | Hatch et al. | |
| 2002/0002780 A1 | 1/2002 | Barthelemy et al. | |
| 2002/0007570 A1 | 1/2002 | Girard | |
| 2002/0012784 A1 | 1/2002 | Norton et al. | |
| 2002/0026730 A1 | 3/2002 | Whatley | |
| 2002/0035796 A1 | 3/2002 | Knoche et al. | |
| 2002/0053148 A1 | 5/2002 | Haimerl et al. | |
| 2002/0078599 A1 | 6/2002 | Delgorgue et al. | |
| 2002/0092199 A1 | 7/2002 | Fish et al. | |
| 2002/0148142 A1 | 10/2002 | Oorei et al. | |
| 2002/0148258 A1 | 10/2002 | Cole et al. | |
| 2002/0152638 A1 | 10/2002 | Safdeye et al. | |
| 2002/0157281 A1 | 10/2002 | Safdeye et al. | |
| 2003/0009908 A1 | 1/2003 | Sheets et al. | |
| 2003/0009919 A1 | 1/2003 | Stein | |
| 2003/0033837 A1 | 2/2003 | Higgins | |
| 2003/0039882 A1 | 2/2003 | Wruck et al. | |
| 2003/0051372 A1 | 3/2003 | Lyden | |
| 2003/0069807 A1 | 4/2003 | Lyden | |
| 2003/0079374 A1 | 5/2003 | Belley et al. | |
| 2003/0097766 A1 | 5/2003 | Morgan | |
| 2003/0106171 A1 | 6/2003 | Issler | |
| 2003/0121179 A1 | 7/2003 | Chen et al. | |
| 2003/0126762 A1 | 7/2003 | Tseng | |
| 2003/0131499 A1 | 7/2003 | Silverman | |
| 2003/0191427 A1 | 10/2003 | Jay et al. | |
| 2003/0192351 A1 | 10/2003 | Meckley et al. | |
| 2003/0226280 A1 | 12/2003 | Paratore et al. | |
| 2003/0227105 A1 | 12/2003 | Paratore et al. | |
| 2004/0009731 A1 | 1/2004 | Rabinowicz | |
| 2004/0045955 A1 | 3/2004 | Rock et al. | |
| 2004/0083622 A1 | 5/2004 | Mizrahi et al. | |
| 2004/0107603 A1 | 6/2004 | Wei et al. | |
| 2004/0111920 A1 | 6/2004 | Cretinon | |
| 2004/0111921 A1 | 6/2004 | Lenormand | |
| 2004/0118018 A1 | 6/2004 | Dua | |
| 2004/0139628 A1 | 7/2004 | Wiener et al. | |
| 2004/0139629 A1 | 7/2004 | Wiener et al. | |
| 2004/0143995 A1 | 7/2004 | Mcclelland | |
| 2004/0163280 A1 | 8/2004 | Morris et al. | |
| 2004/0181972 A1 | 9/2004 | Csorba | |
| 2004/0198178 A1 | 10/2004 | Mitchell et al. | |
| 2004/0205982 A1 | 10/2004 | Challe | |
| 2004/0216332 A1 | 11/2004 | Wilson et al. | |
| 2004/0226113 A1 | 11/2004 | Wright et al. | |
| 2004/0255486 A1 | 12/2004 | Pawlus et al. | |
| 2004/0261467 A1 | 12/2004 | Chapman | |
| 2005/0016023 A1 | 1/2005 | Burris et al. | |
| 2005/0028405 A1 | 2/2005 | Wilson et al. | |
| 2005/0055843 A1 | 3/2005 | Morlacchi | |
| 2005/0081402 A1 | 4/2005 | Orei et al. | |
| 2005/0091725 A1 | 5/2005 | Alley et al. | |
| 2005/0102863 A1 | 5/2005 | Hannon et al. | |
| 2005/0108898 A1 | 5/2005 | Jeppesen et al. | |
| 2005/0115281 A1 | 6/2005 | Mitchell et al. | |
| 2005/0115284 A1 * | 6/2005 | Dua | A43B 1/04 |
| | | | 66/178 R |
| 2005/0127057 A1 | 6/2005 | Rock et al. | |
| 2005/0138845 A1 | 6/2005 | Haimerl et al. | |
| 2005/0155137 A1 | 7/2005 | Berger | |
| 2005/0166426 A1 | 8/2005 | Donnadieu et al. | |
| 2005/0166427 A1 | 8/2005 | Greene et al. | |
| 2005/0193592 A1 * | 9/2005 | Dua | A43B 1/04 |
| | | | 36/45 |
| 2005/0208857 A1 | 9/2005 | Baron et al. | |
| 2005/0268497 A1 | 12/2005 | Alfaro et al. | |
| 2005/0273988 A1 | 12/2005 | Christy et al. | |
| 2005/0284000 A1 | 12/2005 | Kerns | |
| 2006/0006168 A1 | 1/2006 | Rock et al. | |
| 2006/0016099 A1 | 1/2006 | Marco et al. | |
| 2006/0021258 A1 | 2/2006 | Beck | |
| 2006/0048413 A1 | 3/2006 | Sokolowski et al. | |
| 2006/0059715 A1 | 3/2006 | Aveni | |
| 2006/0059716 A1 | 3/2006 | Yamashita et al. | |
| 2006/0117607 A1 | 6/2006 | Pare et al. | |

(56) References Cited

U.S. PATENT DOCUMENTS

| | | | |
|---|---|---|---|
| 2006/0130359 A1* | 6/2006 | Dua | A43B 1/04 36/9 R |
| 2006/0162187 A1 | 7/2006 | Byrnes et al. | |
| 2006/0179549 A1 | 8/2006 | Huggins et al. | |
| 2006/0243000 A1 | 11/2006 | Turlan et al. | |
| 2007/0000027 A1 | 1/2007 | Ganzoni et al. | |
| 2007/0003728 A1 | 1/2007 | Hannon et al. | |
| 2007/0022627 A1* | 2/2007 | Sokolowski | A43B 1/04 36/3 A |
| 2007/0074334 A1 | 4/2007 | Steel et al. | |
| 2007/0144039 A1 | 6/2007 | Fliri | |
| 2007/0180730 A1 | 8/2007 | Greene et al. | |
| 2007/0234593 A1 | 10/2007 | Beck et al. | |
| 2007/0271817 A1 | 11/2007 | Ellis et al. | |
| 2008/0000108 A1 | 1/2008 | Ellis et al. | |
| 2008/0010860 A1 | 1/2008 | Gyr | |
| 2008/0017294 A1 | 1/2008 | Bailey et al. | |
| 2008/0032580 A1 | 2/2008 | Fukuoka et al. | |
| 2008/0066499 A1 | 3/2008 | Andrieu et al. | |
| 2008/0078102 A1 | 4/2008 | Kilgore et al. | |
| 2008/0110048 A1* | 5/2008 | Dua | A43B 1/04 36/45 |
| 2008/0110049 A1* | 5/2008 | Sokolowski | A43B 3/0031 36/50.1 |
| 2008/0189830 A1 | 8/2008 | Egglesfield et al. | |
| 2008/0250668 A1 | 10/2008 | Marvin et al. | |
| 2008/0263893 A1 | 10/2008 | Hernandez et al. | |
| 2008/0295230 A1 | 12/2008 | Wright et al. | |
| 2008/0313939 A1 | 12/2008 | Ardill et al. | |
| 2009/0068908 A1* | 3/2009 | Hinchcliff | B29C 66/431 442/181 |
| 2009/0071036 A1 | 3/2009 | Hooper et al. | |
| 2009/0107012 A1* | 4/2009 | Cheney | A43B 23/0255 36/25 R |
| 2009/0126225 A1 | 5/2009 | Jarvis | |
| 2009/0126229 A1 | 5/2009 | Fuerst et al. | |
| 2009/0134145 A1 | 5/2009 | Rock et al. | |
| 2009/0172971 A1 | 7/2009 | Peikert et al. | |
| 2009/0241374 A1* | 10/2009 | Sato | A43B 23/047 36/45 |
| 2009/0297794 A1 | 12/2009 | Lin | |
| 2010/0018075 A1 | 1/2010 | Meschter et al. | |
| 2010/0037483 A1* | 2/2010 | Meschter | A43B 23/0235 36/47 |
| 2010/0043253 A1* | 2/2010 | Dojan | A43B 1/0072 36/47 |
| 2010/0051132 A1 | 3/2010 | Glenn et al. | |
| 2010/0064453 A1 | 3/2010 | Haimerl | |
| 2010/0107346 A1 | 5/2010 | Aveni et al. | |
| 2010/0107443 A1 | 5/2010 | Aveni et al. | |
| 2010/0154256 A1 | 6/2010 | Dua | |
| 2010/0162590 A1 | 7/2010 | Bonigk et al. | |
| 2010/0170651 A1 | 7/2010 | Scherb et al. | |
| 2010/0175276 A1* | 7/2010 | Dojan | A43B 3/26 36/47 |
| 2010/0269372 A1 | 10/2010 | Dua et al. | |
| 2010/0299962 A1 | 12/2010 | Fliri | |
| 2011/0030244 A1 | 2/2011 | Motawi et al. | |
| 2011/0061149 A1 | 3/2011 | Polacco et al. | |
| 2011/0061265 A1 | 3/2011 | Lyden | |
| 2011/0078921 A1 | 4/2011 | Greene et al. | |
| 2011/0088282 A1 | 4/2011 | Dojan et al. | |
| 2011/0154689 A1 | 6/2011 | Chung | |
| 2011/0154693 A1 | 6/2011 | Oberschneider et al. | |
| 2011/0179677 A1 | 7/2011 | Jessiman et al. | |
| 2011/0219643 A1 | 9/2011 | Tai et al. | |
| 2011/0283567 A1 | 11/2011 | Yin | |
| 2011/0302727 A1 | 12/2011 | Sokolowski et al. | |
| 2011/0302810 A1 | 12/2011 | Borel et al. | |
| 2011/0308108 A1 | 12/2011 | Berns et al. | |
| 2011/0308110 A1 | 12/2011 | Berns et al. | |
| 2012/0011744 A1 | 1/2012 | Bell et al. | |
| 2012/0023686 A1 | 2/2012 | Huffa et al. | |
| 2012/0023778 A1* | 2/2012 | Dojan | A43C 11/002 36/58.5 |
| 2012/0055044 A1 | 3/2012 | Dojan et al. | |
| 2012/0090077 A1 | 4/2012 | Brown et al. | |
| 2012/0100351 A1* | 4/2012 | Covelli | B32B 5/12 428/196 |
| 2012/0114883 A1 | 5/2012 | Kapur et al. | |
| 2012/0144699 A1 | 6/2012 | Eggert et al. | |
| 2012/0159813 A1 | 6/2012 | Dua et al. | |
| 2012/0180195 A1* | 7/2012 | Shull | A41B 11/003 2/239 |
| 2012/0198730 A1 | 8/2012 | Burch et al. | |
| 2012/0204448 A1 | 8/2012 | Bracken | |
| 2012/0216423 A1 | 8/2012 | Lyden | |
| 2012/0216430 A1 | 8/2012 | Stöhr et al. | |
| 2012/0233878 A1 | 9/2012 | Hazenberg et al. | |
| 2012/0233879 A1 | 9/2012 | Dojan et al. | |
| 2012/0233880 A1 | 9/2012 | Chao et al. | |
| 2012/0233882 A1 | 9/2012 | Huffa et al. | |
| 2012/0233883 A1 | 9/2012 | Spencer et al. | |
| 2012/0233884 A1 | 9/2012 | Greene | |
| 2012/0233885 A1 | 9/2012 | Shaffer et al. | |
| 2012/0233886 A1 | 9/2012 | Madore et al. | |
| 2012/0233887 A1 | 9/2012 | Baker et al. | |
| 2012/0233888 A1 | 9/2012 | Baker et al. | |
| 2012/0234051 A1 | 9/2012 | Huffa | |
| 2012/0234052 A1 | 9/2012 | Huffa et al. | |
| 2012/0234111 A1 | 9/2012 | Molyneux et al. | |
| 2012/0234467 A1 | 9/2012 | Rapaport et al. | |
| 2012/0235322 A1* | 9/2012 | Greene | A43B 1/14 264/250 |
| 2012/0238376 A1 | 9/2012 | Knight et al. | |
| 2012/0238910 A1 | 9/2012 | Nordstrom | |
| 2012/0240429 A1* | 9/2012 | Sokolowski | A43B 3/0031 36/50.1 |
| 2012/0246973 A1* | 10/2012 | Dua | A43B 23/0235 36/83 |
| 2012/0255201 A1* | 10/2012 | Little | A43B 1/04 36/84 |
| 2012/0272548 A1 | 11/2012 | Downard et al. | |
| 2012/0279260 A1* | 11/2012 | Dua | D04B 1/16 66/171 |
| 2012/0285039 A1 | 11/2012 | Lazaris et al. | |
| 2012/0285043 A1* | 11/2012 | Dua | A43B 1/04 36/84 |
| 2012/0297557 A1 | 11/2012 | Koo et al. | |
| 2012/0297642 A1 | 11/2012 | Schaefer et al. | |
| 2012/0297643 A1* | 11/2012 | Shaffer | A43B 1/0027 36/83 |
| 2012/0297645 A1 | 11/2012 | Berbert et al. | |
| 2012/0318026 A1* | 12/2012 | Dua | A43B 1/04 66/170 |
| 2013/0031801 A1 | 2/2013 | Hatfield et al. | |
| 2013/0036629 A1 | 2/2013 | Bramani et al. | |
| 2013/0047471 A1 | 2/2013 | Liang | |
| 2013/0055590 A1* | 3/2013 | Mokos | A43B 1/04 36/45 |
| 2013/0061405 A1 | 3/2013 | Haimerl | |
| 2013/0091741 A1 | 4/2013 | Frank et al. | |
| 2013/0118031 A1 | 5/2013 | Chenciner et al. | |
| 2013/0139407 A1 | 6/2013 | Brongers et al. | |
| 2013/0145652 A1* | 6/2013 | Podhajny | A43B 23/0245 36/50.1 |
| 2013/0152424 A1 | 6/2013 | Dojan | |
| 2013/0160323 A1 | 6/2013 | Hsiao et al. | |
| 2013/0174449 A1 | 7/2013 | Koyess et al. | |
| 2013/0219749 A1 | 8/2013 | Dojan et al. | |
| 2013/0232820 A1 | 9/2013 | Bramani et al. | |
| 2013/0239438 A1 | 9/2013 | Dua et al. | |
| 2013/0255103 A1 | 10/2013 | Dua et al. | |
| 2013/0260104 A1 | 10/2013 | Dua et al. | |
| 2013/0260629 A1 | 10/2013 | Dua et al. | |
| 2013/0269209 A1 | 10/2013 | Lang | |
| 2014/0068968 A1 | 3/2014 | Podhajny et al. | |
| 2014/0082965 A1 | 3/2014 | Greene et al. | |
| 2014/0101824 A1 | 4/2014 | Spanks et al. | |
| 2014/0123409 A1 | 5/2014 | Huffa et al. | |
| 2014/0130373 A1 | 5/2014 | Baines et al. | |

(56) References Cited

U.S. PATENT DOCUMENTS

| | | |
|---|---|---|
| 2014/0130374 A1 | 5/2014 | Minami et al. |
| 2014/0130375 A1 | 5/2014 | Baines et al. |
| 2014/0130376 A1 | 5/2014 | Fahmi et al. |
| 2014/0137433 A1 | 5/2014 | Craig et al. |
| 2014/0137434 A1* | 5/2014 | Craig .................. D04B 1/104 36/54 |
| 2014/0144190 A1 | 5/2014 | Tatler et al. |
| 2014/0150292 A1 | 6/2014 | Podhajny et al. |
| 2014/0150295 A1 | 6/2014 | Dua et al. |
| 2014/0150296 A1 | 6/2014 | Dua et al. |
| 2014/0157831 A1 | 6/2014 | Huffa et al. |
| 2014/0173934 A1 | 6/2014 | Bell |
| 2014/0196314 A1 | 7/2014 | Beye et al. |
| 2014/0209233 A1 | 7/2014 | Dua et al. |
| 2014/0237855 A1 | 8/2014 | Podhajny et al. |
| 2014/0237856 A1 | 8/2014 | Podhajny et al. |
| 2014/0238082 A1 | 8/2014 | Meir et al. |
| 2014/0238083 A1 | 8/2014 | Meir et al. |
| 2014/0245544 A1 | 9/2014 | Huffa et al. |
| 2014/0245546 A1 | 9/2014 | Huffa et al. |
| 2014/0245547 A1 | 9/2014 | Molyneux et al. |
| 2014/0245633 A1 | 9/2014 | Podhajny et al. |
| 2014/0245634 A1 | 9/2014 | Podhajny et al. |
| 2014/0245636 A1 | 9/2014 | Seamarks et al. |
| 2014/0245637 A1 | 9/2014 | Fahmi et al. |
| 2014/0245639 A1 | 9/2014 | Dua et al. |
| 2014/0245643 A1 | 9/2014 | Huffa et al. |
| 2014/0310984 A1* | 10/2014 | Tamm .................. D04B 1/102 36/84 |
| 2014/0310985 A1 | 10/2014 | Tran et al. |
| 2014/0310986 A1 | 10/2014 | Tamm et al. |
| 2014/0338226 A1 | 11/2014 | Zavala |
| 2014/0352082 A1 | 12/2014 | Shaffer et al. |
| 2014/0352173 A1 | 12/2014 | Bell et al. |
| 2014/0360048 A1 | 12/2014 | Dehaven et al. |
| 2015/0013080 A1 | 1/2015 | Thomas et al. |
| 2015/0013188 A1 | 1/2015 | Baines et al. |
| 2015/0013394 A1 | 1/2015 | Huffa |
| 2015/0013395 A1 | 1/2015 | Huffa |
| 2015/0040431 A1 | 2/2015 | Molyneux et al. |
| 2015/0047225 A1 | 2/2015 | Dealey et al. |
| 2015/0059209 A1 | 3/2015 | Dekovic et al. |
| 2015/0059211 A1 | 3/2015 | Podhajny et al. |
| 2015/0075031 A1 | 3/2015 | Podhajny et al. |
| 2015/0101212 A1 | 4/2015 | Dekovic et al. |
| 2015/0143716 A1 | 5/2015 | Savage et al. |
| 2015/0143720 A1 | 5/2015 | Avar et al. |
| 2015/0216254 A1 | 8/2015 | Podhajny et al. |
| 2015/0216255 A1 | 8/2015 | Podhajny |
| 2015/0216257 A1 | 8/2015 | Meir et al. |
| 2015/0223552 A1 | 8/2015 | Love et al. |
| 2015/0250256 A1 | 9/2015 | Podhajny et al. |
| 2015/0264995 A1 | 9/2015 | Hilderbrand, IV |
| 2015/0272261 A1 | 10/2015 | Huffman et al. |
| 2015/0342285 A1 | 12/2015 | Bell et al. |
| 2015/0359290 A1 | 12/2015 | Podhajny et al. |
| 2015/0366293 A1 | 12/2015 | Clarkson et al. |
| 2016/0029736 A1 | 2/2016 | Meir |
| 2016/0088894 A1 | 3/2016 | Podhajny et al. |
| 2016/0088899 A1 | 3/2016 | Klug et al. |
| 2016/0090670 A1 | 3/2016 | Meir |
| 2016/0095377 A1 | 4/2016 | Tamm |
| 2016/0198797 A1* | 7/2016 | Ikenaka .................. A43B 1/04 36/45 |
| 2016/0206039 A1 | 7/2016 | Cross et al. |
| 2016/0206040 A1 | 7/2016 | Cross et al. |
| 2016/0206042 A1 | 7/2016 | Cross et al. |
| 2016/0206046 A1 | 7/2016 | Cross et al. |
| 2016/0295971 A1 | 10/2016 | Arnese et al. |
| 2017/0156434 A1 | 6/2017 | Tamm et al. |
| 2017/0311650 A1 | 11/2017 | Hupperts et al. |
| 2018/0064201 A1 | 3/2018 | Tran et al. |

FOREIGN PATENT DOCUMENTS

| | | |
|---|---|---|
| CA | 2387640 | 4/2003 |
| CN | 2044806 | 9/1989 |
| CN | 1067566 | 1/1993 |
| CN | 2187379 | 1/1995 |
| CN | 2438730 | 7/2001 |
| CN | 1392833 | 1/2003 |
| CN | 1411762 | 4/2003 |
| CN | 1429512 | 7/2003 |
| CN | 1155597 | 6/2004 |
| CN | 1960650 A | 5/2007 |
| CN | 101316526 | 12/2008 |
| CN | 201356120 | 12/2009 |
| CN | 202286527 U | 7/2012 |
| CN | 102939023 | 2/2013 |
| CN | 104413996 | 3/2015 |
| DE | 71153 | 4/1893 |
| DE | 627878 | 7/1936 |
| DE | 870963 | 3/1953 |
| DE | 1736512 | 12/1956 |
| DE | 1785183 | 3/1959 |
| DE | 1084173 | 6/1960 |
| DE | 1910713 | 7/1970 |
| DE | 1785183 | 11/1971 |
| DE | 2044031 | 3/1972 |
| DE | 1685690 | 1/1973 |
| DE | 2162456 | 6/1973 |
| DE | 2305693 | 8/1973 |
| DE | 2505537 | 8/1976 |
| DE | 2801984 | 7/1979 |
| DE | 3820094 | 12/1989 |
| DE | 4400739 | 7/1995 |
| DE | 68922952 | 11/1995 |
| DE | 4419802 | 12/1995 |
| DE | 4419803 | 12/1995 |
| DE | 4441555 | 6/1996 |
| DE | 19629317 | 10/1997 |
| DE | 19738433 | 4/1998 |
| DE | 19728848 | 1/1999 |
| DE | 4443002 | 2/1999 |
| DE | 19855542 | 6/2000 |
| DE | 19910785 | 9/2000 |
| DE | 10022254 | 11/2001 |
| DE | 10037728 | 2/2002 |
| DE | 10145073 | 4/2003 |
| DE | 10228143 | 11/2003 |
| DE | 3903242 | 7/2004 |
| DE | 4138836 | 7/2004 |
| DE | 19910785 | 12/2004 |
| DE | 602004000536 | 12/2006 |
| DE | 102005030651 | 1/2007 |
| DE | 10316979 | 2/2007 |
| DE | 60031821 | 9/2007 |
| DE | 102006009974 | 9/2007 |
| DE | 102006022494 | 11/2007 |
| DE | 202007011165 | 1/2008 |
| DE | 202009010225 | 2/2010 |
| DE | 202009011928 | 2/2010 |
| DE | 102009018942 | 11/2010 |
| DE | 102009028627 | 3/2011 |
| DE | 102010037585 | 3/2012 |
| DE | 102011055154 | 5/2012 |
| DE | 202012100938 | 5/2012 |
| DE | 202007019490 | 1/2013 |
| DE | 202009018763 | 4/2013 |
| DE | 202009018765 | 4/2013 |
| DE | 102012206062 | 10/2013 |
| DE | 202012013113 | 11/2014 |
| DE | 202012013114 | 11/2014 |
| DE | 202012013118 | 11/2014 |
| DE | 202012013119 | 11/2014 |
| DE | 202012013120 | 11/2014 |
| EP | 0037629 | 10/1981 |
| EP | 45372 | 2/1982 |
| EP | 0105773 | 4/1984 |
| EP | 279950 | 8/1988 |
| EP | 0384059 | 8/1990 |
| EP | 446583 | 9/1991 |

(56) References Cited

FOREIGN PATENT DOCUMENTS

| | | |
|---|---|---|
| EP | 0472743 | 3/1992 |
| EP | 499710 | 8/1992 |
| EP | 508712 | 10/1992 |
| EP | 0664092 | 7/1995 |
| EP | 448714 | 7/1996 |
| EP | 728860 | 8/1996 |
| EP | 0733732 | 9/1996 |
| EP | 758693 | 2/1997 |
| EP | 845553 | 6/1998 |
| EP | 864681 | 9/1998 |
| EP | 898002 | 2/1999 |
| EP | 0959704 | 12/1999 |
| EP | 1004829 | 5/2000 |
| EP | 1031656 | 8/2000 |
| EP | 1091033 | 4/2001 |
| EP | 0758693 | 10/2001 |
| EP | 0833000 | 3/2002 |
| EP | 1219191 | 7/2002 |
| EP | 1233091 | 8/2002 |
| EP | 1273693 | 1/2003 |
| EP | 1275761 | 1/2003 |
| EP | 1437057 | 7/2004 |
| EP | 1148161 | 4/2005 |
| EP | 1563752 | 8/2005 |
| EP | 1602762 | 12/2005 |
| EP | 1352118 | 10/2006 |
| EP | 1972706 | 9/2008 |
| EP | 2023762 | 2/2009 |
| EP | 2079336 | 7/2009 |
| EP | 2088887 | 8/2009 |
| EP | 1571938 | 11/2009 |
| EP | 2248434 | 11/2010 |
| EP | 2378910 | 10/2011 |
| EP | 1919321 | 8/2012 |
| EP | 2485619 | 8/2012 |
| EP | 2520188 | 11/2012 |
| EP | 1571938 | 5/2013 |
| EP | 2088887 | 5/2013 |
| EP | 2591694 | 5/2013 |
| EP | 2649898 | 10/2013 |
| EP | 2716177 | 7/2014 |
| EP | 2803283 | 1/2015 |
| EP | 2904920 | 8/2015 |
| EP | 2952346 | 12/2015 |
| EP | 2977205 | 1/2016 |
| EP | 2686467 | 4/2016 |
| EP | 2713793 | 6/2016 |
| EP | 2505092 | 8/2016 |
| FR | 858875 | 12/1940 |
| FR | 862088 | 2/1941 |
| FR | 2171172 | 9/1973 |
| FR | 2491739 | 9/1982 |
| FR | 2506576 | 12/1984 |
| FR | 2504786 | 1/1986 |
| FR | 2648684 | 12/1990 |
| FR | 2776485 | 4/2000 |
| FR | 2780619 | 9/2000 |
| FR | 2784550 | 1/2001 |
| FR | 2848807 | 7/2013 |
| GB | 109091 | 8/1917 |
| GB | 273968 A | 7/1927 |
| GB | 323457 | 1/1930 |
| GB | 413279 | 7/1934 |
| GB | 538865 | 8/1941 |
| GB | 674835 | 7/1952 |
| GB | 761519 | 11/1956 |
| GB | 782562 | 9/1957 |
| GB | 832518 | 4/1960 |
| GB | 1102447 | 2/1968 |
| GB | 1219433 | 1/1971 |
| GB | 1328693 | 8/1973 |
| GB | 1539886 | 2/1979 |
| GB | 2018837 | 10/1979 |
| GB | 1572493 | 7/1980 |
| GB | 1581999 | 12/1980 |
| GB | 1603487 | 11/1981 |
| GB | 2044073 | 3/1983 |
| GB | 2131677 | 6/1984 |
| GB | 2133273 | 7/1984 |
| GB | 2214939 | 4/1992 |
| GB | 317184 | 8/2003 |
| GB | 413017 | 7/2004 |
| GB | 2408190 | 5/2005 |
| JP | S39-16845 | 6/1939 |
| JP | S59-166706 U | 11/1984 |
| JP | S63-057909 U | 4/1988 |
| JP | 2079336 | 3/1990 |
| JP | H02-116806 U | 9/1990 |
| JP | H03-003203 U | 1/1991 |
| JP | H05-176804 A | 7/1993 |
| JP | H06-008722 Y2 | 3/1994 |
| JP | 06113905 | 4/1994 |
| JP | H06-154001 A | 6/1994 |
| JP | H06-248501 A | 9/1994 |
| JP | H06-296507 A | 10/1994 |
| JP | H07-059604 | 3/1995 |
| JP | H07-148004 A | 6/1995 |
| JP | H07-246101 A | 9/1995 |
| JP | 08109553 | 4/1996 |
| JP | H09-047302 A | 2/1997 |
| JP | H09-238701 A | 9/1997 |
| JP | H10-000103 A | 1/1998 |
| JP | H10-130991 A | 5/1998 |
| JP | H10-155504 A | 6/1998 |
| JP | H10-179209 A | 7/1998 |
| JP | H03-064834 U | 5/1999 |
| JP | H11-229253 A | 8/1999 |
| JP | 11302943 | 11/1999 |
| JP | 2000015732 | 1/2000 |
| JP | 2000-279201 A | 10/2000 |
| JP | 2001017206 | 1/2001 |
| JP | 2001-104091 A | 4/2001 |
| JP | 2001-164407 A | 6/2001 |
| JP | 2001-164444 A | 6/2001 |
| JP | 2002088512 | 3/2002 |
| JP | 2002146654 | 5/2002 |
| JP | 2004230151 | 8/2004 |
| JP | 2004283586 | 10/2004 |
| JP | 2006-150064 A | 6/2006 |
| JP | 2006-249586 A | 9/2006 |
| JP | 3865307 B2 | 1/2007 |
| JP | 2007204864 | 8/2007 |
| JP | 2007-236612 | 9/2007 |
| JP | 2007-239151 | 9/2007 |
| JP | 4376792 | 12/2009 |
| JP | 2010-030289 A | 2/2010 |
| JP | 2010-163712 A | 7/2010 |
| JP | 2010-275649 A | 12/2010 |
| JP | 2011-256506 A | 12/2011 |
| JP | 2012-500071 A | 1/2012 |
| JP | 4851688 B2 | 1/2012 |
| JP | 2012062615 | 3/2012 |
| JP | 2012-512698 | 6/2012 |
| JP | 2012-522551 | 9/2012 |
| JP | 2012533404 | 12/2012 |
| JP | 2013-151783 A | 8/2013 |
| JP | 2015-025223 A | 2/2015 |
| NL | 7304678 | 10/1974 |
| NL | 7505389 | 11/1975 |
| WO | 9003744 | 4/1990 |
| WO | 9221806 | 12/1992 |
| WO | 9843506 | 10/1998 |
| WO | 9914415 | 3/1999 |
| WO | 9943229 | 9/1999 |
| WO | 0032861 | 6/2000 |
| WO | 0033694 | 6/2000 |
| WO | 0112003 | 2/2001 |
| WO | 0112004 | 2/2001 |
| WO | 0231247 | 4/2002 |
| WO | 0241721 | 5/2002 |
| WO | 2002072325 | 9/2002 |
| WO | 2004064558 | 8/2004 |
| WO | 2004066770 | 8/2004 |
| WO | 2004098333 | 11/2004 |

(56) References Cited

FOREIGN PATENT DOCUMENTS

| | | |
|---|---|---|
| WO | 2005004656 | 1/2005 |
| WO | 2005025841 | 3/2005 |
| WO | 2005055754 | 6/2005 |
| WO | 2005074737 | 8/2005 |
| WO | 2007005459 | 1/2007 |
| WO | 2009143000 | 11/2009 |
| WO | 2010020391 | 2/2010 |
| WO | 2010090923 | 8/2010 |
| WO | 2011108954 | 9/2011 |
| WO | 2011138639 | 11/2011 |
| WO | 2012018731 | 2/2012 |
| WO | 2012125473 | 9/2012 |
| WO | 2012125483 | 9/2012 |
| WO | 2012125490 | 9/2012 |
| WO | 2012138488 | 10/2012 |
| WO | 2012151408 | 11/2012 |
| WO | 2012166602 | 12/2012 |
| WO | 2012166607 | 12/2012 |
| WO | 2013126314 | 8/2013 |
| WO | 2013192363 | 12/2013 |
| WO | 2014078152 | 5/2014 |
| WO | 2014078158 | 5/2014 |
| WO | 2014078160 | 5/2014 |
| WO | 2014078161 | 5/2014 |
| WO | 2014081680 | 5/2014 |
| WO | 2014085205 | 6/2014 |
| WO | 2014085206 | 6/2014 |
| WO | 2014113352 | 7/2014 |
| WO | 2014134236 | 9/2014 |
| WO | 2014134237 | 9/2014 |
| WO | 2014134239 | 9/2014 |
| WO | 2014134242 | 9/2014 |
| WO | 2014134247 | 9/2014 |
| WO | 2014137825 | 9/2014 |
| WO | 2014134244 | 11/2014 |
| WO | 2015030914 | 3/2015 |
| WO | 2015076893 | 5/2015 |
| WO | 2015134648 | 9/2015 |
| WO | 2016018904 | 2/2016 |

OTHER PUBLICATIONS

Exhibit 2007, U.S. Pat. No. 7,347,011 with markings filed in IPR2013-00067 on Aug. 19, 2013, 22 pages.
Decision Motion to Withdraw § 42.10(e) filed in IPR2013-00067 on Oct. 30, 2013, 3 pages.
Petitioner's Opposition to Patent Owner Motion to Amend filed in IPR2013-00067 on Nov. 12, 2013, 20 pages.
Exhibit 1015, Cross Examination Deposition of Raymond Tonkel filed in IPR2013-00067 on Nov. 12, 2013, 114 pages.
Exhibit 1016, Declaration of Sabut Adanur Ph.D. filed in IPR2013-00067 on Nov. 12, 2013, 57 pages.
Exhibit 1017, Excerpt of Knitted Fabrics filed in IPR2013-00067 on Nov. 12, 2013, 73 pages.
Exhibit 1018, Excerpt of Bharat J. Gaijar, Wrap Knit Fabrics filed in IPR2013-00067 on Nov. 12, 2013, 16 pages.
Exhibit 1019, J. Watel, the Milanese Machine: Little Progress Made in Development of Milanese Fabric filed in IPR2013-00067 on Nov. 12, 2013, 4 pages.
Exhibit 1023, Supplemental Declaration of Edward C. Frederick filed in IPR2013-00067 on Nov. 12, 2013, 18 pages.
Patent Owner's Reply to Petitioner's Opposition to Motion to Amend filed in IPR2013-00067 on Dec. 11, 2013, 9 pages.
Exhibit 2015, Excerpts from Celanese Corporation "Man-Made Fiber and Textile Dictionary" filed in IPR2013-00067 on Dec. 11, 2013, 5 pages.
Exhibit 2016, Excerpts from Hoechst Celanese "Dictionary of Fiber & Textile Technology" filed in IPR2013-00067 on Dec. 11, 2013, 4 pages.
Exhibit 2017, Excerpts from Celanese Corporation "Man-Made Fiber and Textile Dictionary" filed in IPR2013-00067 on Dec. 11, 2013, 10pages.

Exhibit 2018, Excerpts from Hoechst Celanese "Dictionary of Fiber & Textile Technology" filed in IPR2013-00067 on Dec. 11, 2013, 11 pages.
Exhibit 2020, transcript of Dec. 3, 2013, second cross-examination deposition of Edward C. Frederick filed in IPR2013-00067 on Dec. 11, 2013, 59 pages, 139 pages.
Exhibit 2021, transcript of Dec. 3, 2013, cross-examination deposition of Sabit Adanur filed in IPR2013-00067 on Dec. 11, 2013, 139 pages.
Petitioner's Motion to Exclude Evidence filed in IPR2013-00067 on Jan. 7, 2014, 8 pages.
Exhibit 2022, signature page for transcript of Dec. 3, 2013, Frederick deposition (Ex. 2020) filed in IPR2013-00067 on Jan. 7, 2014 1 page.
Exhibit 2023, signature page for transcript of Dec. 3, 2013, Adanur deposition (Ex. 2021) filed in IPR2013-00067 on Jan. 7, 2014, 1 page.
Order Trial Hearing filed in IPR2013-00067 on Jan. 13, 2014, 4 pages.
Patent Owner Opposition to Motion to Exclude filed in IPR2013-00067 on Jan. 21, 2014, 8 pages.
Order Conduct of the Proceeding § 4.25 filed in IPR2013-00067 on Jan. 23, 2014, 3 pages.
Petitioner's Reply to Patent Owner's Opposition to Petitioner's Motion to Exclude Evidence filed in IPR2013-00067 on Jan. 28, 2014, 8 pages.
Submission of Patent Owner's Trial Hearing Demonstratives filed in IPR2013-00067 on Feb. 6, 2014, 3 pages.
Patent Owner's Trial Hearing Demonstratives filed in IPR2013-00067 on Feb. 6, 2014, 47 pages.
Oral Hearing Transcript filed in IPR2013-00067 on Mar. 5, 2014, 41 pages.
Final Written Decision filed in IPR2013-00067 on Apr. 28, 2014, 43 pages.
Exhibit 3001 filed in IPR2013-00067 on Apr. 28, 2014, 3 pages.
Exhibit 3002 filed in IPR2013-00067 on Apr. 28, 2014, 4 pages.
Notice of Appeal filed in IPR2013-00067 on Jun. 30, 2014, 5 pages.
PCT/US2009/056795, International Search Report and Written Opinion dated Apr. 20, 2010, 16 pages.
PCT/US2012/028576, International Search Report and Written Opinion dated Oct. 1, 2012, 10 pages.
PCT/US2012/028534, International Search Report and Written Opinion dated Oct. 17, 2012, 14 pages.
PCT/US2012/028559, International Search Report and Written Opinion dated Oct. 19, 2012, 9 pages.
PCT/US2012/028534, International Preliminary Reporton Patentability dated Sep. 17, 2013, 8 pages.
PCT/US2012/028576, International Preliminary Reporton Patentability dated Sep. 17, 2013, 7 pages.
U.S. Appl. No. 14/257,668, filed Apr. 21, 2014, Tamm et al.
U.S. Appl. No. 14/257,706, filed Apr. 21, 2014, Tran et al.
U.S. Appl. No. 14/257,737, filed Apr. 21, 2014, Tamm et al.
Page 1 of Lyden Letter dated Apr. 21, 2010, redacted.
Eberle et al., Excerpt from Clothing Technology, 2002, 3 pages.
Compendium Warp Knitting, Sonderdruck, Karl Mayer GmbH, Aug. 1, 1978, 8 pages.
Duolastic—an elastic fabric sets new standards, HKS 1 MSU E-Magazine—weft elastic tricot machine, Sonderdruck, Karl Mayer GmbH, Aug. 4, 1989, 8 pages.
Fabric Pictures, www.karlmayer.com, Karl Mayer GmbH, undated, 7 pages.
Jacquard Rashchel machine for the Production of Curtains, Karl Mayer GmbH, Jan. 12, 1996, 4 pages.
Knitting Wear—SM8 Top 1, Santoni S.p.A., undated, 2 pages.
MRSS 42 SU: for producing the finest laces with ground in 22 dtex monofilaments, Sonderdruck, Karl Mayer GmbH, Aug. 4, 1988, 3 pages.
Multibar Jacquard Raschel Machine for Lace, Net Curtains and Patterned Elastic Products, Sonderdruck, Karl Mayer GmbH, Aug. 4, 1978, 6 pages.
Decision on Appeal in U.S. Reexam Application 95/001,320, filed as Exhibit 2008 in IPR2013-00067 on Aug. 19, 2013, 37 pages.

(56) References Cited

OTHER PUBLICATIONS

Anand et al., Technical Fabric Structures—2. Knitted Fabrics, Handbook of Technical Textiles, Woodhead Publishng, 2000, 5 pages.
Ebrlle et al., Clothing Technology, Sixth German Edition and Third English Edition, Veriag Europa-Lehrmittel, Nourney, Vollmer GmbH & Co., D-42781 Haa-Guriten, ISBN 3-8085-6223-4, Nov. 28, 2012, 3 pages.
European Patent Application No. 13161357.2, Extended European Search Report dated Aug. 5, 2013, 6 pages.
R. Shishoo, Chapter 16 of Textiles in Sport, filed as Exhibit 2004 in IPR2013-00067 on Nov. 28, 2012, 22 pages.
Decision Institution of Inter Partes Review 37 C.F.R. §42.108 in IPR2013-00067, entered May 17, 2013, 38 pages.
Declaration and Curriculum Vitae of Dr. Edward C. Frederick, filed as Exhibit 1001 in IPR2013-00067 on Nov. 28, 2012, 178 pages.
Declaration Edward C. Frederick with note, filed as Exhibit 2002 in IPR2013-00067 on Aug. 19, 2013, 23 pages.
Declaration of Raymond Tonkel, filed as Exhibit 2010 in IPR2013-00067 on Aug. 19, 2013, 101 pages.
Edward Frederick Deposition Transcript dated Jul. 23, 2013, filed as Exhibit 2009 in IPR2013-00067 on Aug. 19, 2013, 187 pages.
Errata Sheet from Edward Frederick Deposition dated Aug. 23, 2013, filed as Exhibit 2013 in IPR2013-00067 on Aug. 29, 2013, 1 page.
Excerpts from Man-Made Fiber and Textile Dictionary, filed as Exhibit 2012 in IPR2013-00067 on Aug. 19, 2013, 4 pages.
File History for U.S. Pat. No. 7,347,011, filed as Exhibit 1003 in IPR2013-00067 on Nov. 28, 2012, 201 pages.
Hunter, Billy, viewpoint: Nike Flyknit Quantum Leap for Flat Knitting, www.knittingindustry.com, Jul. 26, 2012, filed as Exhibit 1024 in IPR2013-00067 on Nov. 12, 2013, 5 pages.
Hunter, Billy, viewpoint: Nike Flyknit Ready, Steady, Go, www.knittingindustry.com, Jul. 31, 2012, filed as Exhibit 1025 in IPR2013-00067 on Nov. 12, 2013, 5 pages.
Notice of Filing Date Accorded to Petition and Time for Filing Patent Owner Preliminary Response, entered in IPR2013-00067 on Dec. 4, 2012, 8 pages.
Order Conduct of the Proceeding, entered in IPR2013-00067 on Jun. 19, 2013, 4 pages.
Order Conduct of the Proceeding, entered in IPR2013-00067 on Aug. 2, 2013, 5 pages.
Patent Owner Corrected Certificate of Service, filed in IPR2013-00067 on Aug. 19, 2013, 3 pages.
Patent Owner's Motion to Amend U.S. Pat. No. 7,347,011, filed in IPR2013-00067 on Aug. 19, 2013, 19 pages.
Patent Owner's Preliminary Response to Petition, filed in IPR2013-00067 on Feb. 28, 2013, 8 pages.
Petition for Inter Partes Review Under 35 U.S.C. 311-319 and 37 CFR 42.100 et seq., filed in IPR2013-00067 on Nov. 28, 2012, 66 pages.
Petitioner's Amended Notice of Cross Examination of Raymond Tonkel, filed in IPR2013-00067 on Nov. 1, 2013, 3 pages.
Petitioner's Opposition to Patent Owner's Motion to Amend, filed in IPR2013-00067 on Nov. 12, 2013, 20 pages.
Random House Webster Dictionary Excerpts, filed as Exhibit 2012 in IPR2013-00067 on Aug. 19, 2013, 4 pages.
Revised Petition for Inter Partes Review Under 35 U.S.C. §§ 311-319 and 37 C.F.R. § 42.100, filed in IPR2013-00067 on Dec. 10, 2012, 64 pages.
Supplemental Declaration Edward C. Frederick, filed as Exhibit 1023 in IPR2013-00067on Nov. 12, 2013, 18 pages.
U.S. Pat. No. 2,147,197 with markings, filed as Exhibit 2006 in IPR2013-00067 on Aug. 19, 2013, 5 pages.
U.S. Pat. No. 4,354,318, filed as Exhibit 2003 in IPR2013-00067on Aug. 19, 2013, 6 pages.
Spencer, Knitting Technology, Woodhead Publishing Limited, 1989 and 2001,413 pages.
Chinese Patent Application No. 2005800066703, Office Action dated Jun. 13, 2008, 17 pages.

Chinese Patent Application No. 2005800066703, Office Action dated Jul. 27, 2007, 18 pages.
Chinese Patent Application No. 2005800066703, Office Action dated Aug. 21, 2009, 19 pages.
Chinese Patent Application No. 2005800066703, Office Action dated Feb. 15, 2008, 6 pages.
Chinese Patent Application No. 2009101783949, Office Action dated May 13, 2011, 13 pages.
International Patent Application No. PCT/US2005/004776, International Search Report and Written Opinion dated May 19, 2005, 15 pages.
Chinese Patent Application No. 201410160252.0, Office Action, dated Jul. 13, 2015, 9 pages (No English translation available. A summary of the Office Action is provided in the Transmittal Letter submitted herewith).
*Robert M. Lyden v. adidas America, Inc., adidas AG, adidas International Marketing B.V., The Finish Line, Inc., and Dick's Sporting Goods, Inc.*, "Original Complaint", Case No. 3:14-CV-1586 MO, United States District Court, District of Oregon, Portland Division, filed Oct. 8, 2014, 54 pages.
Freshness Magazine (Youtube Video), "The Story Behind Nike Flyknit Technology", http://web.archive.org/web/20120225004803/http://www.freshnessmag.com/2012/02/21/the-story-behind-nike-flyknit-technology-video, published on Feb. 21, 2012, 3 pages (website screenshot submitted).
Reissue Patent Application No. RE95/002,094, "Patent Owner's Rebuttal Brief", filed Sep. 3, 2014, 40 pages.
Reissue Patent Application No. RE95/002,094, "Patent Owner's Rebuttal Brief", filed Sep. 22, 2014, 25 pages.
Underwood, Jenny, "The Design of 3D Shape Knitted Preforms", Ph.D. Thesis for School of Fashion and Textile, Design and Social Context Portfolio, RMIT University, Nov. 2009, 201 pages.
European Patent Application No. 14165043.2, European Search Report dated Nov. 26, 2014, 6 pages.
IPR2013-00067, Excerpts from Man-Made Fiber and Textile Dictionary, Exhibit 2011, Nov. 27, 2013, 12 pages.
Chinese Patent Application No. 201410160252.0, Office Action dated Mar. 9, 2016, 6 pages ((No English translation available. A summary of the Office Action is provided in the Transmittal Letter subniilled herewith).
ISO 8117:2003(E), "Textile Machinery—Knitting Machines—Nominal diameters of circular machines", Second Edition, Feb. 15, 2003, 6 pages.
Burall, Paul, "CoID Design Awards", Design, Jun. 1969, pp. 46-47.
IPR2016-00920, Petition for Inter Partes Review of U.S. Pat. No. 8,042,288 filed Apr. 19, 2016, 67 pages.
IPR2016-00920, Exhibit 1003, Declaration of Lenny M. Holden, Apr. 19, 2016, 166 pages.
IPR2016-00921, Petition for Inter Partes Review of U.S. Pat. No. 7,814,598 filed Apr. 19, 2016, 57 pages.
IPR2016-00922, Petition for Inter Partes Review of U.S. Pat. No. 8,266,749 filed Apr. 19, 2016, 67 pages.
IPR2016-00921 and IPR-00922, Exhibit 1003, Declaration of Lenny M. Holden, Apr. 19, 2016, 154 pages.
"From Fiber to Fabric: Silk", Clothing and Textiles, Utah State University Cooperative Extension, http://extension.usu.edu./files/publications/factsheet/FC_Clothing&Textiles_2012-25pr.pdf, 2011, 3 pages.
Office Action, Chinese Patent Application No. 201410160252.0, dated Sep. 13, 2016, 8 pages.
Photograph of Adizero Prime SP Olympia, 2012.
Photograph of Adios, 2012.
Buckley et al., "New Textile Concepts for Use in Control of Body Environments", Presented at RTO HFM Symposium on "Blowing Hot and Cold: Protecting Against Climatic Extremes", Dresden, Germany, Oct. 8-10, 2001, 7 pages.
Hong et al., "The Development of 3D Shaped Knitted Fabrics for Technical Purposes on a Flat Knitting Machine", Indian Journal of Fibre &Textile Research, vol. 19, pp. 189-194, Sep. 1994, 6 pages.
Lu et al. , "The Development of the Flat-Knitted Shaped Uppers Based on Ergonomics", AUTEX Research Journal, vol. 16, No. 2, pp. 67-74, Jun. 2016, 8 pages.

(56) References Cited

OTHER PUBLICATIONS

Petition for Inter Partes Review Under 35 U.S.C. §§ 311-319 and 37 C.F.R. § 42.100 ET SEQ. with Exhibit 1003, Declaration of Lenny M. Holden, Inter Partes Review No. 2017-00264, 165 pages.
Petition for Inter Partes Review Under 35 U.S.C. §§ 311-319 and 37 C.F.R. § 42.100 ET SEQ. with Exhibit 1003, Declaration of Lenny M. Holden, Inter Partes Review No. 2017-00263, Nov. 27, 2013, 132 pages.
Federal Circuit Case Nos. 18-1180 & 18-1181, Appellant's Reply in Support of Motion to Remand, Jun. 5, 2018, 16 pages.
Federal Circuit Case Nos. 18-1180 & 18-1181, Appellant's Motion for Remand to PTAB, May 24, 2018, 19 pages.
Federal Circuit Case Nos. 18-1180 & 18-1181, Appellee's Opposition to Motion to Remand to PTAB, Jun. 1, 2018, 21 pages.
Federal Circuit Case Nos. 18-1180 & 18-1181, Federal Circuit Decision to Remand to PTAB, Jul. 2, 2018, 4 pages.
Federal Circuit Case Nos. 18-1180 & 18-1181, Appellant's Reply Brief, May 1, 2018, 41 pages.
Federal Circuit Case Nos. 18-1180 & 18-1181, Appellee's Corrected Response Brief, Apr. 12, 2018, 75 pages.
Federal Circuit Case Nos. 18-1180 & 18-1181, Appellant's Opening Brief, Feb. 26, 2018, 79 pages.
IPR2016-00921 & IPR2016-00922, Exhibit 1013, Analyzing the Color, Design and Texture of Fabric, 8 pages.
IPR2016-00921 & IPR2016-00922, Exhibit 1014, Merriam-Webster Dictionary Definition of Impart, 11 pages.
IPR2016-00921 & IPR2016-00922, Exhibit 2004, Transcript of Deposition of Lenny Holden, 226 pages.
IPR2016-00921 & IPR2016-00922, Exhibit 3001, Random House Webster's College Dictionary Definition of Impart and Texture, 4 pages.
IPR2016-00921 & IPR2016-00922, Record of Oral Hearing, Jul. 26, 2017, 74 pages.
IPR2016-00921 & IPR2016-00922, Exhibit 1016, Adidas's Oral Hearing Demonstratives, 84 pages.
"Knitting Machine Wins Design Award—Textile Institute & Industry", EBSCO Host,Textile Institute & Industry, vol. 7, Issue 7, Jul. 1969, 3 pages.
Polyamide 6.6 Emana Yarn, 5 pages.
Aibibu et al., "Textile Cell-free Scaffolds for in Situ Tissue Engineering Applications", Journal of Materials Science Materials in Medicine, vol. 27, No. 3, Mar. 2016, 20 pages.
Atalay et al., "Knitted Strain Sensors: Impact of Design Parameters on Sensing Properties", Sensors, vol. 14, No. 3, 2014, 8 pages.
Atalay et al., "Textile-Based Weft Knitted Strain Sensors: Effect of Fabric Parameters on Sensor Properties, Sensors (Basel)", vol. 13, No. 8, Aug. 21, 2013, 6 pages.
Barton et al., "Development and Evaluation of a Tool for the Assessment of Footwear Characteristics", Journal of Foot and Ankle Research, vol. 2, 2009, 13 pages.
Office Action, German Patent Application No. 102013207163.9, date Aug. 9, 2017, 6 pages (see transmittal for summary).
Federal Circuit Case No. 14-1719, Appellant's Opening Brief to Federal Circuit, Dec. 15, 2014, 47 pages.
Federal Circuit Case No. 14-1719, Appellant's Reply Brief, May 27, 2015, 38 pages.
Federal Circuit Case No. 14-1719, Appellee's Response Brief to Federal Circuit, Apr. 10, 2015, 76 pages.
Federal Circuit Case No. 14-1719, Federal Circuit Decision, Feb. 11, 2016, 41 pages.
Federal Circuit Case No. 14-1719, Federal Circuit Mandate to PTAB, Apr. 4, 2016, 1 page.
Federal Circuit Case No. 14-1719, United States Patent and Trademark Office's Solicitor's Brief to Federal Circuit, Apr. 9, 2015, 27 pages.
Hamlin, "The Hamlin Cleanroom Bootie", MO-LA Inc., Technical Developments, vol. 18, Mar. 1993, 2 pages.
IPR2013-00067, Excerpts from Man-Made Fiber and Textile Dictionary, Exhibit 2011, Aug. 19, 2013, 12 pages.
IPR2013-00067, Decision on Remand, Sep. 18, 2018, 65 pages.
IPR2013-00067, Exhibit 1027, Petitioner's Oral Hearing Demonstratives Slides, 25 pages.
IPR2013-00067, Exhibit 3003, Email regarding Aqua Products Conference Call, 3 pages.
IPR2013-00067, Order Conduct of Remand Proceeding, Aug. 10, 2016, 4 pages.
IPR2013-00067, Patent Owner's Notice of Appeal, Jun. 30, 2014, 5 pages.
IPR2013-00067, Patent Owner's Response Brief, Nov. 16, 2017, 12 pages.
IPR2013-00067, Petitioner's Opening Brief, Nov. 6, 2017, 12 pages.
IPR2013-00067, Petitioner's Reply Brief on Remand, Nov. 22, 2017, 6 pages.
IPR2016-00920, Decision Denying Institution of Inter Partes Review, Oct. 20, 2016, 8 pages.
IPR2016-00921, Petitioner's Notice of Supplemental Evidence in Response to Patent Owner's Objection to Evidence, May 12, 2017, 4 pages.
IPR2016-00921, Decision on Institution of Inter Partes Review, Oct. 21, 2016, 24 pages.
IPR2016-00921, Final Written Decision, Oct. 19, 2017, 49 pages.
IPR2016-00921, Order Modifying Institution Decision and Granting Request for Additional Briefing, Aug. 24, 2018, 14 pages.
IPR2016-00921, Patent Owner's Objection to Admissability of Evidence, Apr. 28, 2017, 4 pages.
IPR2016-00921, Patent Owner's Response Brief, Jan. 23, 2017, 64 pages.
IPR2016-00921, Patent Owner's Response Brief Addressing the Newly Instituted Ground, Sep. 24, 2018, 14 pages.
IPR2016-00921, Petitioner's Brief Addressing Newly Instituted Ground, Sep. 10, 2018, 12 pages.
IPR2016-00921, Petitioner's Notice of Appeal, Nov. 13, 2017, 4 pages.
IPR2016-00921, Petitioner's Reply to Patent Owner Response, Apr. 21, 2017, 32 pages.
IPR2016-00922, Decision on Institution of Inter Partes Review, Oct. 21, 2016, 24 pages.
IPR2016-00922, Petitioner's Notice of Supplemental Evidence in Response to Patent Owner's Objections to Evidence 37 C.F.R. § 42.64(B)(1), May 12, 2017, 4 pages.
IPR2016-00922, Final Written Decision, Oct. 19, 2017, 52 pages.
IPR2016-00922, Order Modifying Institution Decision and Granting for Additional Briefing, Aug. 24, 2018, 14 pages.
IPR2016-00922, Patent Owner's Objection to Admissability of Evidence, Apr. 28, 2017, 4 pages.
IPR2016-00922, Patent Owner's Response Brief, Jan. 23, 2017, 66 pages.
IPR2016-00922, Patent Owner's Response Brief Addressing Newly Instituted Ground, Sep. 24, 2018, 14 pages.
IPR2016-00922, Petitioner's Brief Addressing Newly Instituted Ground, Sep. 10, 2018, 12 pages.
IPR2016-00922, Petitioner's Notice of Appeal, Nov. 13, 2017, 4 pages.
IPR2016-00922, Petitioner's Reply Brief, Apr. 21, 2017, 34 pages.
IPR2017-00263, Decision Denying Institution of Inter Partes Review, Jun. 7, 2017, 11 pages.
IPR2017-00263, Decision Denying Request for Rehearing, Jul. 20, 2017, 12 pages.
IPR2017-00263, Patent Owner's Corrected Preliminary Response, Mar. 27, 2017, 24 pages.
IPR2017-00263, Patent Owner's Preliminary Response, Mar. 9, 2017, 24 pages.
IPR2017-00263, Petitioner's Request for Rehearing, Jul. 7, 2017, 17 pages.
IPR2017-00264, Decision Denying Institution of Inter Partes Review, Jun. 7, 2017, 12 pages.
IPR2017-00264, Decision Denying Request for Rehearing, Jul. 20, 2017, 12 pages.
IPR2017-00264, Patent Owner's Corrected Preliminary Response, Mar. 27, 2017, 24 pages.
IPR2017-00264, Patent Owner's Preliminary Response, Mar. 9, 2017, 24 pages.

(56) References Cited

OTHER PUBLICATIONS

IPR2017-00264, Petitioner's Request for Rehearing, Jul. 7, 2017, 17 pages.
Office Action, Japanese Patent Application No. 2014-077349, dated Dec. 5, 2017, 4 pages.
Lo et al., "Effects of Custom-Made Textile Insoles on Plantar Pressure Distribution and Lower Limb Emg Activity During Turning", Journal of Foot and Ankle Research, vol. 9, Jul. 13, 2016, 11 pages.
Office Action, Japanese Patent Application No. 2014-077349, dated Mar. 14, 2017.
Saenz-Cogollo et al., "Pressure Mapping Mat for Tele-Home Care Applications", Sensors, vol. 16, No. 3, E365, Mar. 11, 2016, 9 pages.
Singh et al., "Medical Textiles as Vascular Implants and Their Success to Mimic Natural Arteries", Journal of functional biomaterials, vol. 6, No. 3, Sep. 2015, 15 pages.
Stoppa et al., "Wearable Electronics and Smart Textiles: A Critical Review", Sensors, vol. 14, No. 7, 2014, 20 pages.
Appellee Nike's Response to Citation of Supplemental Authority, Federal Circuit Case No. 19-1987, May 20, 2020, 3 pages.
Federal Circuit Case No. 19-1787, Appellant Adidas Citation of Supplemental Authority, May 15, 2020, 31 pages.
Federal Circuit Case Nos. 19-1787 and 19-1788, Opinion, Jun. 25, 2020, 8 pages.
Eberle, et al., "Clothing Technology", Third English Edition, 2002.
Federal Circuit Case No. 19-1262, Reply Brief of Appellant Nike, Inc., Sep. 13, 2019, 38 pages.
Federal Circuit Case No. 19-1262, Appellee Adidas AG's Response Brief, Aug. 9, 2019, 60 pages.
IPR 19-1787, Appellant Adidas AG's Opening Brief, Aug. 30, 2019, 319 pages.
Notice of Opposition, European Patent Application No. 13161357.2, Apr. 1, 2019, 49 pages.
Office Action, German Patent Application No. 102013207163.9, dated Jul. 25, 2019, 13 pages.
Federal Circuit Case No. 19-1787, Reply Brief for Appellant Adidas AG, Dec. 23, 2019, 40 pages.
Federal Circuit Case No. 19-1787, Joint Appendix, Dec. 30, 2019, 582 pages.
Federal Circuit Case No. 19-1787, Appellee Nike, Inc.'s Response Brief, Nov. 25, 2019, 77 pages.
Federal Circuit Case No. 19-1262, Appellant's Citation of Supplemental Authority Pursuant to Rule 28(j), Jan. 29, 2020, 11 pages.
Decision on Appeal, Federal Circuit Case No. 19-1262, Apr. 9, 2020, 17 pages.
Judgment, Federal Circuit Case No. 19-1262, Apr. 9, 2020, 1 page.
Office Action, Chinese Patent Application No. 201710471235.2, dated Mar. 10, 2020, 11 pages.
Chamberlain, "Knitted Fabrics", 1919, pp. 80-103, Sir Isaac Pitman & Sons, Ltd., London.
Chamberlain, "Principles of Machine Knitting", 1951, pp. 54-57, The Textile Institute, Manchester.
Wignall, "Knitting", 1964, pp. 99-101, 116-129, Pitman Publishing, London.
Office Action, German Patent Application No. 102013207163.9, dated Feb. 28, 2014, 9 pages.
Office Action, European Patent Application No. 14165043.2, dated Jun. 27, 2018, 5 pages.
IPR2013-00067, Exhibit 2024, Intervener's Petition for Panel Hearing, Appeal No. 2015-1928, Feb. 5, 2018, 38 pages.
IPR2013-00067, Patent Owner's Opening Brief on Second Remand, Aug. 20, 2020, 12 pages.
IPR2013-00067, Patent Owner's Reply Brief on Second Remand, Sep. 3, 2020, 7 pages.
IPR2013-00067, Petitioner's Opening Brief on Remand, Aug. 20, 2020, 12 pages.
IPR2013-00067, Petitioner's Response Brief on Remand, Sep. 3, 2020, 7 pages.
IPR2013-00067, Order—Conduct of the Proceeding on Remand, IPR Case No. 2013-00067, Jul. 24, 2020, 6 pages.
Final Written Decision on Remand, IPR2013-00067, Mar. 1, 2021, 40 pages.
Patent Owner's Notice of Appeal, IPR2013-00067, Apr. 26, 2021, 44 pages.
U.S. Appl. No. 14/257,668, Final Office Action, dated Feb. 1, 2019, 29 pages.
U.S. Appl. No. 14/257,737, Final Office Action, dated Jan. 2, 2019, 15 pages.
U.S. Appl. No. 14/619,586, Non-Final Office Action, dated Jan. 14, 2019, 10 pages.
Office Action, Chinese Patent Application No. 201710471235.2, dated Jun. 26, 2019, 14 pages.
IPR2016-00922, Petitioner adidas AG's Notice of Appeal, Apr. 19, 2019, 75 pages.
IPR2016-00922, Decision on Remand—35 USC 144 and 37 CFR 42.5(a), Feb. 19, 2019, 71 pages.
IPR2016-00921-00922, Transcript of Hearing Held Oct. 15, 2018, Oct. 17, 2018, 44 pages.
IPR2016-00921-00922, Petitioner's Demonstratives for Supplemental Oral Hearing, Nov. 7, 2018, 21 pages.
IPR2016-00921-00922, Patent Owner Nike's Demonstratives Jul. 11, 2017, 27 pages.
IPR2016-00921-00922, Nike's Demonstratives for Additional Oral Hearing Nov. 7, 2018, 21 pages.
IPR2016-00921-00922, Hearing Transcript, Nov. 29, 2018, 37 pages.
IPR2016-00921, Petitioner adidas AG's Notice of Appeal Apr. 19, 2019, 71 pages.
IPR2016-00921, Decision on Remand—35 USC 144 and 37 CFR42.5(a), Feb. 19, 2019, 67 pages.
IPR2013-00067, Nike's Notice of Appeal, Nov. 20, 2018, 69 pages.
Federal Circuit Case No. 19-1262, Principal Brief of Appellant Nike, Inc., May 17, 2019, 59 pages.

\* cited by examiner

LAYERED SHOE UPPER

CROSS REFERENCE TO RELATED APPLICATION

This application is related to and claims priority benefits from German Patent Application No. DE 10 2013 207 163.9, filed on Apr. 19, 2013, entitled UPPER ("the '163 application"). The '163 application is hereby incorporated herein in its entirety by this reference.

FIELD OF THE INVENTION

The present invention relates to an upper for a shoe, in particular a sports shoe.

BACKGROUND

In general, a shoe comprises an outer sole and an upper, which is attached to it. In particular, sports shoes further comprise in general a midsole, which is arranged between the upper and the outer sole, which is also called middle sole. The upper, the outer sole, and (as far as existing) the midsole are made of leather in classical shoes, and (as a general rule) are made of synthetic materials in sports shoes.

In particular, the uppers of sports shoes are often provided with specific functions. For instance, the outer surface of an upper may be required to be as water-repellent as possible. At the same time, the upper may need to be permeable to air, so that it is possible to provide air from outside to the foot. Furthermore, it may desirable that humidity is to be transferred away from the foot quickly. Besides these requirements, a shoe, in particular a sports shoe, is to provide optimum support without overly constricting the foot, i.e. the shoe is to be comfortable to wear.

Thus, the present invention is based on the problem of providing an upper for a shoe, in particular a sports shoe, which meets the above-mentioned requirements while being simple and cost-effective to manufacture.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an upper for a shoe comprises an outer layer comprising a first knitwear, and an inner layer comprising a second knitwear, wherein the first knitwear differs from the second knitwear with regard to at least one of a yarn used, a stitch structure, an alignment, and a form.

In some embodiments, the inner layer is substantially formed by the second knitwear.

In some embodiments, at least one of the first knitwear and the second knitwear is weft-knitted. In other embodiments, at least one of the first knitwear and the second knitwear is warp-knitted.

In some embodiments, the first knitwear comprises a more coarsely knitted stitch structure than the second knitwear.

In some embodiments, the second knitwear comprises a thinner yarn than the first knitwear. In certain embodiments, the second knitwear is more stretchable than the first knitwear. In some embodiments, the second knitwear comprises greater humidity absorbing properties than the first knitwear. In certain embodiments, the second knitwear comprises greater humidity wicking properties than the first knitwear.

According to certain embodiments, the second knitwear comprises a tongue area.

In some embodiments, the first knitwear comprises at least one opening through which the second knitwear is visible.

In some embodiments, first knitwear and the second knitwear are aligned relative to each other so that the upper comprises substantially isotropic stretchability. In further embodiments, the first knitwear and the second knitwear are aligned relative to each other so that a direction of greatest stretchability of the first knitwear is substantially perpendicular to a direction of greatest stretchability of the second knitwear. In some embodiments, the second knitwear is aligned so that a direction of greatest stretchability of the second knitwear is substantially perpendicular to a longitudinal axis of the upper. In certain embodiments, the first knitwear is aligned so that a direction of greatest stretchability of the first knitwear is substantially parallel to a longitudinal axis of the upper.

In some embodiments, the first knitwear and the second knitwear are aligned relative to each other so that courses of the first knitwear are substantially perpendicular to courses of the second knitwear.

In certain embodiments, the inner layer is detachably connected to the outer layer, and may further be detachably connected to the outer layer by a hook and loop fastener, a button, or lacing, in a form-fit or force-fit manner. In other embodiments, the inner layer is non-detachably connected to the outer layer.

According to certain embodiments of the present invention, a shoe comprises an upper comprising an outer layer comprising a first knitwear, an inner layer comprising a second knitwear, wherein the first knitwear differs from the second knitwear with regard to at least one of a yarn used, a stitch structure, an alignment, and a form, and a sole.

According to certain embodiments of the present invention, a method of manufacturing an upper comprises providing an outer layer comprising a first knitwear, and providing an inner layer comprising a second knitwear, wherein the first knitwear differs from the second knitwear with regard to at least one of a yarn used, a stitch structure, an alignment, and a form.

BRIEF DESCRIPTION OF THE DRAWINGS

In the following detailed description, embodiments of the invention are described referring to the following figures.

BRIEF DESCRIPTION

Figure 1A:
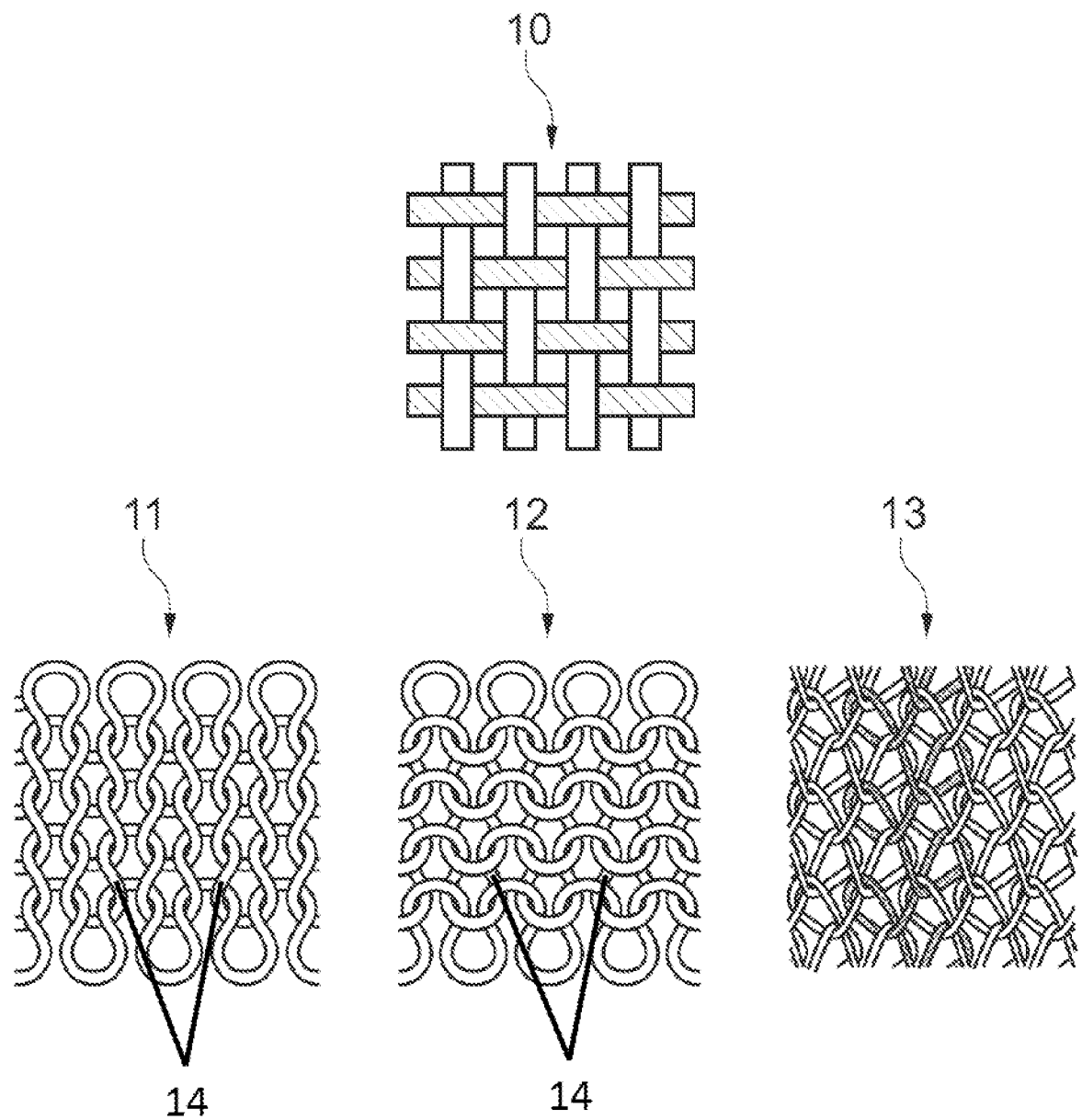
FIG. 1a is a schematic representation of textile structures, according to certain embodiments of the present invention.

According to certain embodiments of the present invention, an upper for a shoe, in particular a sports shoe, comprises an outer layer that comprises a first knitwear, and an inner layer that comprises a second knitwear, wherein the first knitwear differs from the second knitwear with respect to the yarn used and/or the stitch structure and/or the alignment and/or the shape.

Thus, the first knitwear differs from the second knitwear with regard to the used yarn. Additionally or alternatively, the first knitwear differs from the second knitwear with regard to the stitch structure. Further additionally or alternatively, the first knitwear differs from the second knitwear with regard to the alignment. Further additionally or alternatively, the first knitwear differs from the second knitwear with regard to the shape.

The stitch structure describes the type of connection and/or the design of the stitches. The type of connection is also called binding in the field of weft-knitting or warp-knitting, and it is also called interlacing in the field of multi-thread warp-knitting. For example, the design of the stitches comprises how tightly or widely the stitches are weft-knitted or warp-knitted.

The alignment of two pieces of knitwear can e.g. be determined by the alignment of their courses. If the direction of the courses of the first knitwear differs from the direction of the courses of the second knitwear, the alignment of the knitwear differs. The alignment of the knitwear may also be determined by the wales or the directions of greatest or smallest stretchability of the knitwear.

The shape of the first knitwear differs from the shape of the second knitwear, e.g. when both pieces of knitwear are not congruent. In this case, there is at least an area of the first knitwear which is not covered by the second knitwear, or vice versa.

By the arrangement of the outer and the inner layer and the different design of the knitwear in view of the yarn used and/or the stitch structure and/or the alignment and/or the shape, the above mentioned requirements may be achieved easily and cost effectively and according to the intended use of the shoe.

For example, in case of a shoe in which it is most important that it is water-repellent—e.g. in case of an outdoor shoe—the first knitwear of the outer layer may be weft-knitted or warp-knitted in a very close-meshed manner. At the same time, a water-repellent yarn may be used for the first knitwear. In order to increase the wear comfort, the second knitwear of the inner layer can comprise wider meshes in order to aerate the foot. At the same time, a yarn may be used for the second knitwear which comprises a high humidity transport in order to transport humidity away from the foot. In order to support these functions of the second knitwear of the inner layer, the outer layer may e.g. comprise openings or not fully cover the second knitwear of the inner layer. Alternatively or additionally, the outer layer may be spaced from the inner layer.

In case of a shoe which is particularly to provide support to the foot—for instance a running shoe or a climbing shoe—the first knitwear may comprise a particularly rigid yarn with low stretchability. This yarn may be manufactured in the first knitwear in a stitch structure with a particularly rigid and little stretchable binding. In contrast, the second knitwear of the inner layer may comprise a stretchable yarn, which is manufactured in an elastic binding or interlacing, for instance so called tricot binding. This yarn can moreover be designed such that it absorbs humidity and transports it away from the foot. In this way, the outer layer provides the necessary support to the foot, while the inner layer provides comfort to the foot due to its stretchability and the possibility of humidity transport. In order to support these functions of the second knitwear of the outer layer, the outer layer may e.g. comprise openings or not fully cover the second knitwear of the inner layer. Alternatively or additionally, the outer layer may be spaced from the inner layer.

In particular, in a climbing shoe, the first knitwear of the outer layer can additionally or alternatively comprise a rubberized yarn which increases the static friction of the outer layer.

A further example of the advantages of the present invention is the adaption of the shoe to different widths of feet by aligning the first and second knitwear with regard to each other. For example, the second knitwear of the inner layer may be aligned such that it comprises the highest stretchability in the lateral direction. By doing so, the inner layer automatically adapts itself to different widths of feet. The first knitwear of the outer layer may be aligned differently with regard to the second knitwear, for example such that it comprises the lowest stretchability in lateral direction. Due to this, the foot gets the necessary support in the lateral direction.

Still a further example relates to the abrasion resistance of the first and second knitwear. For example, in the case of a skateboard shoe the first knitwear of the outer layer could comprise a particularly abrasion-resistant yarn and a resilient stitch structure. In contrast, the second knitwear of the inner layer could comprise an elastic yarn, so that the inner layer is elastic and surrounds the foot rigidly in order to support it and provide it with support.

Furthermore, the invention allows for the inner layer to be provided with specific functions, for example humidity transport and aeration, while the outer layer may be adapted primarily completely to the optical requirements, that is, to the design for example. In this manner, the design may be decoupled from the function. For example, the first knitwear can comprise a different design or a different color than the second knitwear. The first knitwear of the outer layer can e.g. be weft-knitted or warp-knitted from a transparent monofilament so that the inner layer is visible towards the outside.

If the first knitwear differs from the second knitwear with regard to the shape according to the invention, both pieces of knitwear are not entirely congruent. For example, certain areas of the inner layer are visible from the outside. Due to this, zones with certain functions can specifically be achieved. Where the second knitwear of the inner layer is not covered by the first knitwear of the outer layer, the inner layer fulfills its respective function. Where the first knitwear of the outer layer is not covered by the second knitwear of the inner layer, the outer layer fulfills its respective function. Where the first knitwear and the second knitwear overlap, both pieces of knitwear fulfill their respective functions.

For example, the inner layer can comprise a thin weft-knitted fabric which is permeable to air, humidity-absorbing and elastic and it can completely surround the foot like a sock. The outer layer can comprise a more stable weft-knitted fabric and only cover the areas of the foot in which stability is required, such as the heel area, the midfoot area or the toe area. The areas between these areas, that is, e.g. the flexing zones, the tongue area and the upper toe area, are not covered by the weft-knitted fabric of the outer layer.

Further advantages of the present invention follow from the modular construction of an upper according to the invention. Thus, a customer can e.g. individually compile an upper from an inner layer and an outer layer. It is conceivable, for example, that they can select from an amount of outer layers with various degrees of stability and from an amount of inner layers with various thicknesses in this regard. It is also conceivable that they can select from respective different colors and designs of the outer and the inner layer.

It is a further possibility that the inner layer or the outer layer or both are individually adjusted for a customer. For example, the second knitwear of the inner layer could be more elastic than the first knitwear of the outer layer and thus exert compression on the foot. The intensity and distribution of the compression along the foot could be individually adjusted, for example in order to support certain areas of the foot, e.g. the midfoot area. The compression could for example be adjusted in the way of a bandage in case of injuries.

The modular setup furthermore reduces storage costs, since a wider model range may be manufactured from less parts due to the plurality of possible combinations of the inner and the outer layer.

The advantages mentioned by way of example are achieved by the arrangement of the inner and the outer layer in an upper and different design of their knitwear in view of the yarn used and/or the stitch structure and/or the alignment and/or the shape. In this regard, the use of knitwear allows for these advantages to be achieved simply and cost effectively.

It is covered by the solution according to the invention that the first knitwear differs from the second knitwear only with regard to the yarn used, that the first knitwear differs from the second knitwear only with regard to the stitch structure, that the first knitwear differs from the second knitwear only with regard to the alignment of the pieces of knitwear or that the first knitwear differs from the second knitwear only regard respect to the shape. In certain embodiments, the first knitwear may differ from the second knitwear with regard to any suitable combination of differences including but not limited to the yarn used, the stitch structure, the alignment of the pieces of knitwear, and the shape.

In some embodiments, the first knitwear and the second knitwear are weft-knitted and/or warp-knitted separately and connected subsequently. This supports the modular setup of the upper and allows virtually any desired combinations of the first and the second knitwear.

In other embodiments of the invention, both pieces of knitwear are weft-knitted or warp-knitted on a weft-knitting machine or a warp-knitting machine in one manufacturing step.

In some embodiments of the invention, the inner layer is substantially completely manufactured from the second knitwear. Due to this, the inner layer is able to completely surround the foot and perform its function, e.g. the transport of humidity—particularly along the sole—along the entirety of the foot.

The first knitwear may be weft-knitted. Additionally or alternatively, the second knitwear is weft-knitted. Weft-knitted knitwear may simply and specifically be provided with functional properties. For example, a weft-knitted second knitwear may be weft-knitted in a more open-meshed manner where the most humidity is generated on the foot in order to better aerate the foot there in a specific manner. The first knitwear and/or the second knitwear may be either flat weft-knitted or circular weft-knitted.

In other embodiments, the first knitwear is warp-knitted. Additionally or alternatively, the second knitwear is warp-knitted. By machine warp-knitting, the knitwear may be produced relatively rapidly and cost-effectively. The first knitwear and/or the second knitwear may be either flat warp-knitted or circular warp-knitted.

In some embodiments of the invention, the upper comprises an outsole that comprises knitwear. Thus, the upper surrounds the foot of a person wearing it substantially from all sides. In some embodiments, the knitwear of the outsole is formed as one piece with the first knitwear. In some embodiments, the knitwear of the outsole is additionally or alternatively formed as one piece with the second knitwear.

In some embodiments, the first knitwear comprises a thinner yarn than the second knitwear. Due to this, the first knitwear may be weft-knitted or warp-knitted in a more close-meshed manner, for example, so that the outer layer becomes more water-repellent.

In some embodiments of the invention, the first knitwear comprises a melt yarn. Such a yarn melts when it is heated above a specific temperature and hardens as it cools down. In this way, the rigidity of the outer layer may be increased. The second knitwear may comprise a soft yarn in these embodiments of the invention. This increases wear comfort in view of the first knitwear, which has been stiffened by the melt yarn. Abrasions and blisters may be prevented or inhibited.

In further embodiments of the invention, the first knitwear is post-treated, e.g. using a polymer coating. Additionally or alternatively, the second knitwear is post-treated, e.g. using a polymer coating. Due to this, both layers are specifically provided with functions, such as rigidity.

In further embodiments of the invention, the first knitwear comprises two or more layers. Additionally or alternatively, the second knitwear comprises two or more layers. For instance, the first knitwear and/or the second knitwear may be a spacer-weft-knitted fabric or a spacer-warp-knitted fabric, which, in turn, comprises at least two layers. In this manner, e.g. the outer layer and/or the inner layer may be designed thicker for heat isolation or padding.

In further embodiments of the invention, at least one member is arranged between the inner layer and the outer layer. This may be a heel cap, a reinforcement strip, a membrane or a lace eyelet, for example.

In some embodiments, the first knitwear comprises a substantially more coarse stitch structure than the second knitwear. By doing so, the requirement of air permeability may be met, since air may pass through coarse stitches more easily than tighter ones.

In some embodiments, the second knitwear absorbs humidity better and/or wicks it outside better than the first knitwear. Due to this, the humidity can quickly be transported away from the foot.

In some embodiments, the second knitwear comprises an area that assumes the function of a tongue. Due to this feature, the separate manufacture of a tongue and its connection with the upper may be eliminated. For example, this area may be designed thicker, e.g. as a spacer weft-knitted fabric or spacer warp-knitted fabric, than other areas of the inner layer.

In some embodiments, the first knitwear comprises at least one opening through which the second knitwear is visible, so that increased circulation of air is enabled. In some embodiments, the at least one opening is arranged in the upper toe area, in the area of the tongue, in the flexing zones or in the area of the shoe.

In some embodiments, the second knitwear is more stretchable than the first knitwear. Due to this, the inner layer adjusts to the foot, while the outer layer provides the foot with the necessary support.

In some embodiments, the first knitwear and the second knitwear are aligned relative to each other so that the upper comprises essentially isotropic stretchability. In this regard, essentially isotropic means that the stretchability of the upper is noticeably the same in all directions. By doing so, the foot gets optimum support in all directions.

In some embodiments, the first knitwear and the second knitwear are aligned relative to each other so that the direction of greatest stretchability of the first knitwear is essentially perpendicular on the direction of greatest stretchability of the second knitwear. By doing so, the stretchability of the upper in lateral direction and in longitudinal direction is noticeably the same, i.e. isotropic, so that the foot has a good seat in the shoe.

In some embodiments, the direction of highest stretchability of the first knitwear comprises an angle of 80° to 100° relative to the direction of greatest stretchability of the second knitwear, and may further comprise an angle of 85° to 95° relative to the direction of greatest stretchability of the second knitwear.

In some embodiments, the second knitwear is aligned such that the direction of greatest stretchability of the second knitwear is substantially perpendicular on a longitudinal axis of the upper. In this manner, the inner layer adjusts to different foot widths.

In some embodiments, the direction of highest stretchability of the second knitwear comprises an angle of 80° to 100°, and may further comprise an angle of 85° to 95°, on the longitudinal axis of the upper.

In some embodiments, the first knitwear is aligned so that the direction of greatest stretchability of the first knitwear runs essentially parallel to a longitudinal axis of the upper. Due to this, the foot gets the necessary support in the lateral direction.

In some embodiments, the direction of highest stretchability of the first knitwear comprises an angle of less than 10°, and may further comprise an angle of less than 5°, relative to the longitudinal axis of the upper.

In some embodiments, the first knitwear and the second knitwear are relative to each other so that the courses of the first knitwear are substantially perpendicular to the courses of the second knitwear. Since knitwear in general comprises a non-isotropic stretchability, the different stretchabilities compensate each other by this way of orientation, so that the upper comprises an essentially isotropic stretchability.

In some embodiments, the wales of the first knitwear comprise an angle of 80° to 100°, and may further comprise an angle of 85° to 95°, to the wales of the second knitwear.

Further preferably, the inner layer is detachably connected to the outer layer. Thus, the inner layer may be removed from the outer layer. This results in the possibility of choosing the inner layer corresponding to the requirements of the carrier of the shoe on the one hand. For example, the inner layer could rather support aeration of the foot during the warmer seasons, whereas a heat-insulating inner layer could be used during the colder seasons. On the other hand, the inner layer could be washed or replaced for hygienic reasons after a certain amount of time of carrying.

In some embodiments, the inner layer is connected to the outer layer by a hook-and-loop-fastener, a button, lacing, in a form-fit or force-fit manner. On the one hand, these kinds of fixations allow a secure grip of the inner layer on the outer layer and on the other hand the two layers may be easily detached from one another.

If a permanent connection of the two layers is desired, the following kinds of connections provide a simple but nevertheless safe fixation.

In some embodiments, the outer layer is sewn, glued, or welded to the inner layer. Alternatively, or additionally, the first knitwear is linked to the second knitwear or vice versa.

In some embodiments, the outer layer is connected to the inner layer at the edges. In some embodiments, both layers are already connected to each other during weft-knitting or warp-knitting. In some embodiments, both layers are connected to each other via a melt yarn.

In some embodiments of the invention, the first layer and the second layer are connected with an outer sole and or a midsole and/or a strobel sole. In this manner, the two layers are then connected to one another via one of the aforementioned soles.

In some embodiments, the inner layer is connected to a strobel sole and the outer layer is secured between the strobel sole and a midsole, e.g. glued or weft-knitted/linked on if the sole is also manufactured from knitwear.

A further aspect of the present invention relates to a shoe, in particular a sports shoe, comprising an upper as described before and a sole.

Yet a further aspect of the present invention relates to a method of manufacturing an afore-described upper, comprising the steps of: providing an outer layer which comprises a first knitwear and providing an inner layer which comprises a second knitwear, wherein the second knitwear differs from the first knitwear with regard to the yarn used and/or the stitch structure and/or the alignment and/or the shape.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, embodiments and variations of the present invention are described in more detail on the basis of an upper for a shoe, in particular a sports shoe.

The use of knitwear allows products such as an upper or a sole of a shoe, such as an insole, strobel sole, midsole and/or outer sole to be equipped with areas having different characteristics and providing different functions with low production effort. The properties include bendability, stretchability (expressed as Young's modulus, for example), permeability to air and water, thermoconductivity, thermal capacity, moisture absorption, static friction, abrasion resistance, hardness, and thickness, for example.

Various techniques are applied in order to achieve such characteristics or functions, which will be described in the following. Such suitable techniques in manufacturing knitwear include knitting techniques, the selection of fibers and yarns, coating the fibers, yarns or knitwear with polymer or other materials, the use of monofilaments, the combination of monofilaments and polymer coating, the application of fuse/melt yarns, and multi-layer textile material. In general, the yarns used for the manufacture of knitwear may be equipped, i.e. coated accordingly. In addition or alternatively, the finished knitwear may be equipped accordingly.

Another aspect of providing functions concerns the specific use of knitwear for certain areas of a product, for example of an upper or a sole, and the connection of different parts by suitable connection techniques. The mentioned aspects and techniques as well as other aspects and techniques will be explained in the following.

The described techniques may be used individually or they may be combined in any manner.

Knitwear

Knitwear used in the present invention is divided into weft-knitted fabrics and single-thread warp-knitted fabrics on the one hand and multi-thread warp-knitted fabrics on the other hand. The distinctive characteristic of knitwear is that it is formed of interlocking yarn or thread loops. These thread loops are also referred to as stitches and may be formed of one or several yarns or threads.

Yarn or thread are terms for a structure of one or several fibers which is long in relation to its diameter. A fiber is a flexible structure which is rather thin in relation to its length. Very long fibers, of virtually unlimited length with regard to their use, are referred to as filaments. Monofilaments are yarns formed of one single filament, that is, one single fiber.

In weft-knitted fabrics and single-thread warp-knitted fabrics, the stitch formation requires at least one thread or yarn, with the thread running in longitudinal direction of the product, i.e. substantially at a right angle to the direction in which the product is made during the manufacturing process. In multi-thread warp-knitted fabrics, the stitch formation requires at least one warp sheet, i.e. a plurality of so-called warps. These stitch-forming threads run in longitudinal direction, i.e. substantially in the direction in which the product is made during the manufacturing process.

FIG. 1a shows the basic difference between a woven fabric 10, weft-knitted fabrics 11 and 12, and a warp-knitted fabric 13. A woven fabric 10 has at least two thread sheets that are usually arranged at a right angle to one another. In this regard, the threads are placed above or underneath each other and do not form stitches. Weft-knitted fabrics 11 and 12 are created by knitting with one thread from the left to the right by interlocking stitches. View 11 shows a front view (also referred to as the front loop fabric side) and view 12 a back view (also referred to as the back loop fabric side) of a weft-knitted fabric 11, 12. The front loop and back loop product sides differ in the run of the legs 14. On the back loop fabric side 12, the legs 14 are covered in contrast to the front loop fabric side 11.

Figure 1B:
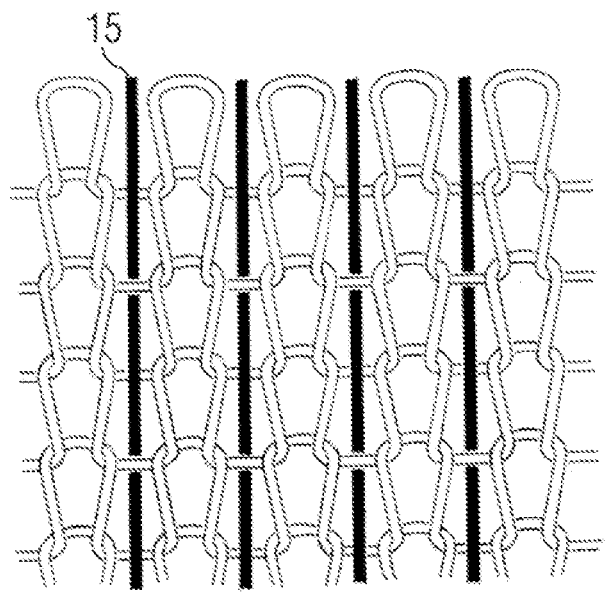
FIG. 1b is a schematic representation of a weft-knitted fabric with a filler yarn, according to certain embodiments of the present invention.

Certain embodiments of a weft-knitted fabric that may be used for the present invention with a filler yarn 15 is shown in FIG. 1b. A filler yarn 15 is a length of a thread placed between two wales in longitudinal direction, which is held by transverse threads of other weave elements. By the combination of the filler yarn 15 with other weave elements, the properties of the weft-knitted fabric are influenced or various pattern effects are achieved. Stretchability of the weft-knitted fabric in the direction of the wales may for example be reduced by a filler yarn 15.

Multi-thread warp-knitted fabric 13 is created by warp-knitting with many threads from top down, as shown in FIG. 1a. In doing so, the stitches of a thread are interlocked with the stitches of the neighboring threads. Depending on the pattern according to which the stitches of the neighboring threads are interlocked, one of the seven basic connections (also referred to as "interlaces" in multi-thread warp-knitting) pillar, tricot, 2×1 plain, satin, velvet, atlas and twill are created, for example.

Figure 2:
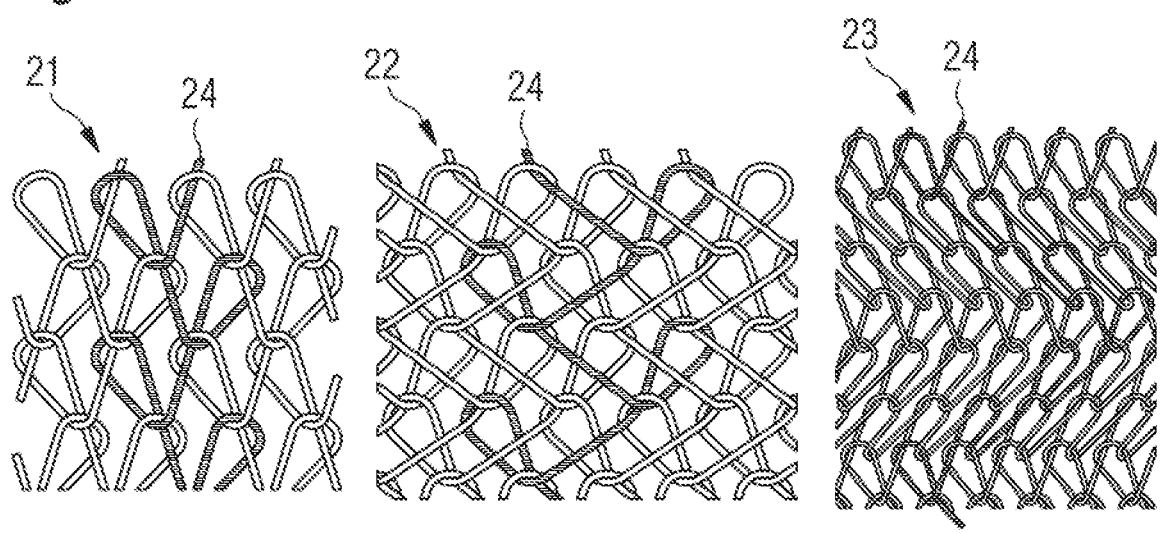
FIG. 2 are schematic representations of various interlaces of a warp-knitted fabric, according to certain embodiments of the present invention.

By way of example, the interlaces tricot 21, 2×1 plain 22, and atlas 23 are shown in FIG. 2. A different interlocking results depending on how the stitches of thread 24, which is highlighted by way of example, are interlocked in the stitches of neighboring threads. In the tricot interlace 21, the stitch-forming thread zigzags through the knitwear in the longitudinal direction and binds between two neighboring wales. The 2×1 plain interlace 22 binds in a manner similar to that of the tricot interlace 21, but each stitch-forming warp skips a wale. In the atlas interlace 23, each stitch-forming warp runs to a turning point in a stairs-shape and then changes direction.

Figure 3:
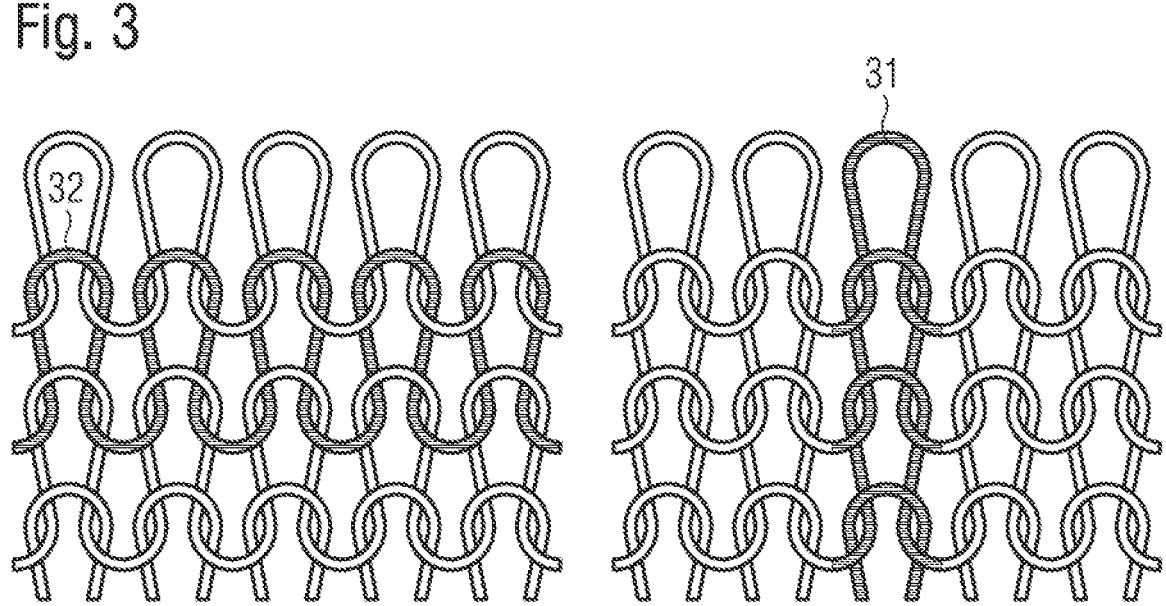
FIG. 3 are schematic representations of weft-knitted fabrics, according to certain embodiments of the present invention.

Stitches arranged above each other with joint binding sites are referred to as wales. FIG. 3 shows a wale as an example of a weft-knitted fabric 31. The term wale is also used analogously in warp-knitted fabrics. Accordingly, wales run vertically through the mesh fabric. Rows of stitches arranged next to one another, as shown by way of example for a weft-knitted fabric 32 in FIG. 3 are referred to as courses. The term course is also used analogously in warp-knitted fabrics. Accordingly, courses run through the mesh fabric in the lateral direction.

Figure 4:
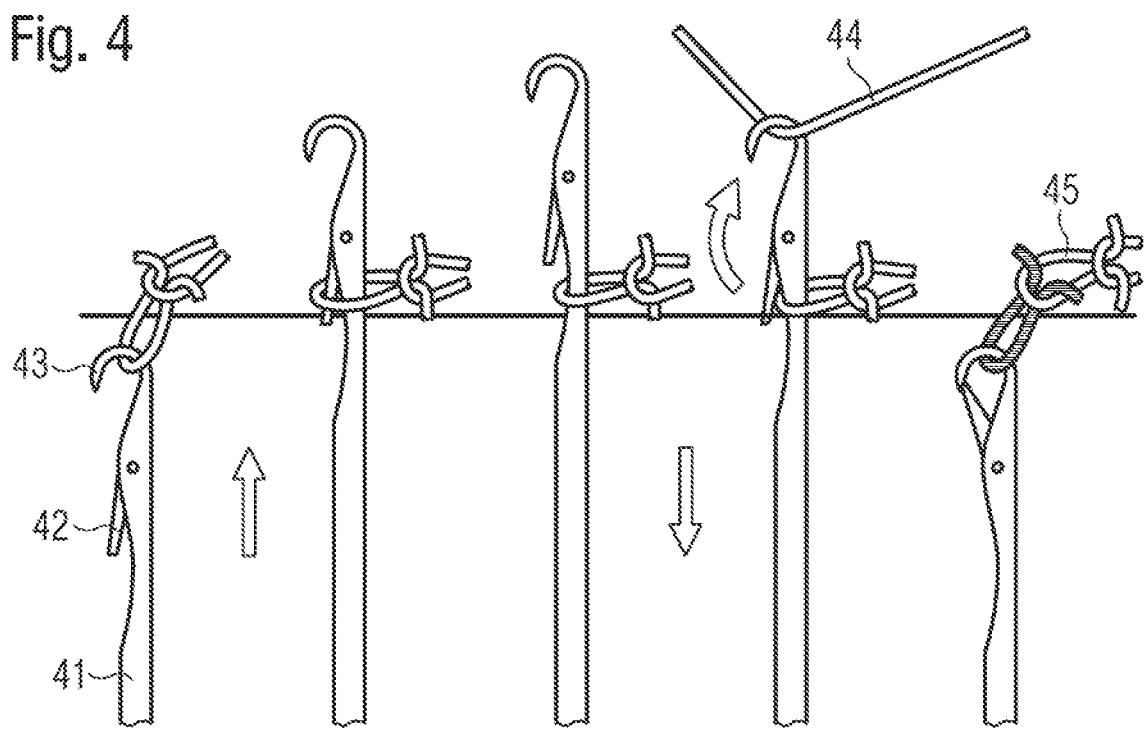
FIG. 4 are illustrations showing a process of stitch forming by latch needles during weft-knitting, according to certain embodiments of the present invention.

Three basic weft-knitted structures are known in weft-knitted fabrics, which may be recognized by the run of the stitches along a wale. With plain, single Jersey, only back loops may be recognized along a wale on one side of the fabric and only back loops may be recognized along the other side of the product. This structure is created on one row of needles of a knitting machine, i.e. an arrangement of neighboring knitting needles, and also referred to as single Jersey. With rib fabric, front and back loops alternate within a course, i.e. either only front or back loops may be found along a wale, depending on the side of the product from which the wale is considered. This structure is created on two rows of needles with needles offset opposite each other. With purl fabric, front and back loops alternate in one wale. Both sides of the product look the same. This structure is manufactured using latch needles as illustrated in FIG. 4 by stitch transfer. The transfer of stitches may be avoided if double latch needles are used, which comprise both a hook and a latch at each end.

In many embodiments, a variety of structures and surfaces that may be created with knitwear, which may or may not also be possible with weaving. It is possible to manufacture both very heavy and/or stiff knitwear and very soft, transparent and/or stretchable knitwear with substantially the same manufacturing technique. The parameters by which the properties of the material may be influenced substantially are the pattern of weft-knitting or warp-knitting, the used yarn, the needle size or the needle distance, and the tensile strain subject to which the yarn is placed on the needles.

In certain embodiments of weft-knitting, yarns may be weft-knitted in at freely selectable places. In this manner, selected zones may be provided with certain properties. For example, an upper for a soccer shoe may be provided with zones made from rubberized yarn in order to achieve higher static friction and thus enable the player to better control the ball. With certain yarns being weft-knitted in at selected places, no additional elements have to be applied.

Knitwear is manufactured on machines in the industrial context. These machines usually comprise a plurality of needles. In weft-knitting, latch needles 41 are usually used, which may comprise a moveable latch 42, as illustrated in FIG. 4. This latch 42 closes the hook 43 of the needle 41 so that a thread 44 may be pulled through a stitch 45 without the needle 41 being caught on the stitch 45. In weft-knitting, the latch needles 41 are usually moveable individually, so that every single needle 41 may be controlled so that it catches a thread for stitch formation.

A differentiation is made between flat-knitting and circular-knitting machines. In flat-knitting machines, a thread feeder feeds the thread back and forth along a row of needles. In a circular-knitting machine, the needles are arranged in a circular manner and the thread feeding correspondingly takes place in a circular movement along one or more round rows of needles.

Instead of a single row of needles, it is also possible for a knitting machine to comprise two parallel rows of needles. When looked at from the side, the needles of the two rows of needles may, for example, be opposite each other at a right angle. This enables the manufacture of more elaborate structures or weaves. The use of two rows of needles allows the manufacture of a one-layered or two-layered weft-knitted fabric. A one-layered weft-knitted fabric is created when the stitches generated on the first row of needles are enmeshed with the stitches generated on the second row of needles. Accordingly, a two-layered weft-knitted fabric is created when the stitches generate on the first row of needles are not or only selectively enmeshed with the stitches generated on the second row of needles and/or if they are merely enmeshed at the end of the weft-knitted fabric. If the stitches generated on the first row of needles are loosely enmeshed only selectively with the stitches generated on the second row of needles by an additional yarn, this is also referred to as spacer weft-knitted fabric. The additional yarn, for example a monofilament, is thus guided back and forth between two layers, so that a distance between the two layers is created. The two layers may e.g. be connected to each other via a so-called tuck stitch.

Generally, the following weft-knitted fabrics may thus be manufactured on a weft-knitting machine: If only one row of needles is used, a one-layered weft-knitted fabric may be created. When two rows of needles are used, the stitches of both rows of needles may consistently be connected to each other so that the resulting knitwear comprises a single layer. If the stitches of both rows of needles are not connected or only connected at the edge when two rows of needles are used or are only selectively connected in certain locations, two layers are created. If the stitches of both rows of needles are connected selectively in turns by an additional thread, a spacer weft-knitted fabric is created. The additional thread is also referred to as spacer thread and it may be fed via a separate yarn feeder.

In certain embodiments, single-thread warp-knitted fabrics may be manufactured by jointly moved needles. In other embodiments, single-thread warp-knitted fabrics needles may be manufactured by fixing the needles and moving the fabric to create the relative motion between the needles and the fabric. In contrast to weft-knitting, the needles are typically not moved individually. Similar to weft-knitting, there are flat single thread warp-knitting and circular single thread warp-knitting machines.

In multi-thread warp-knitting, one or several coiled threads, i.e. threads which are coiled next to one another, are used. In stitch formation, the individual warps are placed around the needles and the needles are moved jointly.

The techniques described herein as well as further aspects of the manufacture of knitwear may be found in "Fachwissen Bekleidung", 6th ed. by H. Eberle et al. (published with the title "Clothing Technology" in English), in "Textil- and Modelexikon", 6th ed. by Alfons Hofer and in "Maschenlexikon", 11th ed. by Walter Holthaus, for example.

Three-Dimensional Knitwear

Three-dimensional (3D) knitwear may also be manufactured on weft-knitting machines and warp-knitting machines, particularly on flat-knitting machines. This is knitwear comprises a spatial structure although it is weft-knitted or warp-knitted in a single process. A three-dimensional weft-knitting or warp-knitting technique allows for spatial knitwear to be manufactured without seams, cut or manufacture in one piece and in a single process.

Three-dimensional knitwear may, for example, be manufactured by varying the number of stitches in the direction of the wales by partial courses being formed. The corresponding mechanical process is referred to as "needle parking". Depending on the requirement, this technique may be combined with structural variations and/or variations of the number of stitches in the direction of the course. When partial courses are formed, stitch formation temporarily occurs only along a partial width of the weft-knitted fabric or warp-knitted fabric. The needles which are not involved in the stitch formation keep the half stitches ("needle parking") until weft-knitting occurs again at this position. In this way, it is possible to form bulges, for example.

By three-dimensional weft-knitting or warp-knitting, an upper may be adjusted to the cobbler's last or the foot and a sole may be profiled, for example. The tongue of a shoe may e.g. be weft-knitted into the right shape. Contours, structures, knobs, curvatures, notches, openings, fasteners, loops and pockets may be integrated into the knitwear in a single process.

Three-dimensional knitwear may be used for the present invention in an advantageous manner.

Functional Knitwear

According to certain embodiments of the present invention, knitwear and particularly weft-knitted fabric may be provided with a range of functional properties and used in the present invention.

It is possible using a weft-knitting technique to manufacture knitwear having different functional areas and simultaneously maintaining its contours. The structures of knitwear may be adjusted to functional requirements in certain areas, by the stitch pattern, the yarn, the needle size, the needle distance or the tensile strain subject to which the yarn is placed on the needles being selected accordingly.

It is possible, for example, to include structures with large stitches or openings within the knitwear in areas in which airing is desired. In contrast, in areas in which support and stability are desired, fine-meshed stitch patterns, stiffer yarns or even multi-layered weft-knitting structures may be used, which will be described in the following. In the same manner, the thickness of the knitwear is variable.

Knitwear having more than one layer provides numerous possible constructions for the knitwear, which provide many advantages. Knitwear with more than one layer, e.g. two, may be weft-knitted or warp-knitted on a weft-knitting machine or a warp-knitting machine with several rows of needles, e.g. two, in a single stage, as described in the section "knitwear" above. Alternatively, several layers, e.g. two, may be weft-knitted or warp-knitted in separate stages and then placed above each other and connected to each other if applicable, e.g. by sewing, gluing, welding or linking.

Several layers fundamentally increase solidness and stability of the knitwear. In this regard, the resulting solidness depends on the extent to which and the techniques by which the layers are connected to each other. The same yarn or different yarns may be used for the individual layers. For example, it is possible in a weft-knitted fabric for one layer to be weft-knitted from multi-fiber yarn and one layer to be weft-knitted from monofilament, whose stitches are enmeshed. In particular, stretchability of the weft-knitted layer is reduced due to this combination of different yarns. In this construction, a layer made from monofilament may be arranged between two layers made from multi-fiber yarn in order to reduce stretchability and increase solidness of the knitwear. This results in a pleasant surface made from multi-fiber yarn on both sides of the knitwear.

An alternative of two-layered knitwear is referred to as spacer weft-knitted fabric or spacer warp-knitted fabric, as explained in the section "knitwear". In this regard, a spacer yarn is weft-knitted or warp-knitted more or less loosely between two weft-knitted or warp-knitted layers, interconnecting the two layers and simultaneously serving as a filler. The spacer yarn may comprise the same material as the layers themselves, e.g. polyester or another material. The spacer yarn may also be a monofilament which provides the spacer weft-knitted fabric or spacer warp-knitted fabric with stability.

Such spacer weft-knitted fabrics or spacer warp-knitted fabrics, respectively, which are also referred to as three-dimensional weft-knitted fabrics, which are differentiated from the formative 3D weft-knitted fabrics or 3D warp-knitted fabrics mentioned in the section "three-dimensional knitwear" above, may be used wherever additional cushioning or protection is desired, e.g. at the upper or the tongue of an upper or in certain areas of a sole. Three-dimensional structures may also serve to create spaces between neighboring textile layers or also between a textile layer and the foot and thus ensure airing. Moreover, the layers of a spacer weft-knitted fabric or a spacer warp-knitted fabric may comprise different yarns depending on the position of the spacer weft-knitted fabric on the foot.

The thickness of a spacer weft-knitted fabric or a spacer warp-knitted fabric may be set in different areas depending on the function or the wearer. Various degrees of cushioning may be achieved with areas of various thicknesses, for example. Thin areas may increase bendability, for example, thus fulfilling the function of joints or flex lines.

Moreover, the layers of a spacer weft-knitted fabric may comprise different yarns depending on the position of the spacer weft-knitted fabric on the foot. In this way, knitwear may be provided with two different colors for the front and the back, for example. An upper made from such knitwear may then comprise a different color on the outside than on the inside.

Other multi-layered constructions may include pockets or tunnels, in which two textile layers or knitwear weft-knitted or warp-knitted on two rows of needles are connected to each other only in certain areas so that a hollow space is created. Alternatively, items of knitwear weft-knitted or warp-knitted in two separate processes are connected to each other such that a void is created, e.g. by sewing, gluing, welding or linking. It is then possible to introduce a cushioning material such as a foam material, eTPU (expanded thermoplastic urethane), ePP (expanded polypropylene), expanded EVA (ethylene vinyl acetate) or particle foam, an air or gel cushion for example, through an opening, e.g. at the tongue, the upper, the heel, the sole or in other areas. Alternatively or additionally, the pocket may also be filled with a filler thread or a spacer knitwear. It is furthermore possible for threads to be pulled through tunnels, for example as reinforcement in case of tension loads in certain areas of an upper. Moreover, it is also possible for the laces to be guided through such tunnels. Moreover, loose threads may be placed into tunnels or pockets for padding, for example in the area of the ankle. However, it is also possible for stiffer reinforcing elements, such as caps, flaps or bones to be inserted into tunnels or pockets. These may be manufactured from plastic such as polyethylene, TPU, polyethylene or polypropylene, for example.

A further possibility for a functional design of knitwear is the use of certain variations of the basic weaves. In weft-knitting, it is possible for bulges, ribs or waves to be weft-knitted in certain areas, for example, in order to achieve reinforcement in these places. A wave may, for example, be created by stitch accumulation on a layer of knitwear. This means that more stitches are weft-knitted or warp-knitted on one layer than on another layer. Alternatively, different stitches are weft-knitted fabric on the one layer than on the other layer, e.g. by being weft-knitted fabric tighter, wider or using a different yarn. Thickening is caused in both alternatives.

Ribs, waves, or similar patterns may, for example, also be used at the bottom of a weft-knitted outer sole of a shoe in order to provide a tread and provide the shoe with better non-slip properties. In order to obtain a rather thick weft-knitted fabric, for example, it is possible to use the weft-knitting techniques "tuck" or "half cardigan", which are described in "Fachwissen Bekleidung", 6th ed. by H. Eberle et al., for example.

Waves may be weft-knitted or warp-knitted such that a connection is created between two layers of a two-layered knitwear or such that no connection is created between the two layers. A wave may also be weft-knitted as a right-left wave on both sides with or without a connection of the two layers. A structure in the knitwear may be achieved by an uneven ration of stitches on the front or the back of the knitwear.

A further possibility of functionally designing knitwear within the framework of the present invention is providing openings in the knitwear already during weft-knitting or warp-knitting. Embodiments in the course of the present invention, which may be combined with other embodiments, refer to an insole that comprises knitwear. The embodiments may also be applied to a strobel sole, however. The embodiments may equally be applied to an outer sole. An insole, strobel sole, or outer sole is generally arranged above a midsole. The midsole may comprise cushioning properties. The midsole may e.g. comprise a foam material. Other suitable materials are eTPU (expanded thermoplastic urethane), ePP (expanded polypropylene), expanded EVA (ethylene vinyl acetate) or particle foam, for example.

The knitwear of the insole, strobel sole, or outer sole comprises at least one opening which is weft-knitted or warp-knitted in already during weft-knitting or warp-knitting of the knitwear, respectively. The at least one opening enables the foot of a wearer of a shoe to be able to directly touch the midsole. This improves the cushioning properties of the shoe on the whole, so that the thickness of the midsole may be reduced.

In some embodiments, the at least one opening is arranged in the area of the calcaneus. An arrangement in this position has a particularly positive effect on the cushioning properties. A different position of the at least one opening is also possible.

In certain embodiments, functionally designing knitwear within the framework may include forming laces integrally with the knitwear of an upper. In these embodiments, the upper comprises knitwear and the laces are warp-knitted or weft-knitted as one piece with the knitwear already when the knitwear of the upper is weft-knitted or warp-knitted. In this regard, a first end of a lace is connected to the knitwear, while a second end is free.

In some embodiments, the first end is connected to the knitwear of the upper in the area of the transition from the tongue to the area of the forefoot of the upper. In these embodiments, a first end of a first lace may be connected to the knitwear of the upper at the medial side of the tongue and a first end of a second lace is connected to the knitwear of the upper at the lateral side of the tongue. The respective second ends of the two laces may then be pulled through lace eyelets for tying the shoe.

A possibility of speeding up the integral weft-knitting or warp-knitting of laces is having all yarns used for weft-knitting or warp-knitting knitwear end in the area of the transition from the tongue to the area of the forefoot of the upper. In some embodiments, the yarns may end in the medial side of the upper on the medial side of the tongue and form the lace connected on the medial side of the tongue. In certain embodiments, the yarns may end in the lateral side of the upper on the lateral side of the tongue and form the lace connected to the lateral side of the tongue. The yarns may then be cut off at a length that is sufficiently long for forming laces. The yarns may be twisted or intertwined, for example. The respective second end of the laces may be provided with a lace clip. Alternatively, the second ends are fused or provided with a coating.

The knitwear is particularly stretchable in the direction of the stitches (longitudinal direction) due to its construction. This stretching may be reduced e.g. by subsequent polymer coating of the knitwear. The stretching may also be reduced during manufacture of the knitwear itself. One possibility is reducing the mesh openings, that is, using a smaller needle size. Smaller stitches generally result in less stretching of the knitwear. Fine-meshed knitwear may e.g. be used at an upper (also referred to as shoe upper). Moreover, the stretching of the knitwear may be reduced by weft-knitted reinforcements, e.g. three-dimensional structures. Such structures may be arranged on the inside or the outside of an upper. Furthermore, non-stretchable yarn, e.g. made from nylon, may be laid in a tunnel along the knitwear in order to limit stretching to the length of the non-stretchable yarn.

Colored areas with several colors may be created by using a different thread and/or by additional layers. In transitional areas, smaller mesh openings (smaller needle sizes) are used in order to achieve a fluent passage of colors.

Further effects may be achieved by weft-knitted insets (inlaid works) or Jacquard knitting. Inlaid works are areas which only provide a certain yarn, e.g. in a certain color. Neighboring areas which may comprise a different yarn, for example in a different color, are then connected to each other by a so-called tuck stitch.

During Jacquard knitting, two rows of needles are used and two different yarns run through all areas, for example. However, in certain areas only one yarn appears on the visible side of the product and the respective other yarn runs invisibly on the other side of the product.

A product manufactured from knitwear may be manufactured in one piece on a weft-knitting machine or a warp-knitting machine. Functional areas may then already be manufactured during weft-knitting or warp-knitting by corresponding techniques as described here.

Alternatively, the product may be combined from several parts of knitwear and it may also comprise parts that are not manufactured from knitwear. In this regard, the parts of knitwear may each be designed separately with different functions, for example regarding thickness, isolation, transport of moisture, etc.

An upper and/or a sole may, for example, be generally manufactured from knitwear as a whole or it may be put together from different parts of knitwear. A whole upper or parts of that may, for example, be separated, e.g. punched, from a larger piece of knitwear. The larger piece of knitwear may, for example, be a circular weft-knitted fabric or a circular warp-knitted fabric or a flat weft-knitted fabric or a flat warp-knitted fabric.

For example, a tongue may be manufactured as a continuous piece and connected with the upper subsequently, or it may be manufactured in one piece with the upper. With regard to their functional designs, ridges on the inside may e.g. improve flexibility of the tongue and ensure that a distance is created between the tongue and the foot, which provides additional airing. Laces may be guided through one or several weft-knitted tunnels of the tongue. The tongue may also be reinforced with polymer in order to achieve stabilization of the tongue and e.g. prevent a very thin tongue from convolving. Moreover, the tongue may then also be fitted to the shape of the cobbler's last or the foot.

In an upper, it is possible for only the front part to be manufactured from knitwear, for example. The remainder of the upper may comprise a different textile and/or material, such as a woven fabric, for example. The front part may e.g. be located only in the area of the toes, extend beyond the toe joints or into the midfoot area. Alternatively, the back part of an upper may be manufactured from knitwear in the area of the heel, for example, and e.g. be additionally reinforced with polymer coating. In general, any desired areas of an upper or a sole may be manufactured as knitwear.

Applications such as polyurethane (PU) prints, thermoplastic polyurethane (TPU) ribbons, textile reinforcements, leather, etc., may be applied to knitwear subsequently. Thus, in an upper which comprises knitwear in its entirety or in parts, a plastic heel or toe cap as reinforcement or logos and eyelets for laces may be applied on the upper, for example by sewing, gluing or welding, as described below.

Sewing, gluing or welding, for example, constitute suitable connection techniques for connecting individual knitwear with other textiles or with other knitwear. Linking is another possibility for connecting two pieces of knitwear. Therein, two edges of knitwear are connected to each other according to the stitches (usually stitch by stitch).

A possibility for welding textiles, particularly ones made from plastic yarns or threads, is ultrasonic welding. Therein, mechanical oscillations in the ultrasonic frequency range are transferred to a tool referred to as a sonotrode. The oscillations are transferred to the textiles to be connected by the sonotrode under pressure. Due to the resulting friction, the textiles are heated up, softened and ultimately connected in the area of the place of contact with the sonotrode. Ultrasonic welding allows rapidly and cost-effectively connecting particularly textiles with plastic yarns or threads. It is possible for a ribbon to be attached, for example glued, to the weld seam, which additionally reinforces the weld seam and is optically more appealing. Moreover, wear comfort is increased since skin irritations—especially at the transition to the tongue—are avoided.

Figure 5A:
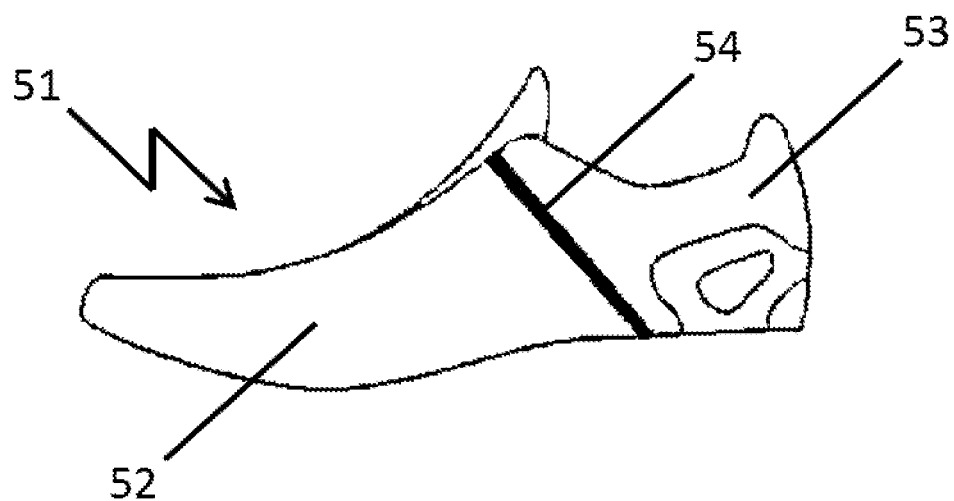
FIG. 5a is a side view of an upper with two connected textile areas, according to certain embodiments of the present invention.
Figure 5B:
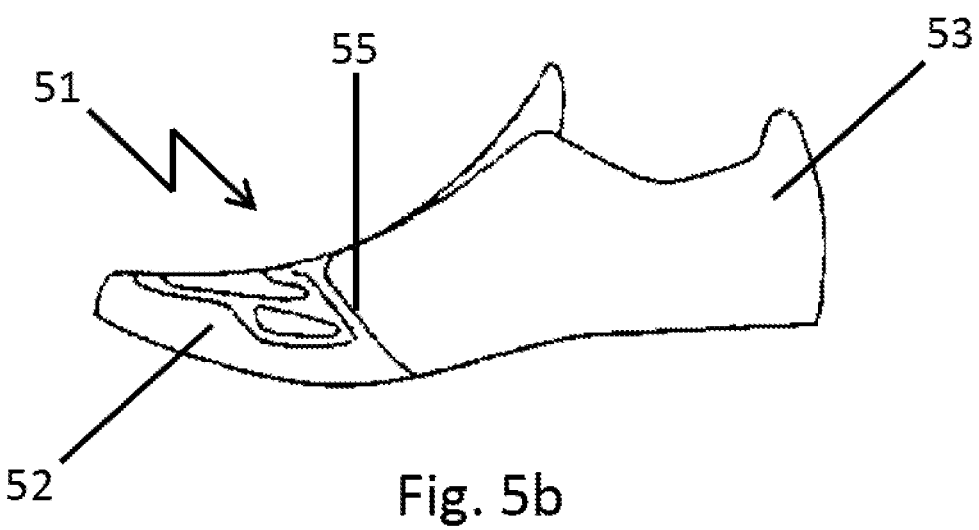
FIG. 5b is a side view of an upper with two connected textile areas, according to certain embodiments of the present invention.

Connecting various textile areas may occur at quite different locations. For example, the seams for connecting various textile areas of an upper may be arranged at various positions, as shown in FIGS. 5a and 5b. An upper 51 is shown in FIG. 5a which comprises two textile areas 52 and 53. They are sewn to each other. The seam 54 which connects the two textile areas 52 and 53 runs diagonally from an instep area of the upper to an area of the sole in the transition area from the midfoot to the heel. In FIG. 5b the seam 55 also runs diagonally, but it is arranged more to the front in the direction of the toes. Other arrangements of seams and connecting places in general are conceivable. The seams shown in FIGS. 5a and 5b may each be a thread seam, a glued seam, a welded seam or a linking seam. The two seams 54 and 55 may each be mounted only on one side of the upper 51 or on both sides of the upper.

In certain embodiments, adhesive tape may be used to connect textile areas. This feature may also be used in addition to an existing connection, e.g. over a sewn seam or a welded seam. An adhesive tape may fulfill further functions in addition to the function of connecting, such as e.g. protection against dirt or water. An adhesive tape may comprise properties which change over its length.

Figure 6A:
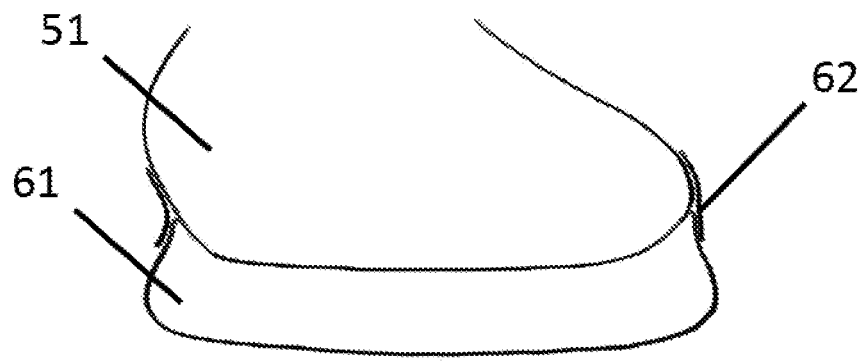
FIGS. 6a-6c are cross-sectional views of an upper connected to a shoe sole via adhesive tape, according to certain embodiments of the present invention.
Figure 6B:
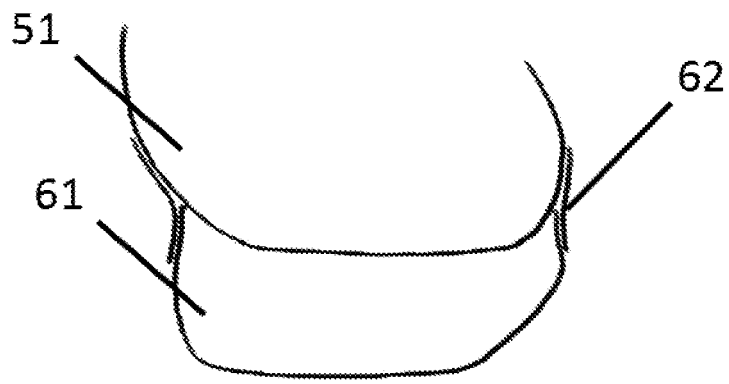
Figure 6C:
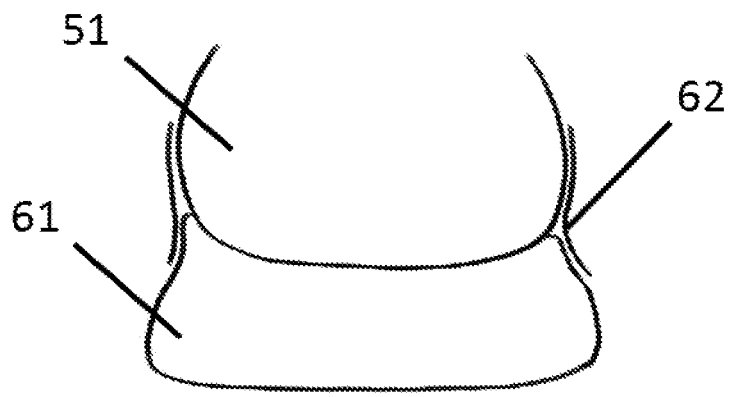

Embodiments of an upper 51 connected to a shoe sole 61 using adhesive tape are shown in FIGS. 6a, 6b, and 6c. Each of FIGS. 6a, 6b, and 6c shows a cross-section of a shoe depicting different positions of the foot and the resulting deformation of the shoe. For example, tensile forces work on the right side of the shoe in FIG. 6a, whereas compression forces work on the left side.

The shoe sole 61 may be an outer sole or a midsole. The upper 51 and the shoe sole 61 are connected to each other by a surrounding adhesive tape 62. The adhesive tape 62 may be of varying flexibility along its length. For example, the adhesive tape 62 might be particularly rigid and not very flexible in the shoe's heel area in order to provide the shoe with the necessary stability in the heel area. This may be achieved by varying the width and/or the thickness of the adhesive tape 62, for example. The adhesive tape 62 may generally be constructed such that it is able to receive certain forces in certain areas along the tape. In this way, the adhesive tape 62 does not only connect the upper to the sole but simultaneously fulfills the function of structural reinforcement.

Fibers

The yarns or threads, respectively, used for knitwear of the present invention usually comprise fibers. As was explained above, a flexible structure which is rather thin in relation to its length is referred to as a fiber. Very long fibers, of virtually unlimited length with regard to their use, are referred to as filaments. Fibers are spun or twisted into threads or yarns. Fibers may also be long, however, and twirled into a yarn. Fibers may include natural or synthetic materials. Natural fibers are environmentally friendly, since they are compostable. Natural fibers include cotton, wool, alpaca, hemp, coconut fibers or silk, for example. Among the synthetic fibers are polymer-based fibers such as nylon, polyester, elastane, or spandex, respectively, or Kevlar® or other para-aramid synthetic fiber, which may be produced as classic fibers or as high-performance fibers or technical fibers.

It is conceivable that a shoe be assembled from various parts, with a weft-knitted or a warp-knitted part comprising natural yarn made from natural fibers and a removable part, e.g. the insole, comprising plastic, for example. In this manner, both parts may be disposed of separately. In this example, the weft-knitted part could be directed to compostable waste, whereas the insole could be directed to recycling of reusable materials, for example.

Figure 7:
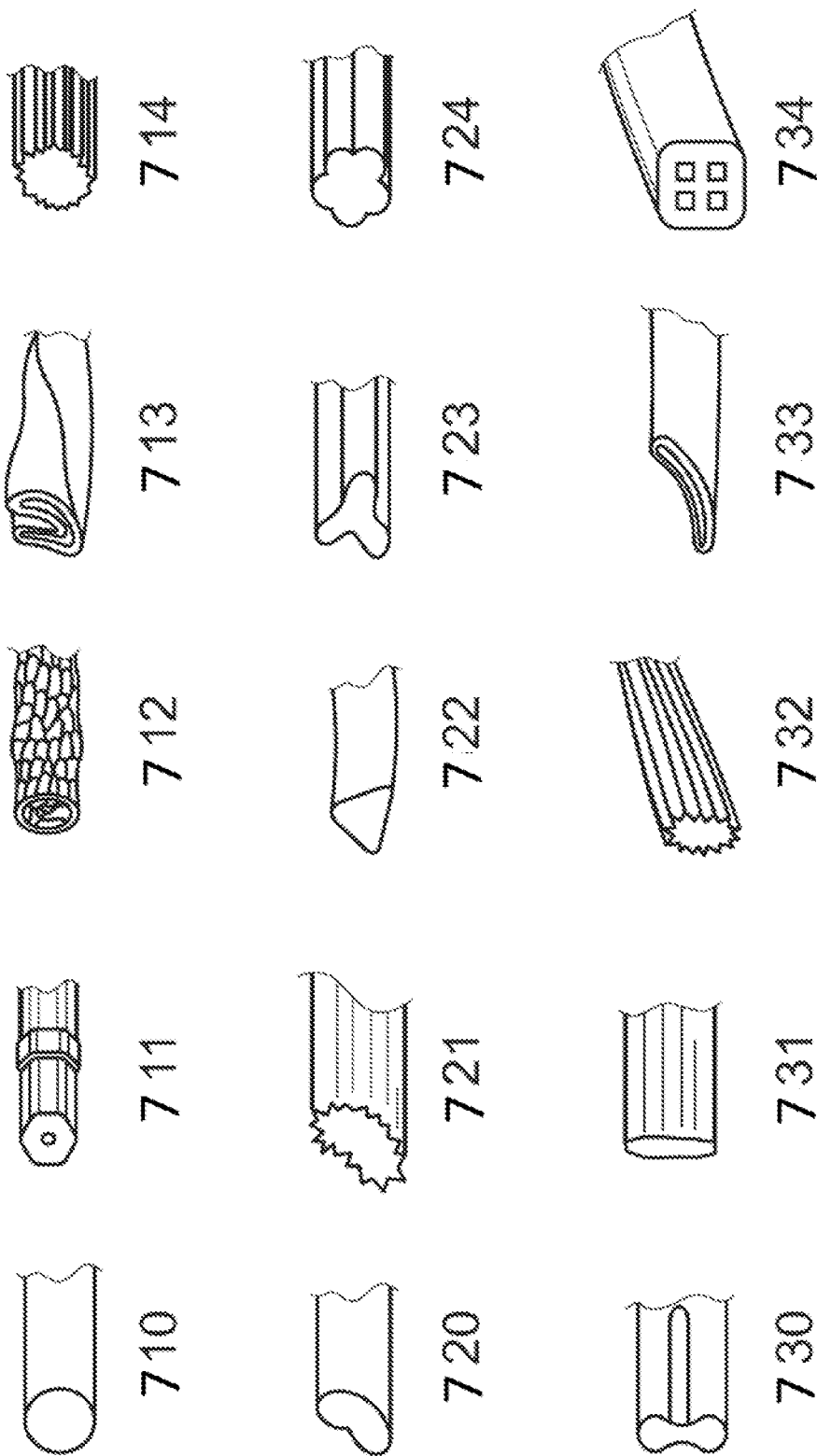
FIG. 7 are cross-sectional views of fibers for yarns used in knitwear, according to certain embodiments of the present invention.

The mechanical and physical properties of a fiber and the yarn manufactured therefrom are also determined by the fiber's cross-section, as illustrated in FIG. 7. These different cross-sections, their properties and examples of materials having such cross-sections will be explained in the following.

A fiber having the circular cross-section 710 may either be solid or hollow. A solid fiber is the most frequent type, it allows easy bending and is soft to the touch. A fiber as a hollow circle with the same weight/length ratio as the solid fiber has a larger cross-section and is more resistant to bending. Examples of fibers with a circular cross-section are nylon, polyester, and Lyocell.

A fiber having the bone-shaped cross-section 730 has the property of wicking moisture. Examples for materials for such fibers are acrylic and spandex. The concave areas in the middle of the fiber support moisture being passed on in the longitudinal direction, with moisture being rapidly wicked from a certain place and distributed.

The following further cross-sections are illustrated in FIG. 7:

polygonal cross-section 711 with nodes; example: flax;
oval to round cross-section 712 with overlapping portions; example: wool;
flat, oval cross-section 713 with expansion and convolution; example: cotton;
circular, serrated cross-section 714 with partial striations; example: rayon;
lima bean cross-section 720; smooth surface;
serrated lima bean cross-section 721; example: Avril™ rayon;
triangular cross-section 722 with rounded edges; example: silk;
trilobal star cross-section 723; like triangular fiber with shinier appearance;
clubbed cross-section 724 with partial striations; sparkling appearance; example: acetate;

flat and broad cross-section 731; example: acetate in another design;

star-shaped or concertina cross section 732;

cross-section 733 in the shape of a collapsed tube with a hollow center; and

Square cross-section 734 with voids; example: AnsoIV™ nylon.

Individual fibers with their properties which are relevant for the manufacture of knitwear for the present invention will be described in the following:

aramid fibers: good resistance to abrasion and organic solvents; non-conductive; temperature-resistant up to 500° C.

para-aramid fibers: known under trade names Kevlar®, Techova™, and Twaron™; outstanding strength-to-weight properties; high Young's modulus and high tensile strength (higher than with meta-aramides); low stretching and low elongation at break (approx. 3.5%); difficult to dye.

meta-aramides: known under trade names Numex™, Teijinconex™, New Star™, X-Fiper™.

dyneema fibers: highest impact strength of any known thermoplastics; highly resistant to corrosive chemicals, with exception of oxidizing acids; extremely low moisture absorption; very low coefficient of friction, which is significantly lower than that of nylon and acetate and comparable to Teflon®; self-lubricating; highly resistant to abrasion (15 times more resistant to abrasion than carbon steel); nontoxic.

carbon fiber: an extremely thin fiber about 0.005-0.010 mm in diameter, composed substantially of carbon atoms; highly stable with regard to size; one yarn is formed from several thousand carbon fibers; high tensile strength; low weight; low thermal expansion; very strong when stretched or bent; thermal conductivity and electric conductivity.

glass fiber: high ratio of surface area to weight; by trapping air within them, blocks of glass fibers provide good thermal insulation; thermal conductivity of 0.05 W/(m×K); the thinnest fibers are the strongest because the thinner fibers are more ductile; the properties of the glass fibers are the same along the fiber and across its cross-section, since glass has an amorphous structure; correlation between bending diameter of the fiber and the fiber diameter; thermal, electrical and sound insulation; higher stretching before it breaks than carbon fibers.

Yarns

A plurality of different yarns may be used for the manufacture of knitwear according to certain embodiments in the present invention. As was already defined, a structure of one or several fibers which is long in relation to its diameter is referred to as a yarn.

Functional yarns are capable of transporting moisture and thus of absorbing sweat and moisture. They may be electrically conducting, self-cleaning, thermally regulating and insulating, flame resistant, and UV-absorbing, and may enable infrared radiation. They may be suitable for sensors. Antibacterial yarns, such as silver yarns, for example, prevent odor formation.

Stainless steel yarn contains fibers made of a blend of nylon or polyester and steel. Its properties include high abrasion resistance, high cut resistance, high thermal abrasion, high thermal and electrical conductivity, higher tensile strength and high weight.

In textiles made from knitwear, electrically conducting yarns may be used for the integration of electronic devices. These yarns may, for example, forward impulses from sensors to devices for processing the impulses, or the yarns may function as sensors themselves, and measure electric streams on the skin or physiological magnetic fields, for example. Examples for the use of textile-based electrodes may be found in European patent application EP 1 916 323.

Melt yarns may be a mixture of a thermoplastic yarn and a non-thermoplastic yarn. There are substantially three types of melt yarns: a thermoplastic yarn surrounded by a non-thermoplastic yarn; a non-thermoplastic yarn surrounded by thermoplastic yarn; and pure melt yarn of a thermoplastic material. After being heated to the melting temperature, thermoplastic yarn fuses with the non-thermoplastic yarn (e.g. polyester or nylon), stiffening the knitwear. The melting temperature of the thermoplastic yarn is determined accordingly and it is usually lower than that of the non-thermoplastic yarn in case of a mixed yarn.

A shrinking yarn is a dual-component yarn. The outer component is a shrinking material, which shrinks when a defined temperature is exceeded. The inner component is a non-shrinking yarn, such as polyester or nylon. Shrinking increases the stiffness of the textile material.

A further yarn for use in knitwear are luminescent or reflecting yarns and so-called "intelligent" yarns. Examples of intelligent yarns are yarns which react to humidity, heat or cold and alter their properties accordingly, e.g. contracting and thus making the stitches smaller or changing their volume and thus increasing permeability to air. Yarns made from piezo fibers or yarn coated with a piezo-electrical substance are able to convert kinetic energy or changes in pressure into electricity, which may provide energy to sensors, transmitters or accumulators, for example.

Yarns may furthermore generally be reworked, e.g. coated, in order to maintain certain properties, such as stretching, color or humidity resistance.

Polymer Coating

Due to its structure, weft-knitted or warp-knitted knitwear is considerably more flexible and stretchable than weaved textile materials. For certain applications and requirements, e.g. in certain areas of an upper or a sole according to the present invention, it is therefore necessary to reduce flexibility and stretchability in order to achieve sufficient stability.

For that purpose, a polymer layer may be applied to one side or both sides of knitwear (weft-knit or warp-knit goods), but generally also to other textile materials. Such a polymer layer causes a reinforcement and/or stiffening of the knitwear. In an upper it may e.g. serve the purpose of supporting and/or stiffening and/or reducing elasticity in the toe area, in the heel area, along the lace eyelets, on lateral and/or medial surfaces or in other areas. Furthermore, elasticity of the knitwear and particularly stretchability are reduced. Moreover, the polymer layer protects the knitwear against abrasion. Furthermore, it is possible to give the knitwear a three-dimensional shape using the polymer coating by compression-molding.

In the first step of polymer coating, the polymer material may applied to one side of the knitwear. It may also be applied on both sides, however. The material may be applied by spraying, knife coating, laying, printing, sintering, ironing or spreading. If it is polymer material in the form of a film, the latter is placed on the knitwear and connected with the knitwear by heat and pressure, for example. Spraying may be carried out by a tool similar to a hot glue gun. Spraying enables the polymer material to be applied evenly in thin layers. Moreover, spraying is a fast method. Effect pigments such as color pigments, for example, may be mixed into the polymer coating.

According to certain embodiments, the polymer is applied in at least one layer with a thickness of 0.2-1 mm. One or several layers may be applied, with it being possible for the layers to be of different thicknesses and/or colors. Between neighboring areas with polymer coating of various thicknesses there may be continuous transitions from areas with a thin polymer coating to areas with a thick polymer coating. In the same manner, different polymer materials may be used in different areas, as will be described in the following.

During application, polymer material attaches itself to the points of contact or points of intersection, respectively, of the yarns of the knitwear, on the one hand, and to the gaps between the yarns, on the other hand, forming a closed polymer surface on the knitwear after the processing steps described in the following. However, in case of larger mesh openings or holes in the textile structure, this closed polymer surface may also be intermittent, e.g. so as to enable airing. This also depends on the thickness of the applied material: The more thinly the polymer material is applied, the easier it is for the closed polymer surface to be intermittent. Moreover, the polymer material may also penetrate the yarn and soak it and thus contributes to its stiffening.

After application of the polymer material, the knitwear is pressed in a press under heat and pressure. The polymer material liquefies in this step and fuses with the yarn of the textile material.

In a further optional step, the knitwear may be pressed into a three-dimensional shape in a machine for compression-molding. For example, the area of the heel or the area of the toes of an upper may be shaped three-dimensionally over a cobbler's last. Alternatively, the knitwear may also be directly fitted to a foot.

After pressing and molding, the reaction time until complete stiffening may be one to two days, depending on the used polymer material.

The following polymer materials may be used: polyester; polyester-urethane pre-polymer; acrylate; acetate; reactive polyolefins; co-polyester; polyamide; co-polyamide; reactive systems (mainly polyurethane systems reactive with $H_2O$ or $O_2$); polyurethanes; thermoplastic polyurethanes; and polymeric dispersions.

A suitable range for viscosity of the polymer material is 50-80 Pa s (pascal second) at 90-150° C., which may further include a range of 15-50 Pa s (pascal second) at 110-150° C.

A suitable range for the hardness of the hardened polymer material is 40-60 Shore D. Depending on the application, other ranges of hardness are also conceivable.

The described polymer coating may be used sensibly wherever support functions, stiffening, increased abrasion resistance, elimination of stretchability, increase of comfort and/or fitting to prescribed three-dimensional geometries are desired. It is also conceivable to fit e.g. an upper to the individual shape of the foot of the person wearing it, by polymer material being applied to the upper and then adapting to the shape of the foot under heat.

Monofilaments for Reinforcement

As was already defined, a monofilament is a yarn formed by one single filament, that is, one single fiber. Therefore, in certain embodiments, stretchability of monofilaments is considerably lower than that of yarns which are manufactured from many fibers. This also reduces the stretchability of knitwear that is manufactured from monofilaments or include monofilaments and which are used in the present invention. Monofilaments are typically made from polyamide. However, other materials, such as polyester or a thermoplastic material, would also be conceivable.

So whereas knitwear made from a monofilament is considerably more rigid and less stretchable, this knitwear may not include the desired surface properties, such as e.g. smoothness, colors, transport of moisture, outer appearance and variety of textile structures as usual knitwear has. This disadvantage is overcome by the knitwear described in the following.

Figure 8:
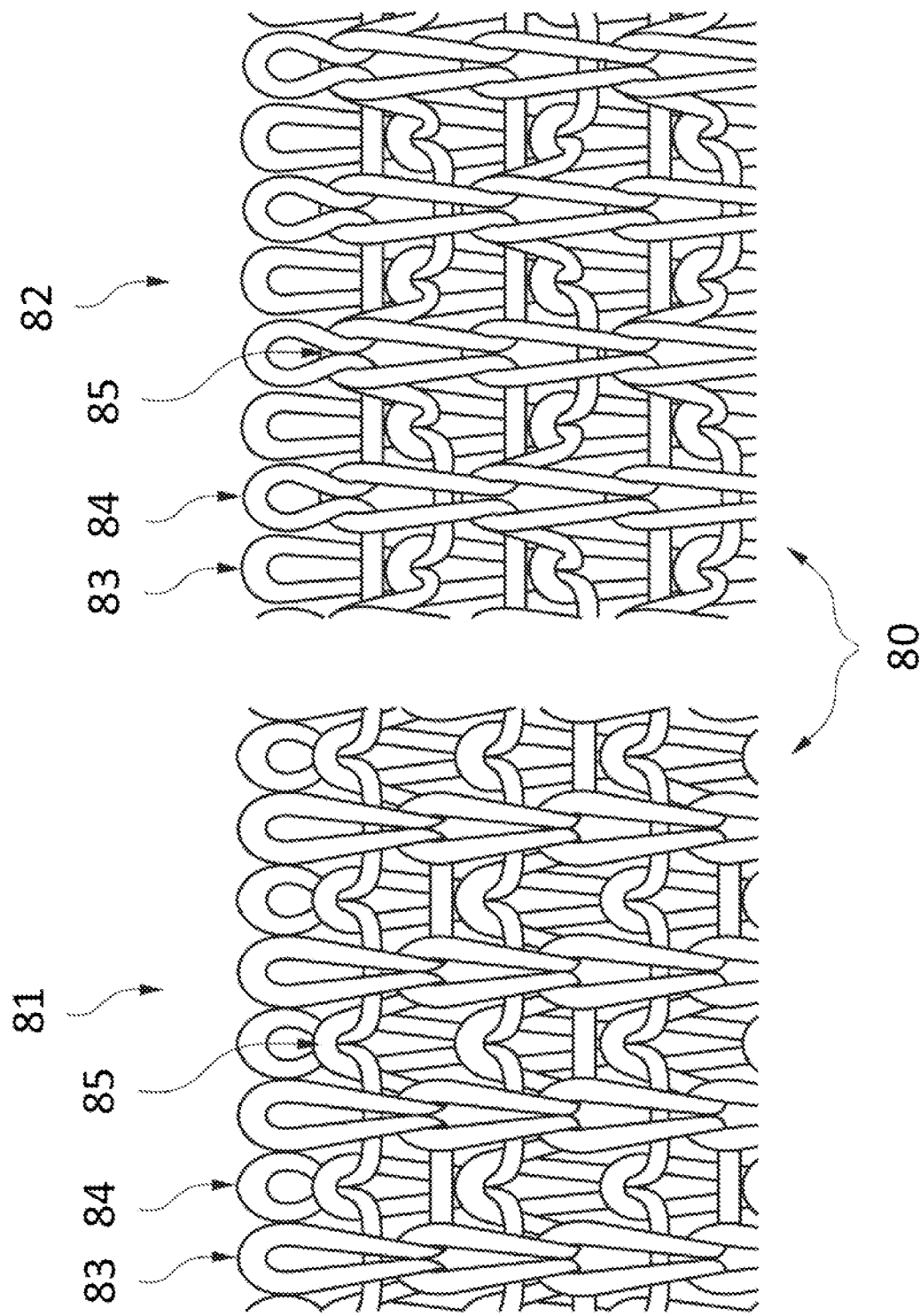
FIG. 8 is a front view and a back view of a knitwear, according to certain embodiments of the present invention.

FIG. 8 depicts a weft-knitted fabric having a weft-knitted layer made from a first yarn, such as a multi-fiber yarn, for example, and a weft-knitted layer made from monofilament. The layer of monofilament is weft-knitted into the layer of the first yarn. The resulting two-layered knitwear is considerably more solid and less stretchable than the layer made from yarn alone. If a monofilament melts slightly, the monofilament fuses with the first yarn even better.

FIG. 8 particularly depicts a front view 81 and a back view 82 of a two-layered knitwear 80. Both views show a first weft-knitted layer 83 made from a first yarn and a second weft-knitted layer 84 made from monofilament. The first weft-knitted layer 83 made from a first yarn is connected to the second weft-knitted layer 84 by stitches 85. Thus, the greater solidness and smaller stretchability of the second weft-knitted layer 84 made from the monofilament is transferred to the first weft-knitted layer 83 made from the first yarn.

A monofilament may also be melted slightly in order to connect with the layer of the first yarn and limit stretching even more. The monofilament then fuses with the first yarn at the points of contact and fixates the first yarn with respect to the layer made from monofilament.

Combination of Monofilaments and Polymer Coating

The weft-knitted fabric having two layers described in the preceding section may additionally be reinforced by a polymer coating as was already described in the section "polymer coating". The polymer material is applied to the weft-knitted layer made from monofilament. In doing so, it does not connect to the material (e.g. polyamide material) of the monofilament, since the monofilament has a very smooth and round surface, but substantially penetrates the underlying first layer of a first yarn (e.g. polyester yarn). During subsequent pressing, the polymer material therefore fuses with the yarn of the first layer and reinforces the first layer. In doing so, the polymer material has a lower melting point than the first yarn of the first layer and the monofilament of the second layer. The temperature during pressing is selected such that only the polymer material melts but not the monofilament or the first yarn.

Melt Yarn

For reinforcement and for the reduction of stretching, the yarn of the knitwear which is used according to the invention may additionally or alternatively also be a melt yarn that fixes the knitwear after pressing. There are substantially three types of melt yarns: a thermoplastic yarn surrounded by a non-thermoplastic yarn; a non-thermoplastic yarn surrounded by thermoplastic yarn; and pure melt yarn of a thermoplastic material. In order to improve the bond between thermoplastic yarn and the non-thermoplastic yarn, it is possible for the surface of the non-thermoplastic yarn to be texturized.

In certain embodiments, pressing takes place at a temperature ranging from 110 to 150° C., and may further be approximately 130° C. The thermoplastic yarn melts at least partially in the process and fuses with the non-thermoplastic yarn. After pressing, the knitwear is cooled, so that the bond is hardened and fixed. The melt yarn may be arranged in the upper and/or the sole.

In some embodiments, the melt yarn is weft-knitted into the knitwear. In case of several layers, the melt yarn may be weft-knitted into one, several or all layers of the knitwear.

In certain embodiments, the melt yarn may be arranged between two layers of knitwear. In doing so, the melt yarn may simply be placed between the layers. Arrangement between the layers has the advantage that the mold is not stained during pressing and molding, since there is no direct contact between the melt yarn and the mold.

Thermoplastic Textile for Reinforcement

A further possibility for reinforcing knitwear that is used for the present invention, for example in an upper and/or a sole, is the use of a thermoplastic textile. This is a thermoplastic woven fabric or thermoplastic knitwear. A thermoplastic textile melts at least partially when subjected to heat and stiffens as it cools down. A thermoplastic textile may, for example, be applied to the surface of an upper or a sole, which may comprise knitwear, for example, by applying pressure and heat. When it cools down, the thermoplastic textile stiffens and specifically reinforces the upper or the sole in the area in which it was placed, for example.

The thermoplastic textile may be specifically manufactured for the reinforcement in its shape, thickness and structure. Additionally, its properties may be varied in certain areas. The stitch structure, the knitting stitch, and/or the yarn used may be varied such that different properties are achieved in different areas.

According to certain embodiments, a thermoplastic textile is a weft-knitted fabric or warp-knitted fabric made from thermoplastic yarn. Additionally, the thermoplastic textile may also comprise a non-thermoplastic yarn. The thermoplastic textile may be applied to an upper or a sole of a shoe, for example, by pressure and heat.

A woven fabric whose wefts and/or warps are thermoplastic are other embodiments of a thermoplastic textile. Different yarns may be used in the weft direction and the warp direction of the thermoplastic woven fabric, so as to achieve different properties, such as stretchability, in the weft direction and the warp direction.

A spacer weft-knitted fabric or spacer warp-knitted fabric made from thermoplastic material are other embodiments of a thermoplastic textile. In this regard, e.g. only one layer may be thermoplastic, e.g. so as to be attached to an upper or a sole. Alternatively, both layers are thermoplastic, e.g. in order to connect the sole to the upper.

A thermoplastic weft-knitted fabric or warp-knitted fabric may be manufactured using the manufacturing techniques for knitwear described in the section "knitwear".

A thermoplastic textile may be connected with the surface to be reinforced only partially subject to pressure and heat so that only certain areas or only a certain area of the thermoplastic textile connects to the surface. Other areas or another area do not connect, so that the permeability for air and/or humidity is maintained there, for example. The function and/or the design of e.g. an upper or a sole may be modified by this.

Upper

Figure 9:
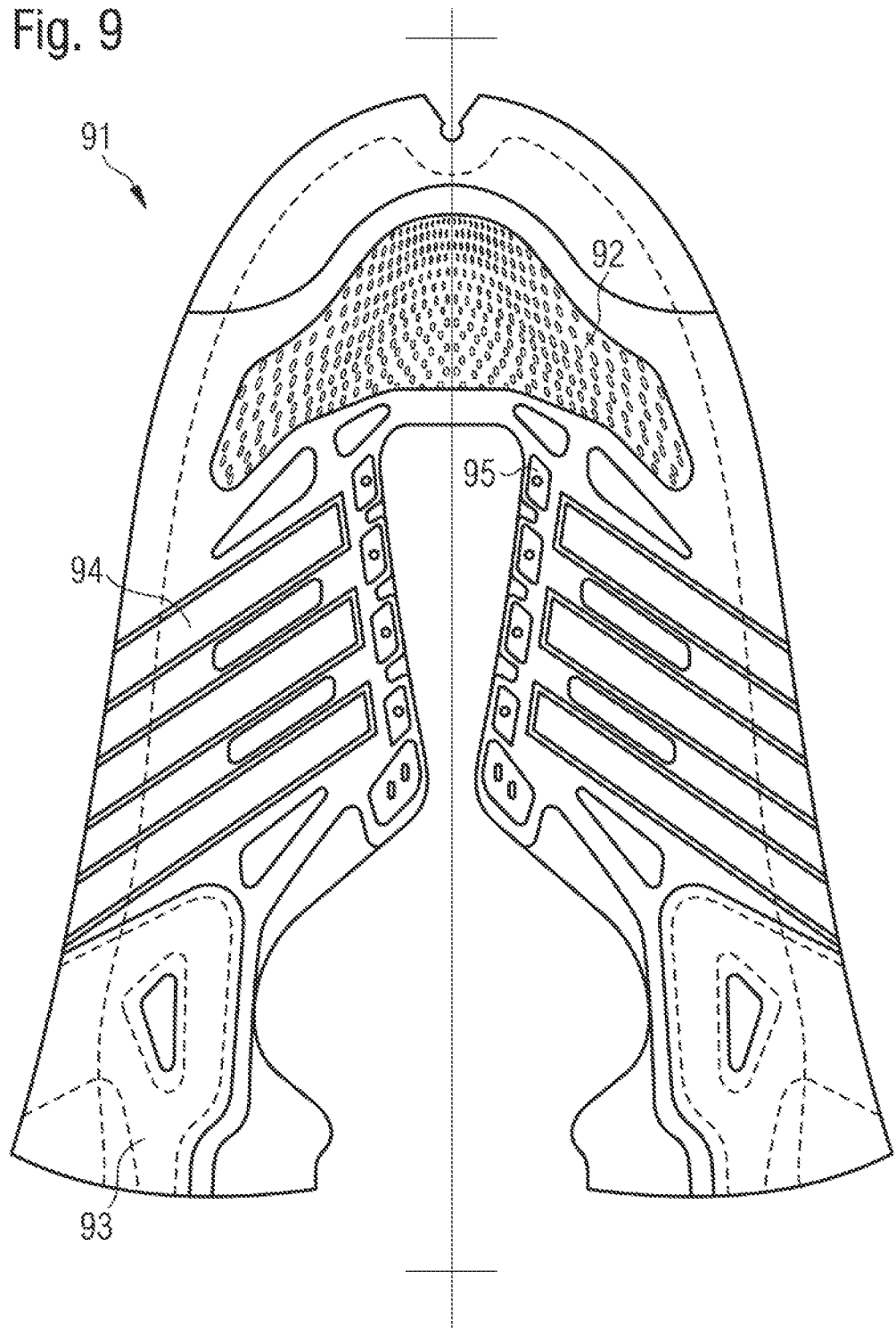
FIG. 9 is a top view of an outer layer of a shoe upper, according to certain embodiments of the present invention.

FIG. 9 shows a schematic top view of an outer layer 91, according to certain embodiments of the present invention. The outer layer 91 comprises a first knitwear. This first knitwear may be a weft-knitted fabric or a warp-knitted fabric, which may e.g. be manufactured on a weft-knitting machine or a warp-knitting machine. The knitwear is made from one of the above-described yarns, for example. Several yarns may also be used. For example, one of the yarns may be a monofilament or a melt yarn, as described in the corresponding sections above.

The outer layer 91 may comprise the first knitwear, for instance in the toe area 92, which is shown in FIG. 9. It is possible that the outer layer 91 comprises the first knitwear additionally or alternatively also in other areas, for instance on the inside, the outside, in the heel area, or in the instep area.

The outer layer may also comprise the first knitwear, i.e. it may be completely manufactured from knitwear.

The first knitwear may comprise openings, as shown in the upper toe area 92. These openings may e.g. be weft-knitted or warp-knitted in during the manufacture of the knitwear. Alternatively, the openings may be cut out or punched out afterwards. Optionally, the edge of the openings may then e.g. be welded in order to avoid runs. The size of the openings may e.g. be in the range of some millimeters or of some centimeters. The openings allow a circulation of air and may allow visibility of the inner layer arranged below of the upper according to the invention.

The outer layer may comprise areas in which separate elements are arranged. For instance, a heel cap may be arranged in a heel area 93. It may be stitched, glued or welded on the heel area 93, as described above. The heel cap may be arranged visibly on the outside of the outer layer 91 or non-visibly between the outer layer 91 and the inner layer. Alternatively, the heel cap may be made of knitwear, for example as a spacer weft-knitted fabric or a spacer warp-knitted fabric and/or as knitwear reinforced by melt yarn and/or polymer coating and/or a thermoplastic textile, as described in the section "functional knitwear", "melt yarn", "polymer coating", and "thermoplastic textile for reinforcement" above.

For example, the heel cap may be formed by melt yarn that is weft-knitted or warp-knitted only into the first knitwear of the outer layer 91. The melt yarn liquefies when it is heated, distributes inside the knitwear, and hardens as it subsequently cools down. Melt yarn may also be weft-knitted or warp-knitted only into the first knitwear of the outer layer 91 in the toe area. In this manner, a toe cap may be achieved in a very simple manner.

Melt yarn may also be weft-knitted or warp-knitted only into the first knitwear of the outer layer 91 in the area of the lace eyelets. In this manner, the lace eyelets may e.g. be formed from melt yarn. In these embodiments, the second knitwear of the inner layer ensures high wear comfort, since it assumes the function of a padding and does not allow the foot to come into direct contact with the areas that are reinforced by a melt yarn.

The outer layer 91 also comprises areas, such as e.g. the side area 94, which primarily serve the optical appearance of the upper. For example, the side area 94 may be an area of the manufacturer's logo. Such logos may be applied subsequently. Alternatively, such logos are manufactured in one piece with the first knitwear, for example by the use of yarns in other colors or by the variation of the stitches, e.g. by forming stitch structures such as ribs, waves etc.

The outer layer 91 may be also provided with at least one lace eyelet like it is for instance shown by reference number 95. Such a lace eyelet 95 may be applied subsequently to the outer layer 91, e.g. by sewing, gluing, welding, or riveting. Alternatively, a lace eyelet 95 may be manufactured in one piece with the first knitwear. In this case, in the area of the lace eyelet 95, a more rigid yarn and/or a melt yarn and/or a polymer coating may then be used as described in the sections "melt yarn" and "polymer coating" above.

The outer layer 91 may fulfill different functions by the corresponding design of the first knitwear according to the requirements to the shoe. For example, the outer layer 91 may be water-repellent by the use of a water-repellent yarn. Additionally or alternatively, the outer layer 91 may be particularly water-repellent due to the use of a particularly tight-meshed stitch structure. This may be also achieved or supported by a post-processing of the first knitwear, e.g. by an impregnation and additionally or alternatively a corresponding coating.

Due to the use of an abrasion-resistant yarn, the outer layer 91 may be correspondingly abrasion-resistant. This may be also achieved or supported by a robust stitch structure, i.e. a tight-meshed stitch structure.

Figure 10:
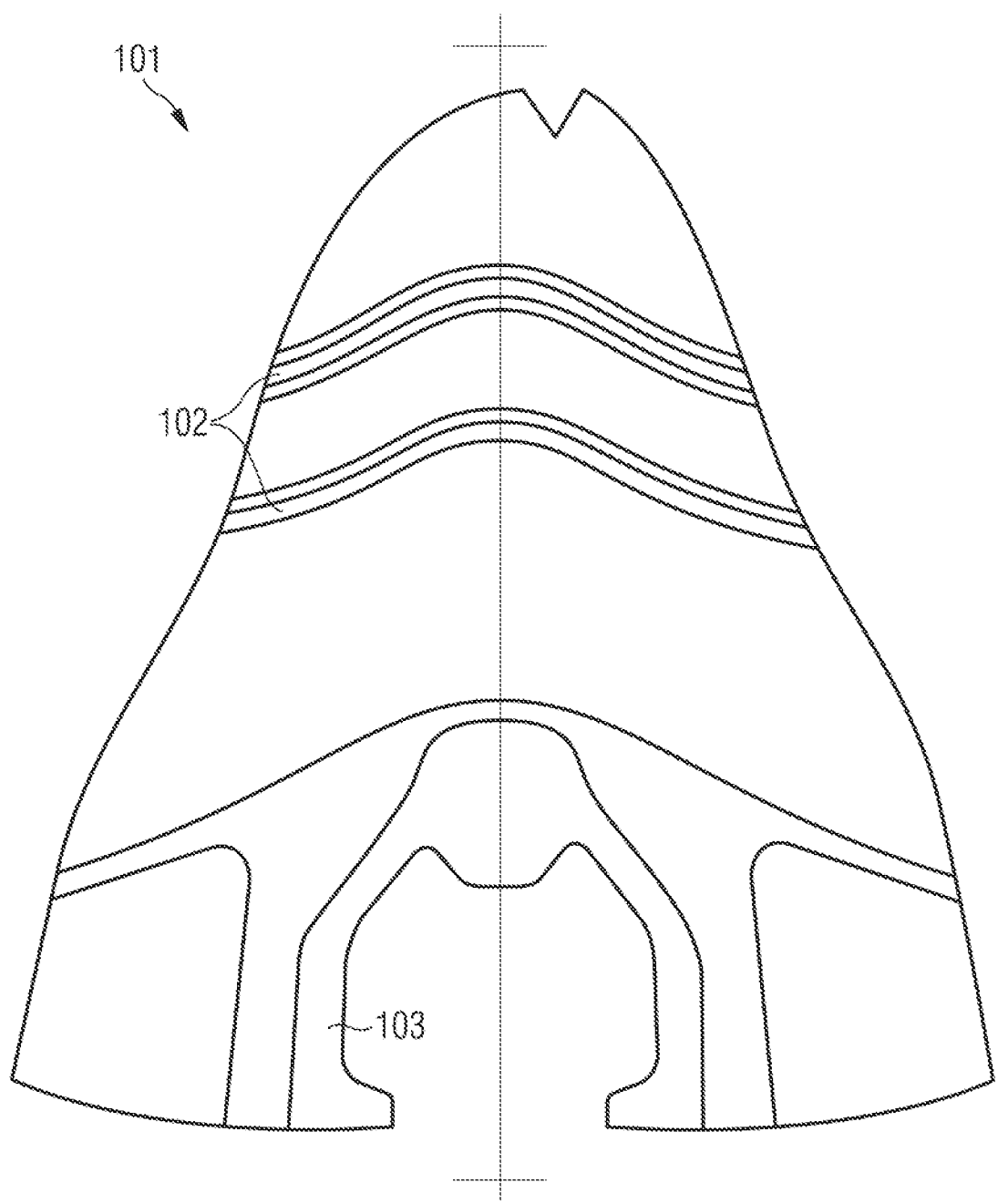
FIG. 10 is a top view of an outer layer of a shoe upper, according to certain embodiments of the present invention.

FIG. 10 shows a schematic top view of embodiments of an inner layer 101 of the present invention. The inner layer 101 comprises a second knitwear. This may be a weft-knitted fabric or a warp-knitted fabric, which may e.g. be manufactured on a weft-knitting machine or a warp-knitting machine. The knitwear is made from one of the yarns described in the corresponding section above, for example. Several yarns may also be used. For example, one of the yarns may be a monofilament or a melt yarn, as described in the corresponding sections above.

The inner layer 101 may comprise a second knitwear in at least one area, e.g. in the toe area. It is conceivable that the inner layer 101 comprises the first knitwear additionally or alternatively also in other regions, e.g. on the inside, the outside, in the heel area or in the instep area. The inner layer may also comprise the second knitwear, i.e. it may be completely manufactured from knitwear.

The second knitwear may comprise openings for air circulation. These openings may e.g. be weft-knitted or warp-knitted in during the manufacture of the knitwear. Alternatively, the openings may be e.g. cut out or punched out afterwards. Optionally, the edges of the openings may then e.g. be welded in order to avoid runs. The size of the openings may e.g. be in the range of some millimeters or of some centimeters.

The inner layer 101 may comprise regions with specific functions. For example, the upper toe areas 102 shown in FIG. 10 may be more elastic than other areas in order to support the bending of the toes. This elasticity may e.g. be achieved by the use of second knitwear which comprises an elastic yarn.

The inner layer 101 may also comprise the function of padding in order to provide the corresponding comfort to the foot. For example, in the ankle area 103 of the malleolus, a padding may be provided. This padding may be provided by the second knitwear. For this purpose, the second knitwear may e.g. be a spacer weft-knitted fabric or a spacer warp-knitted fabric as described in the corresponding section above. Alternatively, the second knitwear in the ankle area 103 may be a two-layer knitwear between the layers of which a padding material, e.g. a foam, is arranged subsequently. A padding may also be provided in other areas of the inner layer 101, e.g. in the toe area.

In other embodiments of the invention, the inner layer 101 and the outer layer 91 are formed such that at least one hollow space, e.g. in the form of a pocket, into which a padding may be inserted, forms between the two areas in certain areas, e.g. in the ankle area.

The inner layer 101 may fulfill different functions by the use of corresponding knitwear depending on the requirements. For example, a particularly humidity-absorbing yarn may be used for the second knitwear. For example, a yarn with fibers with a bone-shaped cross section, as described in the sections "fibers" and "yarns" above, may be used for the second knitwear. Examples of materials for such fibers are acrylic and spandex.

The stitch structure of the second knitwear may vary depending on the requirements. For example, a structure with larger stitches supports the circulation of air. In addition, this function may be supported by openings, which were already worked into the knitwear during weft-knitting or warp-knitting, or cut out or punched out subsequently. Optionally, the edges of the openings may then e.g. be welded in order to avoid runs.

Figure 11:
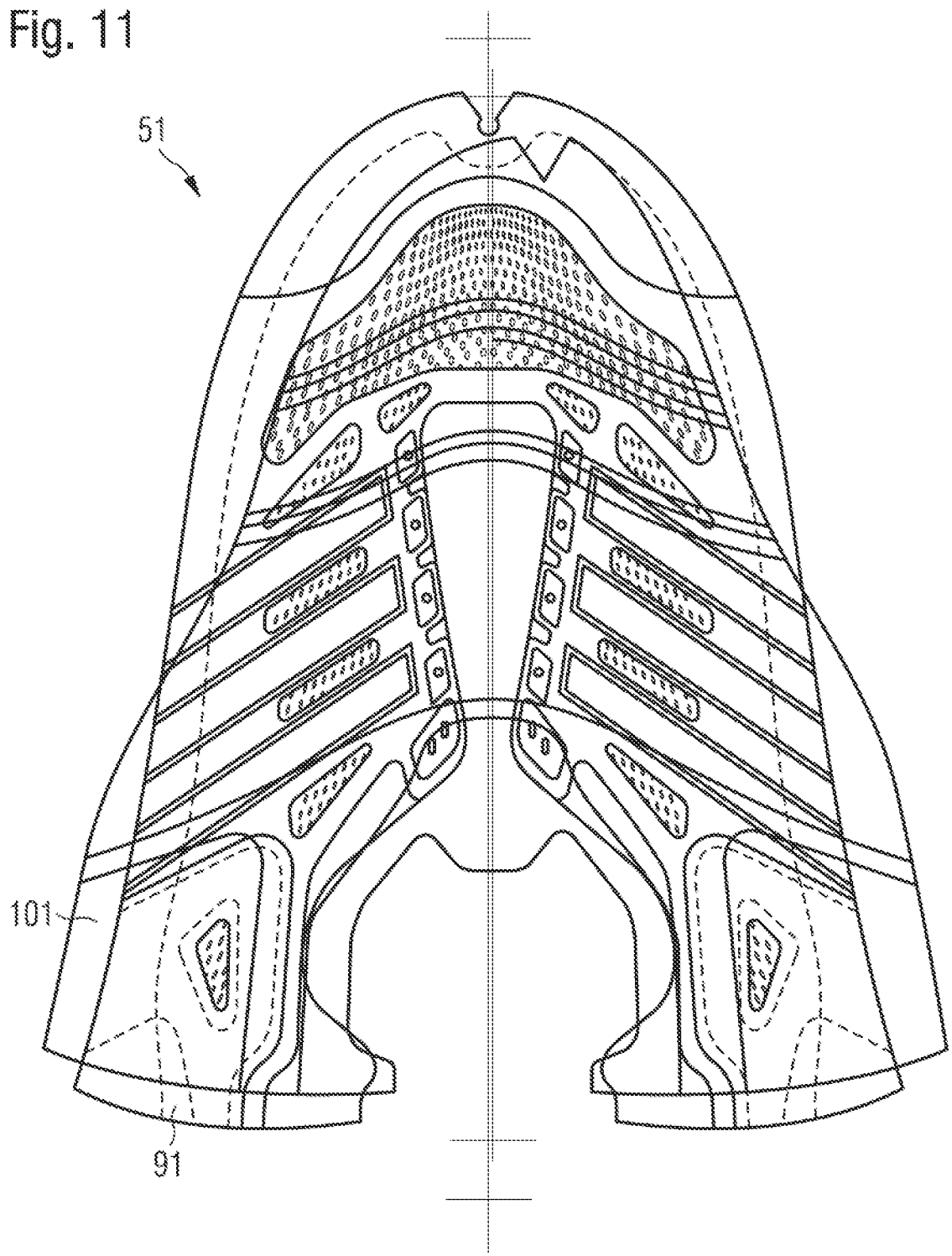
FIG. 11 is a top view of a shoe upper, according to certain embodiments of the present invention.

FIG. 11 shows a schematic top view an upper 51, according to embodiments of the invention, which comprises an outer layer 91 and an inner layer 101. The inner layer 101 may be connected to the outer layer e.g. by sewing, gluing or welding (using high frequency, laser or ultrasound, as described in the section "functional knitwear" above). Alternatively, the inner layer 101 may be connected to the outer layer 91 by linking.

It is also conceivable that the inner layer 101 is connected to the outer layer 91 by a hook-and-loop-fastener, a button, lacing, in a form-fit or force-fit manner.

Between the inner layer 101 and the outer layer 91 elements may be arranged, such as a heel cap, a reinforcement in the area of the toes, a reinforcement strip, a membrane or a lace eyelet. These elements may be connected to the inner layer 101 and/or the outer layer 91 by sewing, gluing, or welding. Alternatively, such members may be detachably arranged between the inner layer 101 and the outer layer 91.

Figure 12:
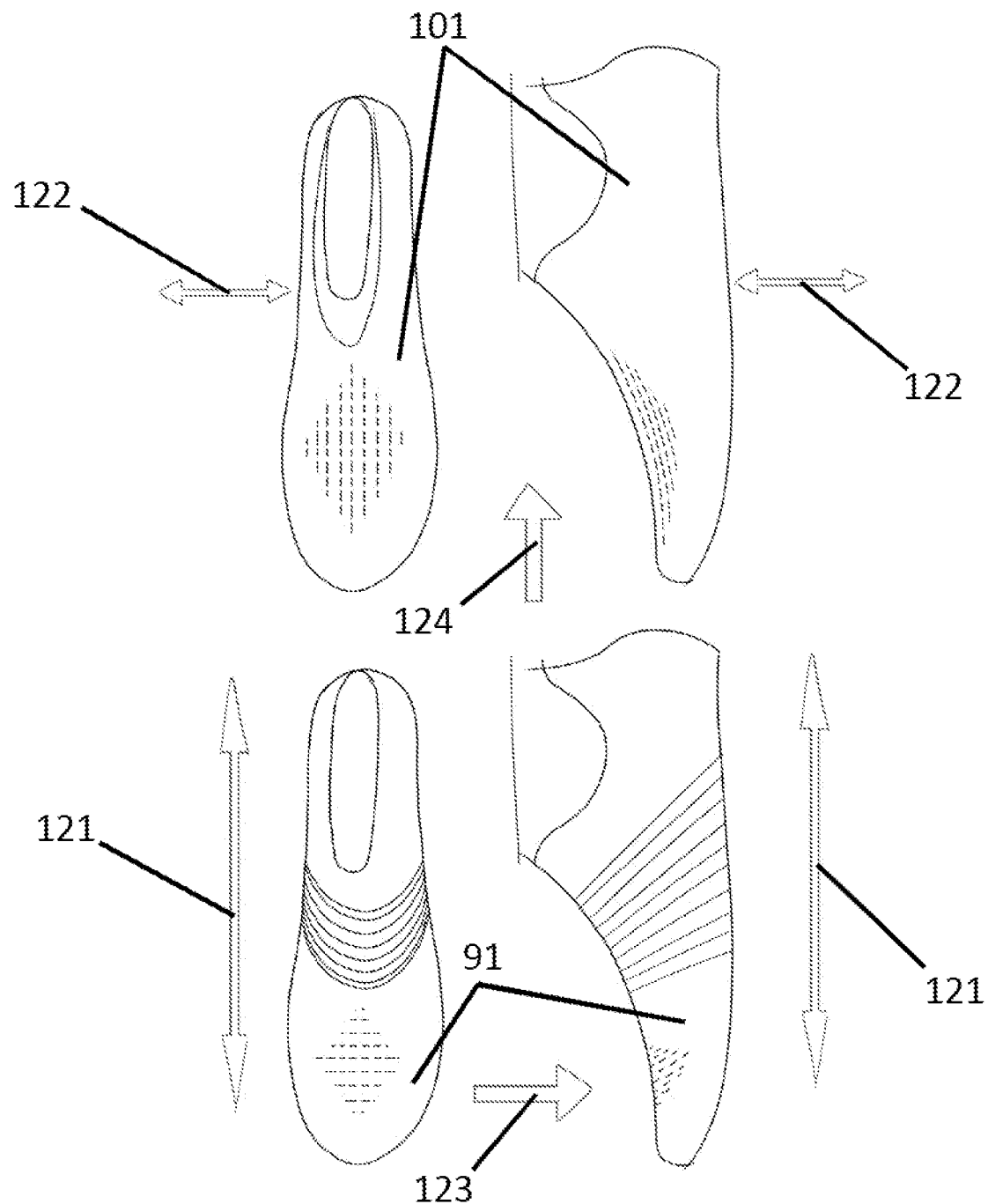
FIG. 12 are top and side views of a shoe upper, in which the outer layer and the inner layer are oriented differently, according to certain embodiments of the present invention.

FIG. 12 shows embodiments of the present invention, with the outer layer 91 and the inner layer 101 each completely surrounding the foot of the wearer, that is, being designed in a sock-like manner. In these embodiments, the outer layer 91 is arranged relative to the inner layer 101 such that the directions of greatest stretchability 121, 122 of the two layers 91, 101 are perpendicular to one another. For better illustration, in these embodiments, as shown in FIG. 10, the outer layer 91 and the inner layer 101 are arranged side by side. In an upper 51, according to certain embodiments of the invention, the inner layer 101 is arranged below the outer layer 91.

In these embodiments, as shown in FIG. 12, the inner layer 101 and the outer layer 91 comprise knitwear, which in general comprises a direction of highest stretchability. For example, a warp-knitted fabric comprises higher stretchability in the direction of the courses than in the direction of the wales. However, the inner layer 101 and the outer layer 91 do not have to completely comprise knitwear, as in the embodiments shown in FIG. 12, may also partially comprise it.

In these embodiments, as shown in FIG. 12, the outer layer 91 is aligned such that its direction of greatest stretchability 121 is substantially parallel to the longitudinal axis of the upper 51. The direction of greatest stretchability 122 of the inner layer 101 is aligned with regard to this such that it is substantially perpendicular to the longitudinal axis of the upper 51. Thus, the greatest stretchability directions 121 and 122 are also substantially, if not exactly, perpendicular to one another. In some embodiments of the invention, the greatest stretchability directions 121 and 122 may be substantially perpendicular, for example at an angle between 70° and 110°.

In FIG. 12, the weft-knitting or warp-knitting directions 123, 124 of the two layers 91, 101 are also shown. The weft-knitting or the warp-knitting-direction corresponds to the direction in which the fabric is created during the manufacturing process. The weft-knitting or the warp-knitting direction 123 of the outer layer 91 runs transversely to the longitudinal direction of the upper 51. Due to this, the direction of greatest stretchability 121 of the outer layer 91 is parallel to the longitudinal axis of the upper 51. The weft-knitting or warp-knitting direction 124 of the inner layer 101 runs parallel to the longitudinal direction of the upper 51. Due to this, the direction of greatest stretchability 122 of the inner layer 101 is perpendicular to the longitudinal axis of the upper 51.

Figure 13:
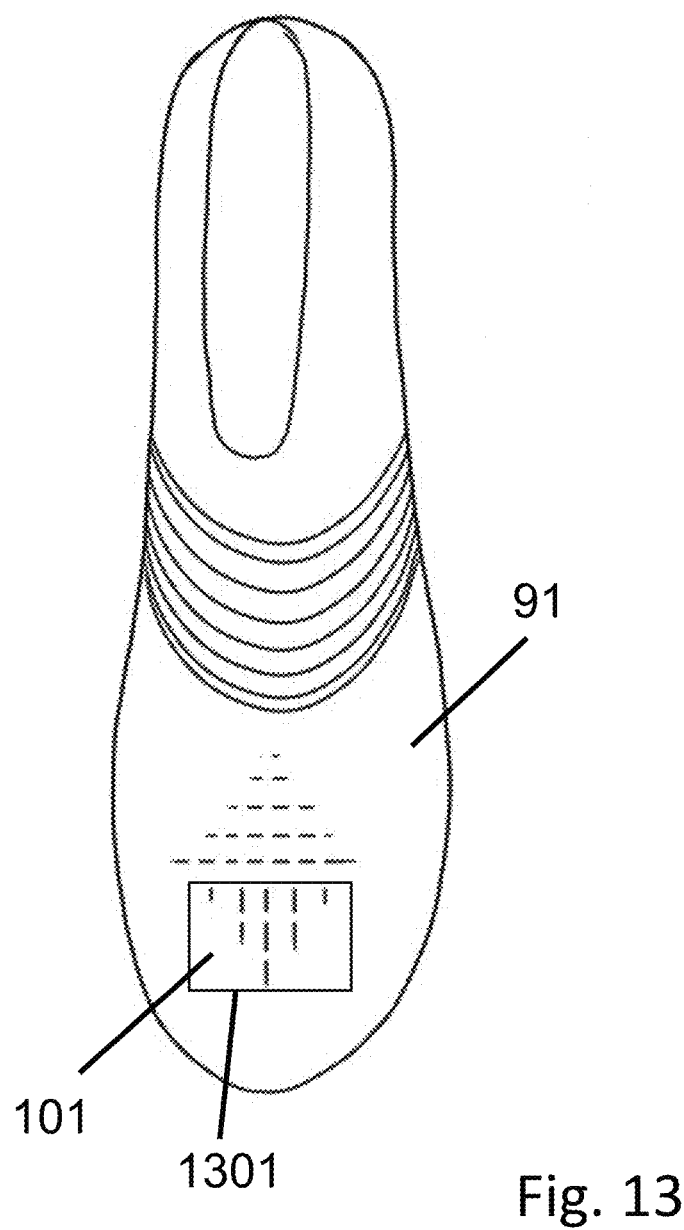
FIG. 13 is a top view of a shoe upper, in which the outer layer and the inner layer are oriented differently and a portion of the inner layer is visible, according to certain embodiments of the present invention.

The first knitwear and the second knitwear may also differ with regard to their shape. In this case, both pieces of knitwear are not completely congruent. For example, certain areas of the inner layer 101 may be visible from the outside, e.g., as may be seen in FIG. 13. Due to this feature, zones with certain functions may specifically be achieved. Where the second knitwear of the inner layer 101 is not covered by the first knitwear of the outer layer 91, the inner layer fulfills its respective function. Where the first knitwear of the outer layer is not covered by the second knitwear of the inner layer, e.g., area 1301, the outer layer fulfills its respective function. Where the first knitwear and the second knitwear overlap, both pieces of knitwear fulfill their respective functions.

For example, the first knitwear of the outer layer may be a stable weft-knitted fabric or warp-knitted fabric that is arranged in the heel area, the midfoot area, and in the toe area, and which does not cover the second knitwear lying underneath it, thus leaving it free, in other areas, e.g. in the flex zones, the tongue area, and the upper toe area. The second knitwear may comprise a soft, humidity-transporting yarn and cover all areas of the foot, that is, be formed in a sock-like manner. The first knitwear of the outer layer fulfills its function where it is arranged and provides the foot with stability in the heel area, in the midfoot area, and in the toe area. The second knitwear of the inner layer fulfills its function, particularly humidity-transport, particularly where the first knitwear of the outer layer is not arranged, that is, e.g. in the flex zones, the tongue area, and the upper toe area.

In further embodiments of the invention, areas in which pressure sores may easily occur (e.g. in the flexing area, the instep, etc.) are covered by an inner layer that comprises an elastic second knitwear. Pressure-sensitive places are relieved in this manner.

In certain embodiments, the first knitwear and the second knitwear only differ with regard to their shape but otherwise comprise the same yarn, the same stitch structure, and the same alignment. The respective functions of the first knitwear and the second knitwear also complement each other in this case due to their different shapes.

In general, the present invention allows a modular construction of the upper 51, i.e. the inner layer 101 and the outer layer 91 allow virtually arbitrary combinations. Thus, a customer may e.g. individually compile an upper 51 from an inner layer 101 and an outer layer 91. It is conceivable, for example, that they may select from an amount of outer layers with various degrees of stability and from an amount of inner layers with various thicknesses in this regard. In certain embodiments, they may select from respective different colors and designs of the outer layer 91 and the inner layer 101.

It is a further possibility that the inner layer 101 or the outer layer 91 or both are individually adjusted for a customer. For example, the second knitwear of the inner layer 101 may be more elastic than the first knitwear of the outer layer 91 and thus exert compression on the foot. The intensity and distribution of the compression along the foot may be individually adjusted, for example, in order to support certain areas of the foot, e.g. the midfoot area. The compression may for example be adjusted in the way of a bandage in case of injuries.

The modular setup furthermore reduces storage costs, since a wider model range may be manufactured from less parts due to the plurality of possible combinations of the inner and the outer layer.

In the following, further examples are described to facilitate the understanding of the invention:

1. Upper (51) for a shoe, in particular a sports shoe, comprising:
    a. an outer layer (91) comprising a first knitwear;
    b. an inner layer (101) comprising a second knitwear;
    c. wherein the first knitwear differs from the second knitwear with regard to the yarn used and/or the stitch structure and/or the alignment and/or the form.
2. Upper (51) according to example 1, wherein the inner layer is essentially completely manufactured from the second knitwear.
3. Upper (51) according to any one of the preceding examples, wherein the first knitwear and/or the second knitwear is weft-knitted.
4. Upper (51) according to any one of the preceding examples, wherein the first knitwear and/or the second knitwear is warp-knitted.
5. Upper (51) according to any one of the preceding examples, wherein the second knitwear comprises a thinner yarn than the first knitwear.
6. Upper (51) according to any one of the preceding examples, wherein the first knitwear comprises a considerably more coarsely knitted stitch structure than the second knitwear.
7. Upper (51) according to any one of the preceding examples, wherein the second knitwear absorbs humidity better and/or wicks it outwards better than the first knitwear.
8. Upper (51) according to any one of the preceding examples, wherein the second knitwear comprises an area which assumes the function of a tongue.
9. Upper (51) according to any one of the preceding examples, wherein the first knitwear comprises at least one than opening through which the second knitwear is visible.
10. Upper (51) according to any one of the preceding examples, wherein the second knitwear is more stretchable than the first knitwear.
11. Upper (51) according to any one of the preceding examples, wherein the first knitwear and the second knitwear are aligned such with regard to each other that the upper (51) comprises essentially isotropic stretchability.
12. Upper (51) according to any one of the preceding examples, wherein the first knitwear and the second knitwear are aligned such with regard to each other that the direction of greatest stretchability of the first knitwear is essentially perpendicular to the direction of greatest stretchability of the second knitwear.
13. Upper (51) according to any one of the preceding examples, wherein the second knitwear is aligned such that the direction of greatest stretchability of the second knitwear is essentially perpendicular on a longitudinal axis of the upper (51).
14. Upper (51) according to any one of the preceding examples, wherein the first knitwear is aligned such that the direction of greatest stretchability of the first knitwear runs essentially parallel to a longitudinal axis of the upper (51).

15. Upper (51) according to any one of the preceding examples, wherein the first knitwear and the second knitwear are aligned such with regard to each other that the courses of the first knitwear are essentially perpendicular to the courses of the second knitwear.

16. Upper (51) according to any one of the preceding examples, wherein the inner layer (101) is detachably connected to the outer layer (91).

17. Upper (51) according to example 16, wherein the inner layer (101) is detachably connected to the outer layer (91) by means of a hook and loop fastener, a button, lacing, in a form-fit or force-fit manner.

18. Upper (51) according to one of examples 1 to 15, wherein the outer layer (91) is non-detachably connected to the inner layer (101).

19. Shoe (71), in particular a sports shoe, comprising:
    a. an upper (51) according to one of the preceding examples;
    b. a sole.

20. Method of manufacture an upper (51) according to one of examples 1-18, comprising the steps:
    a. providing an outer layer (91) comprising a first knitwear; and
    b. providing an inner layer (101) which comprises a second knitwear, wherein the second knitwear differs from the first knitwear with regard to the yarn used and/or the stitch structure and/or the alignment and/or the form.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sports shoe comprising:
    an upper, comprising:
        a first layer of the upper, wherein the first layer comprises a first knitted component in an area that at least encloses an ankle of a wearer when the sports shoe is worn, wherein the first knitted component comprises a first plurality of courses oriented substantially parallel to a longitudinal axis of the upper, wherein the longitudinal axis of the upper extends from a toe area of the upper to a heel area of the upper; and
        a second layer of the upper, wherein at least a portion of the second layer comprises a second knitted component comprising a second plurality of courses oriented substantially perpendicular to the longitudinal axis of the upper in at least one first area where the first knitted component overlaps the second knitted component, wherein the first area extends from a medial side of a midfoot area of the upper continuously across at least a portion of the midfoot area of the upper to a lateral side of the midfoot area of the upper, wherein the perpendicular arrangement of the first plurality of courses and the second plurality of courses creates a substantially isotropic stretchability in the at least one first area, wherein the at least one first area is configured to provide at least one lateral supportive force acting on a foot of the wearer during use, wherein the second knitted component is knitted in one piece and constructed separately from the first knitted component, wherein the first layer is joined to the second layer in the area that at least encloses the ankle of the wearer when the sports shoe is worn, wherein the first layer is joined to the second layer using linking, wherein the linking includes joining at least one stitch of the first knitted component with at least one stitch of the second knitted component, wherein the linking occurs after each of the first layer and the second layer is constructed, and wherein at least one of the first knitted component or the second knitted component is configured to completely surround the foot of the wearer during use; and
    a sole.

2. The sports shoe according to claim 1, wherein the first knitted component differs from the second knitted component with regard to at least one of a yarn used, a stitch structure, and an alignment of the first plurality of courses and the second plurality of courses.

3. The sports shoe according to claim 1, further comprising at least one tunnel.

4. The sports shoe according to claim 1, further comprising at least one of a reinforcement strip or a membrane positioned between the first knitted component and the second knitted component.

5. The sports shoe according to claim 1, further comprising a section wherein at least one of the first knitted component and the second knitted component includes a weft-knitted fabric knitted from multi-fiber yarn, wherein at least one of the first knitted component or the second knitted component includes a fabric knitted from monofilament.

6. The sports shoe according to claim 1, wherein the first knitted component and the second knitted component are flat components prior to being incorporated into the sports shoe.

7. The sports shoe according to claim 1, wherein at least one of the first knitted component or the second knitted component has a seamless shape formed using circular knitting, wherein the seamless shape enables the at least one of the first knitted component or the second knitted component to completely surround the foot of the wearer during use.

8. The sports shoe according to claim 1, wherein the first layer and the second layer are flat components prior to being incorporated into the sports shoe.

9. The sports shoe according to claim 1, wherein the at least one first area also includes the heel area or the toe area of the upper.

10. The sports shoe according to claim 1, wherein the second knitted component comprises greater humidity absorbing properties than the first knitted component.

11. The sports shoe according to claim 1, wherein the second knitted component comprises greater humidity wicking properties than the first knitted component.

12. A sports shoe comprising:
    an upper, comprising:
        a first layer of the upper, wherein at least a portion of the first layer comprises a first knitted component comprising a first plurality of courses oriented substantially parallel to a longitudinal axis of the upper, wherein the longitudinal axis of the upper extends from a toe area of the upper to a heel area of the upper; and a second layer of the upper, wherein at least a portion of the second layer comprises a second knitted component comprising a second plurality of courses oriented substantially perpendicular to the longitudinal axis of the upper in at least one first area where the first knitted component overlaps the second knitted component, wherein the first area extends from a medial side of a midfoot area of the upper continuously across at least a portion of the midfoot area of the upper to a lateral side of the midfoot area of the upper, wherein the perpendicular arrangement of the first plurality of courses and the second plurality of courses creates a substantially isotropic stretchability in the at least one first area, wherein the at least one first area is configured to provide structural supportive forces acting on a foot of a wearer during use, wherein the second knitted component is knitted in one piece, wherein at least a portion of the first knitted component is joined to at least a portion of the second knitted component using linking, sewing, gluing, welding, or use of a melt yarn, wherein the first knitted component is joined to the second knitted component after each of the first layer and the second layer are separately constructed, and wherein at least one of the first knitted component or the second knitted component is configured to completely surround the foot of the wearer during use; and a sole.

13. The sports shoe according to claim 12, further comprising at least one of a heel cap, a toe cap, a toe reinforcement area, a reinforcement strip, a membrane, or a lace eyelet positioned between the first knitted component and the second knitted component.

14. The sports shoe according to claim 12, wherein the first layer and the second layer are flat components prior to being incorporated into the sports shoe.

15. The sports shoe according to claim 12, wherein the at least one first area also includes the heel area or the toe area of the upper.

16. The sports shoe according to claim 12, wherein at least one of the first knitted component or the second knitted component has a seamless shape formed using circular knitting, wherein the seamless shape enables the at least one of the first knitted component or the second knitted component to completely surround the foot of the wearer during use.

17. The sports shoe according to claim 12, wherein the second knitted component comprises greater humidity absorbing properties than the first knitted component.

18. The sports shoe according to claim 12, wherein the second knitted component comprises greater humidity wicking properties than the first knitted component.

19. The sports shoe according to claim 12, wherein the first knitted component differs from the second knitted component with regard to at least one of a yarn used, a stitch structure, and an alignment of the first plurality of courses and the second plurality of courses.

20. The sports shoe according to claim 12, further comprising at least one tunnel.

21. The sports shoe according to claim 12, further comprising a section wherein at least one of the first knitted component and the second knitted component includes a weft-knitted fabric knitted from multi-fiber yarn, wherein at least one of the first knitted component or the second knitted component includes a fabric knitted from monofilament.

22. The sports shoe according to claim 12, wherein the first knitted component and the second knitted component are flat components prior to being incorporated into the sports shoe.

* * * * *